US008736712B2

(12) United States Patent
Tomat et al.

(10) Patent No.: US 8,736,712 B2
(45) Date of Patent: May 27, 2014

(54) SYSTEM TO MANAGE DIGITAL CAMERA IMAGES

(71) Applicants: Andrew Hunter Tomat, Palo Alto, CA (US); Manjula Geethani Wickramaratne, Fremont, CA (US); Laurence Andrew Lavendel, Aptos, CA (US)

(72) Inventors: Andrew Hunter Tomat, Palo Alto, CA (US); Manjula Geethani Wickramaratne, Fremont, CA (US); Laurence Andrew Lavendel, Aptos, CA (US)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/677,118

(22) Filed: Nov. 14, 2012

(65) Prior Publication Data

US 2013/0070120 A1 Mar. 21, 2013

Related U.S. Application Data

(60) Continuation of application No. 12/430,774, filed on Apr. 27, 2009, which is a division of application No. 10/806,199, filed on Mar. 23, 2004, now abandoned, which is a division of application No. 09/046,601, filed on Mar. 24, 1998, now Pat. No. 6,784,925.

(51) Int. Cl.
*H04N 5/76* (2006.01)
*H04N 5/222* (2006.01)

(52) U.S. Cl.
USPC .................................. 348/231.2; 348/333.05

(58) Field of Classification Search
USPC ........ 348/231.99–231.9; 707/821–830, 999.2
See application file for complete search history.

(56) References Cited

U.S. PATENT DOCUMENTS

| 5,438,359 | A |   | 8/1995  | Aoki .............................. 348/207 |
| 5,475,441 | A |   | 12/1995 | Parulski et al. ............... 348/552 |
| 5,477,264 | A |   | 12/1995 | Sarbadhikari et al. ........ 348/231 |
| 5,479,206 | A |   | 12/1995 | Ueno et al. ................ 348/211.5 |
| 5,506,617 | A |   | 4/1996  | Parulski et al. ............... 348/207 |
| 5,513,352 | A | * | 4/1996  | Tozuka .......................... 84/601 |
| 5,541,656 | A |   | 7/1996  | Kare et al. .................... 348/552 |
| 5,633,678 | A | * | 5/1997  | Parulski et al. ............ 348/231.5 |

(Continued)

FOREIGN PATENT DOCUMENTS

| EP | 660485 | 6/1995 |
| EP | 738076 | 10/1995 |

OTHER PUBLICATIONS

Eastman Kodak Company, "History of Kodak: Milestones—1997", http://www.kodak.com/US/en/corp/aboutKodak/kodakHistory/milestones97.shtml.

(Continued)

*Primary Examiner* — Albert Cutler
(74) *Attorney, Agent, or Firm* — Fitzpatrick, Cella, Harper & Scinto

(57) ABSTRACT

Management of files stored on an image capturing unit such as a digital camera, includes detection of connection of the image capturing unit, reception of plural image data respectively corresponding to plural images stored in the image capturing unit, and storage of the plural received image data in a storage medium. A setting screen is displayed for storage settings, wherein the setting screen includes a first region for inputting a character string for a file name and a second region for setting a number. A file name is assigned to each one of the plural image data, the assigned file name including the inputted character string and a number sequentially assigned to the plural image data, the numbers starting from the number set in the second region. Each such one of the plural received image data is stored in the storage medium with the assigned file name.

22 Claims, 56 Drawing Sheets

(56) References Cited

U.S. PATENT DOCUMENTS

| | | | |
|---|---|---|---|
| 5,638,505 A | 6/1997 | Hemenway et al. | 345/835 |
| 5,659,829 A | 8/1997 | Yamamoto et al. | 396/390 |
| 5,675,358 A | 10/1997 | Bullock et al. | 348/211 |
| 5,684,984 A | 11/1997 | Jones et al. | 707/10 |
| 5,706,097 A * | 1/1998 | Schelling et al. | 358/296 |
| 5,751,287 A | 5/1998 | Hahn et al. | 345/775 |
| 5,815,201 A | 9/1998 | Hashimoto et al. | 348/552 |
| 5,848,420 A | 12/1998 | Xu | 707/104.1 |
| 5,899,581 A * | 5/1999 | Kawamura et al. | 386/225 |
| 5,917,488 A | 6/1999 | Anderson et al. | 345/838 |
| 5,920,342 A | 7/1999 | Umeda et al. | 348/211.14 |
| 5,943,050 A * | 8/1999 | Bullock et al. | 715/783 |
| 6,009,442 A * | 12/1999 | Chen et al. | 715/205 |
| 6,018,774 A | 1/2000 | Mayle et al. | 709/250 |
| 6,028,603 A | 2/2000 | Wang et al. | 345/853 |
| 6,237,010 B1 | 5/2001 | Hui et al. | 345/428 |
| 6,256,059 B1 | 7/2001 | Fichtner | 348/222.1 |
| 6,301,586 B1 | 10/2001 | Yang et al. | 707/104.1 |
| 6,334,025 B1 | 12/2001 | Yamagami | 386/86 |
| 6,522,354 B1 | 2/2003 | Kawamura et al. | 348/231.2 |
| 6,625,334 B1 * | 9/2003 | Shiota et al. | 382/305 |
| 2002/0054233 A1 | 5/2002 | Juen | 348/372 |

OTHER PUBLICATIONS

Eastman Kodak Company, "Kodak Digital Science DC120 Zoom Digital Camera", pp. 8-1 through 8-9.

* cited by examiner

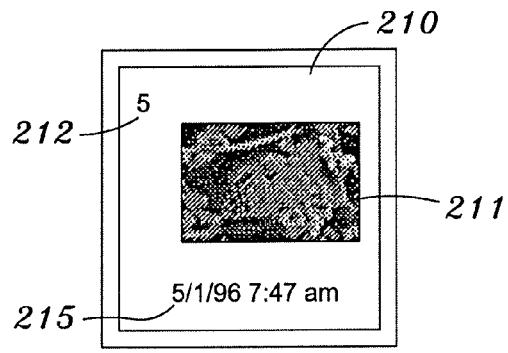
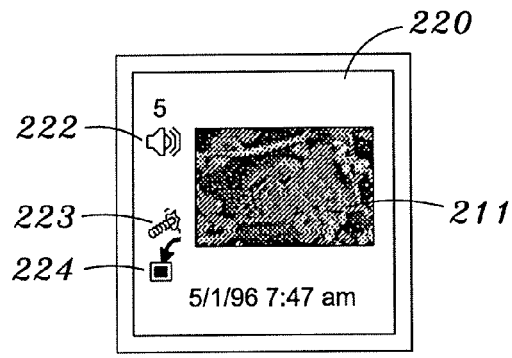
FIG. 23  FIG. 24
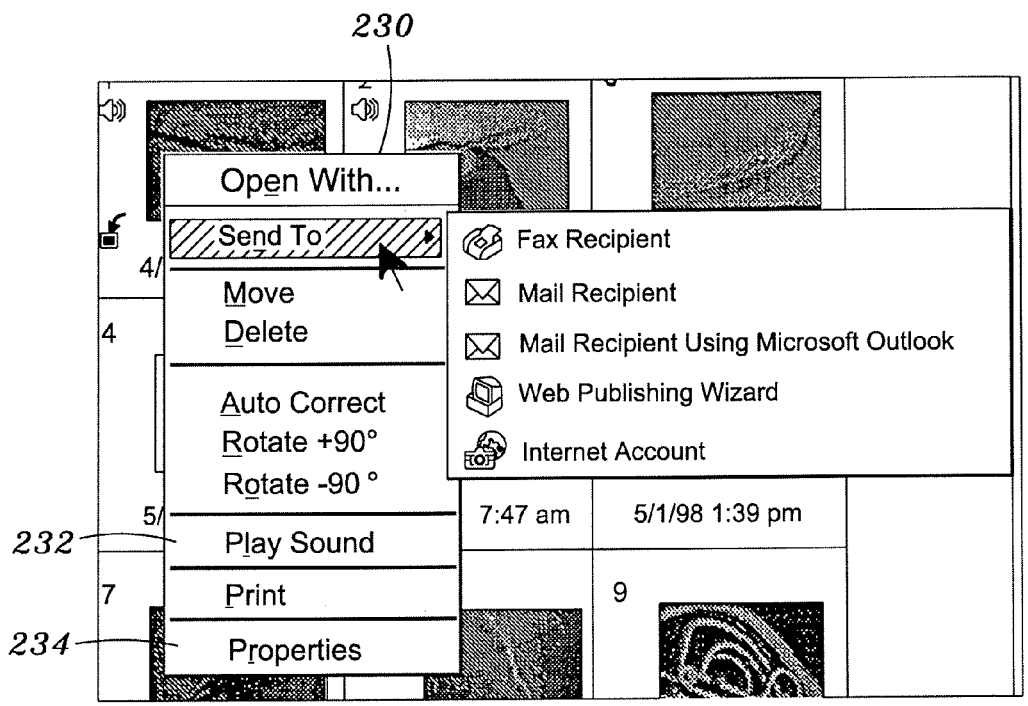
FIG. 25

To support Powershot camera and canister shell folders
IUnknown
IShellFolder
IPersist
IPersistFolder
IParseDisplayName
IOIeContainer
IEnumIDList To support the thumbnail view
IshellView
IOIeWindow
IShellFolderViewCallBack To support the shortcut menu,
IContextMenu To support the canister and camera icons
IExtractIcon To support drag and drop
IDataObject
IDropSource
IEnumFormatEtc

FIG. 62

1.1 Class CCGFolder

```
// *** IUnknown methods ***
STDMETHODIMP QueryInterface(REFIID riid, LPVOID FAR* ppvObj);
STDMETHODIMP_(ULONG) AddRef(void);
STDMETHODIMP_(ULONG) Release(void);

// *** IParseDisplayName method ***
STDMETHODIMP ParseDisplayName(
      HWND hwndOwner,
      LPBC pbc,
      LPOLESTR lpszDisplayName,
      ULONG FAR* pcbEaten,
      LPITEMIDLIST * ppidl,
      ULONG *pdwAttributes);

// *** IOIeContainer methods ***
STDMETHODIMP EnumObjects(
      HWND hwndOwner,
      DWORD grfFlags,
      LPENUMIDLIST * ppenumIDList);

// *** IShellFolder methods ***
STDMETHODIMP BindToObject(
      LPCITEMIDLIST pidl,
      LPBC pbc,
      REFIID riid,
      LPVOID FAR* ppvObj);
STDMETHODIMP BindToStorage(
      LPCITEMIDLIST pidl,
      LPBC pbc,
      REFIID riid,
      LPVOID FAR* ppObj);
STDMETHODIMP CompareIDs(
      LPARAM lParam,
      LPCITEMIDLIST pidl1,
      LPCITEMIDLIST pidl2);
STDMETHODIMP CreateViewObject(
      HWND hwndOwner,
      REFIID riid,
      LPVOID FAR* ppvObj);
STDMETHODIMP GetAttributesOf(
      UINT cidl,
       LPCITEMIDLIST FAR* apidl,
       ULONG FAR* rgfInOut);
STDMETHODIMP GetUIObjectOf(
      HWND hwndOwner,
      UINT cidl,
      LPCITEMIDLIST FAR* apidl,
      REFIID riid,
      UNIT FAR* prgfInOut,
      LPVOID FAR* ppvObj);
STDMETHODIMP GetDisplayNameOf(
      LPCITEMIDLIST pidl,
      DWORD dwReserved,
```

FIG. 63

| |
|---|
| FIG. 63a |
| FIG. 63b |
| FIG. 63c |
| FIG. 63d |

FIG. 63a

```
            LPSTRRET lpName);
STDMETHODIMP SetNameOf(
        HWND hwndOwner,
        LPCITEMIDLIST pidl,
        LPCOLESTR lpszName,
        DWORD dwReserved,
        LPITEMIDLIST FAR* ppidlOut);

// *** IPersist methods ***
STDMETHODIMP GetClassID(
        LPCLSID lpClassID);

// *** IPersistFolder methods ***
STDMETHODIMP Initialize(
        LPCITEMIDLIST pidl);
```

1.2 Class CEnumCGObjs

```
// *** IUnknown methods ***
STDMETHODIMP QueryInterface(REFIID riid, LPVOID * ppvObj);
STDMETHODIMP_ (ULONG) AddRef();
STDMETHODIMP_ (ULONG) Release();

// *** IEnumIDList methods ***
STDMETHODIMP Next(ULONG celt, LPITEMIDLIST *rgelt, ULONG *pceltFetched);
STDMETHODIMP Skip(ULONG celt);
STDMETHODIMP Reset();
STDMETHODIMP Clone(IEnumIDList **ppenum);
```

1.3 Class CSFView

```
STDMETHODIMP QueryInteface(REFIID riid, LPVOID * ppvObj);
STDMETHODIMP_(ULONG AddRef();
STDMETHODIMP_(ULONG Release();

// *** IOleWindow methods ***
STDMETHODIMP GetWindow(HWND * lphwnd);
STDMETHODIMP ContextSensitiveHelp(BOOL fEnterMode);

// *** IShellView methods ***
STDMETHODIMP TranslateAccelerator(LPMSG lpmsg);
STDMETHODIMP EnableModeless(BOOL fEnable);
STDMETHODIMP UIActivate(UINT uState);
STDMETHODIMP Refresh();
STDMETHODIMP CreateView Window(IShellView *lpPrevView, LPCFOLDERSETTINGS
lpfs, IShellBrowser * psb, RECT * prcView, HWND *phWnd);
STDMETHODIMP DestroyView Window();
STDMETHODIMP GetCurrentInfo(LPFOLDERSETTINGS lpfs);
STDMETHODIMP SaveViewState();
STDMETHODIMP SelectItem(LPCITEMIDLIST pidlItem,UINT uFlags);
STDMETHODIMP GetItemObject(UINT uItem, REFIID riid, LPVOID *ppv);
```

FIG. 63b

1.4 Class CSFViewCallBack

```
// *** IUnknown methods ***
STDMETHODIMP QueryInterface(REFIID riid, LPVOID * ppvObj);
STDMETHODIMP_(ULONG) AddRef();
STDMETHODIMP_(ULONG) Release();

// *** IShellFolderViewCallback methods ***
STDMETHODIMP Message(UINT uMsg, WPARAM wParam, LPARAM lParam);
```

1.5 Class CCGItemMenu

```
// *** IUnknown methods ***
STDMETHODIMP QueryInterface(REFIID riid, LPVOID * ppvObj);
STDMETHODIMP_(ULONG) AddRef();
STDMETHODIMP_(ULONG) Release();

// *** IContextMenu methods ***
STDMETHODIMP QueryContextMenu(HMENU hmenu, UINT indexMenu, UINT idCmdFirst,
UINT idCmdLast, UINT uFlags);
STDMETHODIMP InvokeCommand(LPCMINVOKECOMMANDINFO lpici);
STDMETHODIMP GetCommandString(UINT idCmd, UINT uType, UINT *pwReserved,
LPSTR pszName, UINT cchMax);
```

1.6 Class CCGExIcon

```
// *** IUnknown methods ***
STDMETHODIMP QueryInterface(REFIID riid, LPVOID* ppvObject);
STDMETHODIMP_(ULONG) AddRef();
STDMETHODIMP_(ULONG) Release();

// *** IExtractIcon methods ***
STDMETHODIMP GetIconLocation(UINT uFlags, LPSTR szIconFile, UINT cchMax, int*
piIndex, UINT* pwFlags);
STDMETHODIMP Extract(LPCSTR pszFile, UINT nIconIndex, HICON* phiconLarge, HICON
*phiconSmall, UINT nIconSize);
```

1.7 Class CCGObj

```
// *** IUnknown methods ***
STDMETHODIMP QueryInterface(REFIID riid, LPVOID * ppvObject);
STDMETHODIMP_(ULONG) AddRef();
STDMETHODIMP_(ULONG) Release();

// *** IDataObject methods ***
STDMETHODIMP GetData(FORMATETC *pformatetcIn, STGMEDIUM *pmedium);
STDMETHODIMP GetDataHere(FORMATETC *pformatetc, STGMEDIUM *pmedium);
STDMETHODIMP QueryGetData(FORMATETC* pformatetc);
STDMETHODIMP GetCanonicalFormatEtc(FORMATETC *pformatetcIn, FORMATETC
*pformatetcOut);
STDMETHODIMP SetData(FORMATETC *pformatetc, STGMEDIUM* pmedium, BOOL
fRelease);
```

FIG. 63c

```
STDMETHODIMP EnumFormatEtc(DWORD dwDirection, IEnumFORMATETC
**ppenumFormatEtc);
STDMETHODIMP DAdvise(FORMATETC *pformatetc, DWORD advf, IAdviseSink
*pAdvSink, DWORD* pdwConnection);
STDMETHODIMP DUnadvise(DWORD dwConnection);
STDMETHODIMP EnumDAdvise(IEnumSTATDATA **ppenumAdvise);
```

1.8 Class CSFVDropSource

```
// *** IUnknown methods ***
STDMETHODIMP QueryInterface(REFIID riid, LPVOID *ppvObj);
STDMETHODIMP_(ULONG) AddRef();
STDMETHODIMP_(ULONG) Release();

// *** IDropSource methods ***
STDMETHODIMP QueryContinueDrag(BOOL fEscapePressed, DWORD grfKeyState);
STDMETHODIMP GiveFeedback(DWORD dwEffect);
```

1.9 Class CObjFormats

```
// *** IUnknown methods ***
STDMETHODIMP QueryInterface(REFIID riid, LPVOID * ppvObj);
STDMETHODIMP_(ULONG) AddRef();
STDMETHODIMP_(ULONG) Release();

// *** IEnumFORMATETC methods ***
STDMETHODIMP Next(ULONG celt, FORMATETC *rgelt, ULONG *pceltFethed);
STDMETHODIMP Skip(ULONG celt);
STDMETHODIMP Reset();
STDMETHODIMP Clone(IEnumFORMATETC ** ppenum);
```

FIG. 63d

Registry Keys for the Canon Powershot Camera Object and the Powershot Canister Object

A { HKLM,SoftWare\Microsoft\Windows\CurrentVersion\explorer\mycomputer\NameSpace\{918B1DA1-D032-11d0-9D92-00AA0030AD96}\,,,"Canon Powershot Camera"

B {
HKCR,"Canon Powershot Camera"\CLSID,,,{918B1DA1-D032-11d0-9D92-00AA0030AD96}

HKCR,CLSID\{918B1DA1-D032-11d0-9D92-00AA0030AD96}\InProcServer32,,,"%11%\ShellExt\CGExplor.dll"
HKCR,CLSID\{918B1DA1-D032-11d0-9D92-00AA0030AD96}\InProcServer32,ThreadingModel,,"Apartment"

HKCR,CLSID\{918B1DA1-D032-11d0-9D92-00AA0030AD96}\,,,"Canon Powershot Camera"
HKCR,CLSID\{918B1DA1-D032-11d0-9D92-00AA0030AD96}\DefaultIcon,,,"%11%\ShellExt\CGExplor.dll,0"
HKCR,CLSID\{918B1DA1-D032-11d0-9D92-00AA0030AD96}\ShellEx\ContextMenuHandlers\{918B1DA1-D032-11d0-9D92-00AA0030AD96}
HKCR,CLSID\{918B1DA1-D032-11d0-9D92-00AA0030AD96}\ShellFolder,Attributes,,a0000000

C {
HKCR,"Powershot Canister"\CLSID,,,{918B1DA3-D032-11d0-9D92-00AA0030AD96}

HKCR,CLSID\{918B1DA3-D032-11d0-9D92-00AA0030AD96}\InProcServer32,,,"%11%\ShellExt\CGExplor.dll"
HKCR,CLSID\{918B1DA3-D032-11d0-9D92-00AA0030AD96}\InProcServer32,ThreadingModel,,"Apartment"

HKCR,CLSID\{918B1DA3-D032-11d0-9D92-00AA0030AD96}\,,,"Powershot Canister"
HKCR,CLSID\{918B1DA3-D032-11d0-9D92-00AA0030AD96}\DefaultIcon,,,"%11%\ShellExt\CGExplor.dll,1"
HKCR,CLSID\{918B1DA3-D032-11d0-9D92-00AA0030AD96}\ShellEx\ContextMenuHandlers\{918B1DA3-D032-11d0-9D92-00AA0030AD96}
HKCR,CLSID\{918B1DA3-D032-11d0-9D92-00AA0030AD96}\ShellFolder,Attributes,,20000000

FIG. 64

SYSTEM TO MANAGE DIGITAL CAMERA IMAGES

CROSS-REFERENCE TO RELATED APPLICATIONS

This application is a continuation of U.S. patent application Ser. No. 12/430,774 filed Apr. 27, 2009, currently pending, which was a continuation of U.S. patent application Ser. No. 10/806,199 filed Mar. 23, 2004, now abandoned, which was a division of U.S. patent application Ser. No. 09/046,601 filed Mar. 24, 1998, now U.S. Pat. No. 6,784,925 issued Aug. 31, 2004, and the contents of all of these applications are hereby incorporated by reference as if fully stated herein.

BACKGROUND OF THE INVENTION

1. Field of the Invention

The present invention is directed to a system for managing and manipulating images stored on a digital camera. More particularly, the present invention is related to a system for managing associated full-resolution image files, thumbnail image files, and sound files stored in a digital camera using a personal computer having a windowing environment, wherein the system is integrated with standard user interfaces of the windowing environment.

2. Description of the Related Art

Digital cameras are becoming increasingly prevalent in consumer households, as well as in businesses requiring capture and manipulation of digital images, such as internet merchandising or real estate. Most of these digital camera users also own a personal computer system with which they envision managing and manipulating images captured using their digital cameras. These personal computer systems most commonly provide a windowing operating environment in which intuitive and standardized user interfaces are used for controlling various system objects, such as storage devices, files, and printers.

It is therefore desirable to manage a digital camera, as well as data files stored therein, using the standardized interfaces used to control other system objects within the windowing environment. It is even more desirable to customize the standardized interfaces so that special features specific to a digital camera may be controlled and exploited.

Kodak® attempts to address the foregoing by offering, with its digital cameras, software which is minimally integrated with Microsoft® Windows95®. In this regard, Windows95 includes Explorer®, which is an application used to view a hierarchical tree of system objects arranged into folders and sub-folders, as well as the contents of a selected folder or sub-folder. As shown in FIG. 48, Kodak's software causes the Explorer application to display icon 1001 representing a Kodak digital camera as a system object in All Folders window 1002. In addition, a camera memory located within the Kodak digital camera is represented by icon 1003 and is shown as a sub-folder of the Kodak digital camera.

Since icon 1003 is selected in FIG. 48, Folder Contents window 1004 illustrates the contents of the camera memory. Accordingly, each icon shown in window 1004 represents a file stored in the camera memory. However, the represented files are in a Kodak proprietary format (.kdc) and neither the displayed icons or the filenames listed therewith are particularly helpful to a user in determining the contents of any represented file.

SUMMARY OF THE INVENTION

The inventors herein have concluded that what is needed is a system for integrating management of a digital camera into a windowing environment wherein convenient and intuitive manipulation of associated full-resolution image files, thumbnail image files, and sound files stored in the camera is provided, along with standard windowing features such as customized context menus and intelligent "drag and drop" functionality.

The present invention addresses the foregoing by integrating a digital camera as a system object into windowing applications for viewing system objects, such as Explorer or My Computer®, and by providing visual feedback and drag and drop functionality with respect to all data files stored in the camera. As a result, associated full-resolution image files, thumbnail image files, and sound files stored in the camera may be easily manipulated either individually or as a single unit.

Therefore, in one aspect, the present invention concerns a system to manage files stored on a digital camera in a windowing environment including display of an icon representing a digital camera as a system object in a system object directory, display of an icon representing a film canister within the digital camera as a sub-folder of the digital camera in the system object directory, and display of a plurality of thumbnail image files in the film canister in response to user selection of the film canister. Accordingly, this aspect of the present invention allows a user to view thumbnail image files stored in the digital camera simply by selecting a film canister displayed within an application for viewing system objects. In addition, a film canister preferably includes a plurality of photo groups of associated thumbnail image files, full-resolution image files and sound files.

In a preferred aspect, the icon representing the film canister may be dragged and dropped into any folder on a hard disk or a network disk, wherein the plurality of thumbnail image files will be displayed upon subsequent selection of the dragged and dropped icon. In this embodiment, the feature to display thumbnail image files upon selection of a film canister is advantageously preserved even if the film canister is located in a storage device other than the digital camera.

In another aspect, the present invention concerns a system to monitor a computer system for connection to a digital camera, including detection of the digital camera connected to the computer system, reception of thumbnail image files stored in the camera automatically after the camera is detected, and storage of the received thumbnail image files in a cache memory. In a preferred embodiment, full-resolution files are received and stored in the cache memory after the thumbnail image files are stored in the cache memory. Moreover, the full-resolution files are received and stored either sequentially or based on a selection of a thumbnail image. Due to the automatic caching of files stored in a detected camera, the invention allows multiple client applications to access quickly files from the digital camera by diversion of requests for access to the cache.

In yet another aspect, the present invention relates to a system to control a digital camera toolbox application user interface including display of a toolbox window, the toolbox window including a Settings button, a Download button, a View button, a Print button, and an Upload button. The toolbox application also provides control of settings of a digital camera in a case the Settings button is selected, viewing of all thumbnail image files stored in the camera in a case the View button is selected, downloading of all thumbnail image files, full-resolution image files, and sound files stored in the camera in a case the Download button is selected, printing of at least one contact sheet of all thumbnail image files stored in the camera in a case the Print button is selected, and uploading of all full-resolution image files stored in the camera to an internet photo service provider in a case the Upload button is selected. In a preferred arrangement, the Settings button provides control over downloading and uploading parameters. The one-button functionality provided by the toolbox application allows easy operation of commonly-used camera management functions.

The present invention also relates to a user interface for a windowing application for viewing system objects which includes a first area for displaying a hierarchical tree of system objects, and a second area for displaying a thumbnail image corresponding to a system object selected in the first area. Preferably, the second area may be selected and dragged to an icon representing a storage device in order to copy a full-resolution image file associated with the displayed thumbnail image to the storage device.

The user interface also preferably includes a third area adjacent to the second area for displaying an icon indicating that a sound file is associated with the displayed thumbnail image, wherein the third area may be selected and dragged to the icon representing the storage device in order to copy any sound files associated with the displayed thumbnail image to the storage device. A further preferred aspect includes a fourth area which surrounds the second area and the third area, wherein the fourth area may be selected and dragged to the icon representing the storage device in order to copy the displayed thumbnail image, the associated full-resolution image file and any associated sound files to the storage device.

Advantageously, this aspect masks the existence of separate but associated thumbnail image files, full-resolution files, and sound files from the user. As a result, this aspect provides simple and intelligent manipulation of data files produced by a digital camera.

This brief summary has been provided so that the nature of the invention may be understood quickly. A more complete understanding of the invention can be obtained by reference to the following detailed description of the preferred embodiment thereof in connection with the attached drawings.

BRIEF DESCRIPTION OF THE DRAWINGS

FIG. 23 is a view of a photo group displayed according to the present invention.

FIG. 24 is a view of a photo group displayed according to the present invention.

FIG. 25 is a view of a photo group context menu according to the present invention.

FIG. 62 is a list of Component Object Model interfaces supported by a shell extension module embodying the present invention.

FIG. 63, comprising FIG. 63a to FIG. 63d, is a list of object classes for implementing the FIG. 62 interfaces.

FIG. 64 is a list of Windows95 registry keys for supporting camera and canister system objects in accordance with the present invention.

DETAILED DESCRIPTION OF THE PREFERRED EMBODIMENTS

Figure 1:
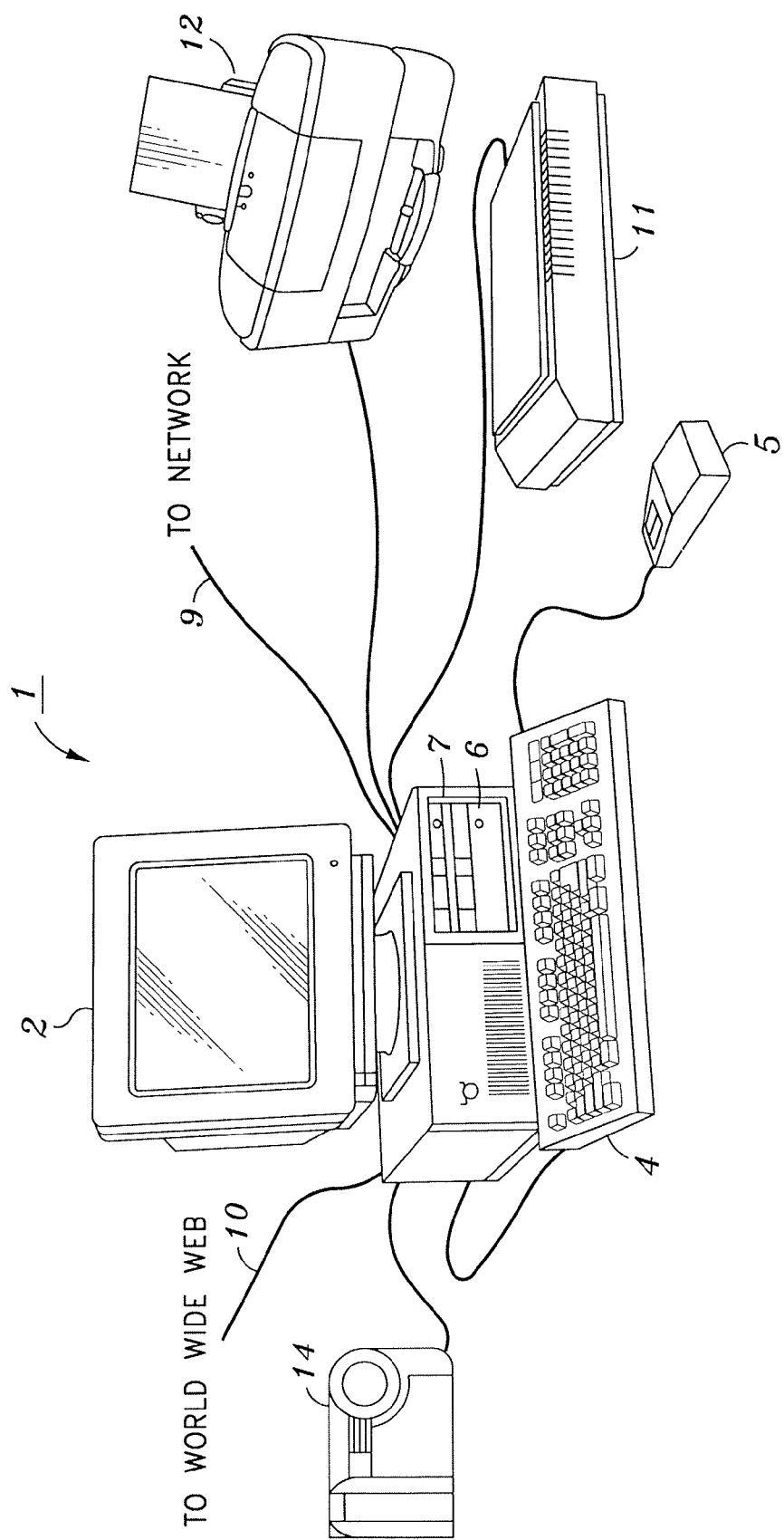
FIG. 1 is an outward view of representative computing equipment embodying the present invention.

FIG. 1 is a representational view of a computer system in which the present invention may be utilized. Computer system 1 is preferably an IBM PC-compatible system executing Microsoft Windows95. Computer system 1 may be another type of system executing a windowing environment, such as a Macintosh or the like. Provided with computer system 1 are display 2, which is preferably a color monitor, keyboard 4 for entering user commands, and pointing device 5 such as a mouse for pointing to and for manipulating graphical user interfaces and other objects displayed on display 2.

Computer system 1 also includes a mass storage device such as fixed disk 6 for storing computer-executable process steps to provide a port monitor, a toolbox application, a Windows95 Explorer shell extension module, and Windows95 registry keys according to the present invention. Fixed disk 6 may also store image processing applications, word processing applications, image files, and device drivers for use in conjunction with the present invention. The storage provided by fixed disk 6 may also be provided by a CD-ROM accessed via a CD-ROM drive (both unshown).

Floppy disk drive 7 is used to access files stored on floppy disks for direct loading into a Random Access Memory (RAM) of computer system 1, or into fixed disk 6. Computer-executable process steps or other files may also be retrieved over a network via network connection 9 or over the World Wide Web ("WWW") via World Wide Web connection 10.

Image files may also be input into computer system 1 using scanner 11.

In this regard, images retrieved from fixed disk 6, floppy disk 7, network connection 9, WWW connection 10, or scanner 11 may be output directly to printer 12, which is preferably a color printer for producing high quality color/photographic images, or such images may be retrieved, processed according to an image processing application executing in computer system 1, and sent to printer 12 thereafter.

Digital camera 14, such as a Canon PowerShot 350 or PowerShot 600 digital camera, is used for capturing digital photos. The captured photos are preferably stored in camera 14 as both a full-resolution (1024 pixels×768 pixels) JPEG image file and a low-resolution thumbnail (60×80) TIFF image file, and may be associated with one or more sound files also stored in camera 14. Of course, other digital camera models storing differently-formatted full-resolution image files and thumbnail image files may be used in practicing the present invention.

Each of the files stored in camera 14 is preferably available for download to computer system 1 upon connection to computer system 1 through a cabled or other type of connection. In this regard, although most digital cameras are configured to connect to a serial port (not shown) of computer system 1, any other method of connection to computer system 1 may be used in practicing the present invention. Further details of camera operation and of the files stored therein are given below.

It should be understood that, although a programmable general purpose computer is shown in FIG. 1, a dedicated computer terminal or other type of data processing equipment can utilize a system for managing digital camera images as discussed below.

Figure 2:
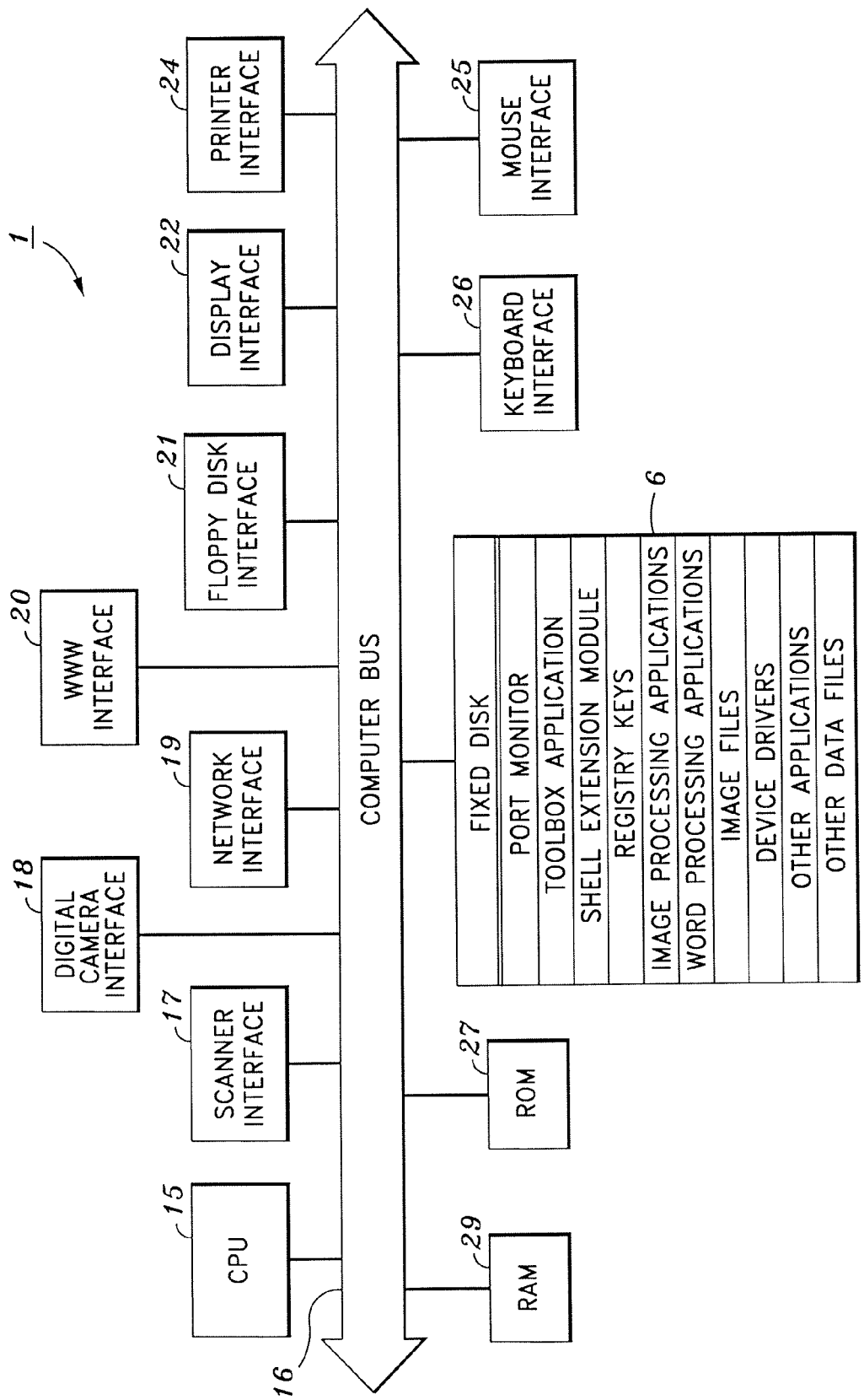
FIG. 2 is a block diagram of the internal architecture of the FIG. 1 computing system.

FIG. 2 is a detailed block diagram showing the internal architecture of computer system 1. As shown in FIG. 2, computer system 1 includes central processing unit (CPU) 15 which interfaces with computer bus 16. Also interfacing with computer bus 16 are scanner interface 17, digital camera interface 18, network interface 19, WWW interface 20, floppy disk drive interface 21, display interface 22, printer interface 24, mouse interface 25, keyboard interface 26, fixed disk 6, Read Only Memory (ROM) 27, and main RAM 29.

Main RAM 29 interfaces with computer bus 16 so as to provide memory storage to CPU 15 during execution of computer-executable process steps. More specifically, CPU 15 loads process steps from fixed disk 6 into RAM 29 and executes the stored process steps from RAM 29 in order to provide a system for managing digital camera images according to the present invention.

As shown in FIG. 2, fixed disk 6 contains computer-executable process steps to provide a port monitor, a toolbox application, a shell extension module, and registry keys as described below. Fixed disk 6 also includes image processing applications, word processing applications, image files in various image formats, device drivers, other applications and other data files.

Figure 3:
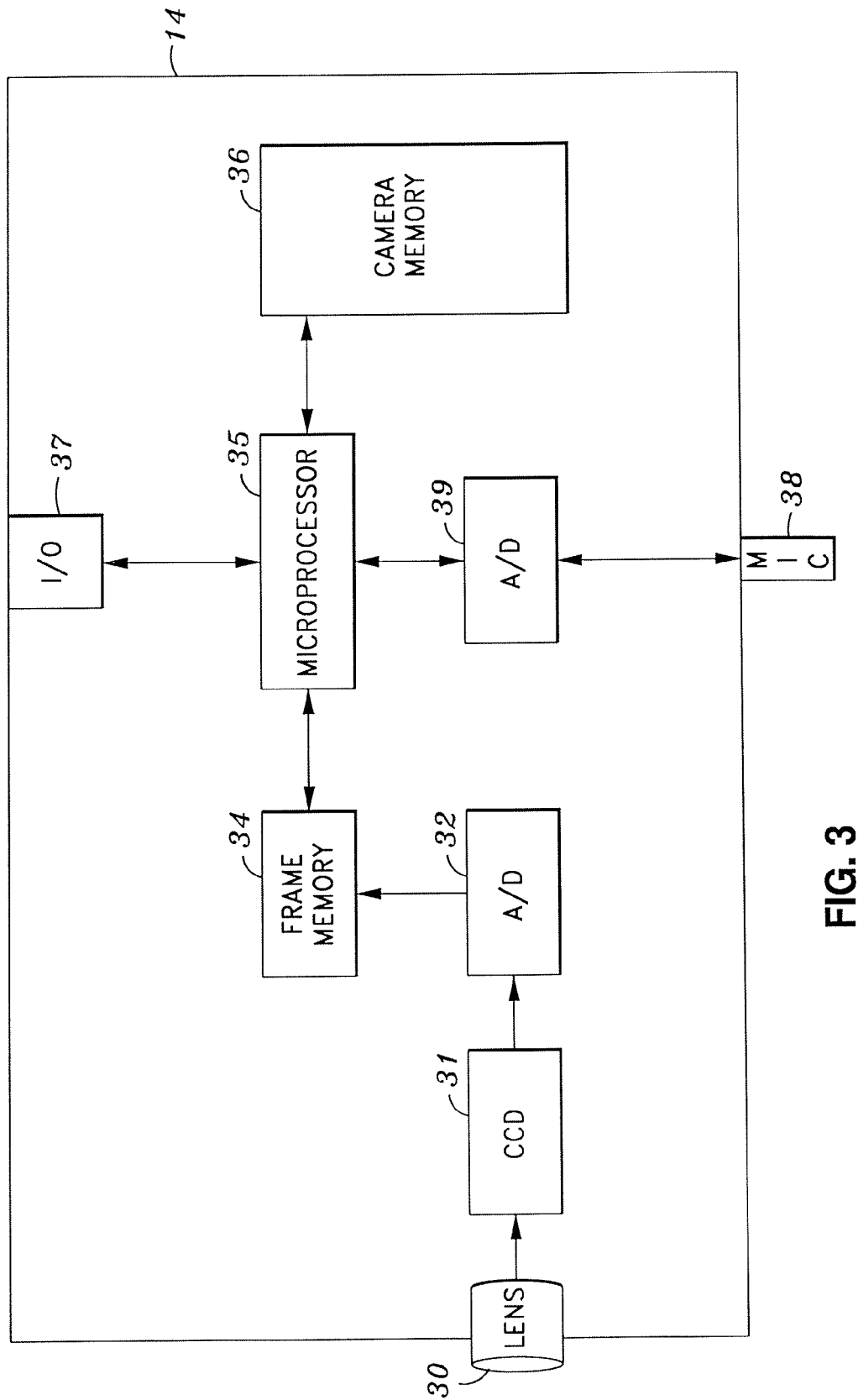
FIG. 3 is a block diagram of the internal architecture of a digital camera for use in conjunction with the present invention.

FIG. 3 is a block diagram of the internal architecture of camera 14. It should be noted that FIG. 3 shows a generic digital camera which may be used in conjunction with the present invention. Of course, other digital cameras which may be used in conjunction with the present invention may possess a more complex architecture.

Camera 14 includes lens 30 for gathering light waves from objects toward which lens 30 is pointed, charge-coupled device 31 for translating the received light waves into analog signals, analog to digital converter 32 for converting the analog signals into digital signals, and frame memory 34 for storing a single photo frame. Elements 30 to 32 and 34 are controlled by microprocessor 35, which stores a photo from frame memory 34 into camera memory 36. Files stored in camera memory 36 can be downloaded to an external device via I/O port 37. According to the preferred embodiment of the invention, and as described above, microprocessor 35 stores a captured photo in camera memory 36 as a full-resolution (1024×768) image file in JPEG format, and also as a thumbnail resolution (60×80) image file in TIFF format.

Camera 14 also includes microphone 38 for receiving analog sound waves during capture of a photo, and analog to digital converter 39 for converting the captured sound waves into digital form. It should be understood that a camera lacking a microphone may be used in accordance with the present invention. In the preferred embodiment, however, microprocessor 35 stores digitized sound files in camera memory 36 in a manner that associates a sound file or files with a corresponding full-resolution file and a corresponding thumbnail image file. For the discussion below, a set of thus-associated files is referred to as a photo group.

Port Monitor

Figure 4:
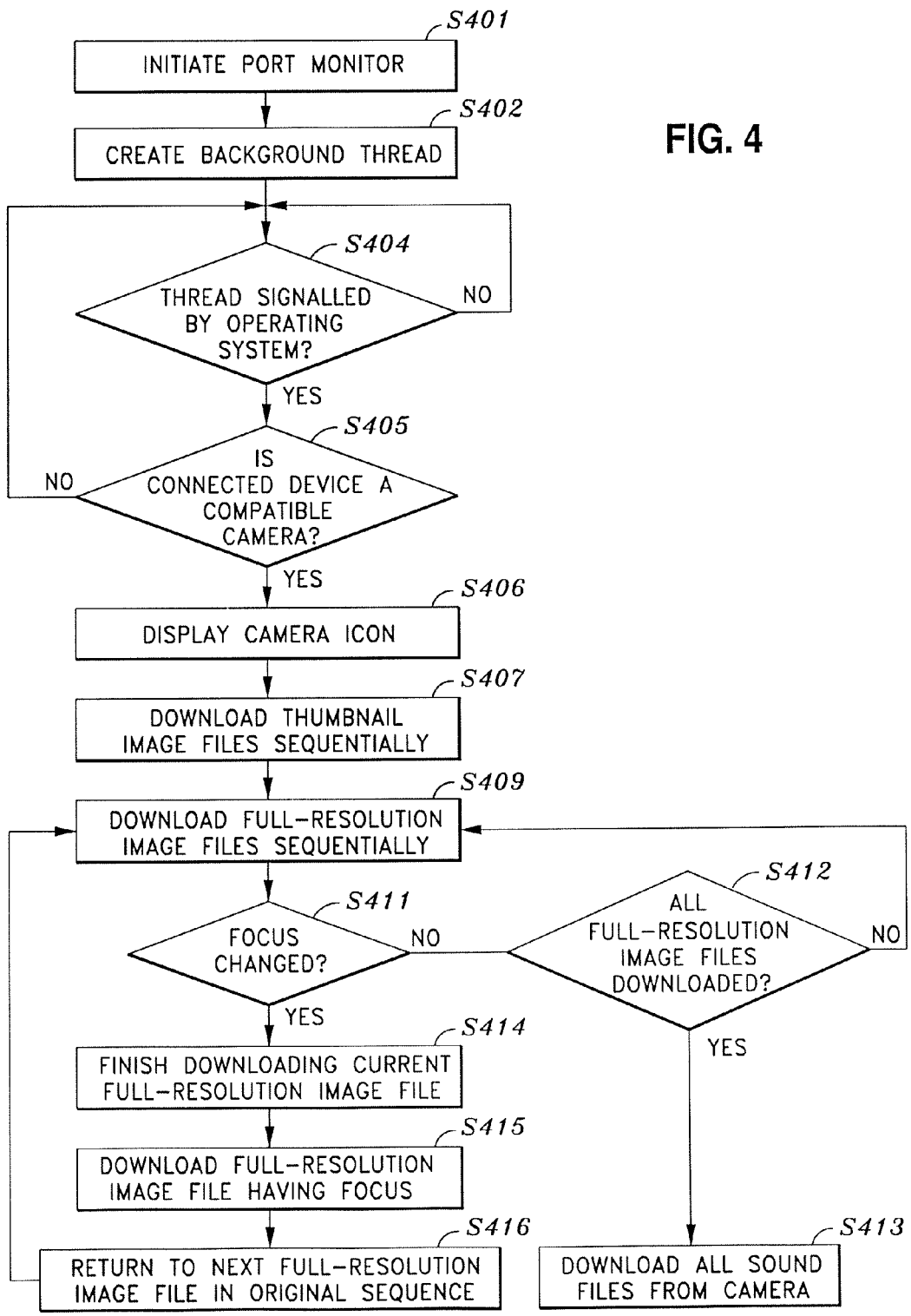
FIG. 4 is a flow diagram showing process steps of a port monitor according to the present invention.

FIG. 4 is a flow diagram for describing process steps to monitor a device port of computer system 1 for connection to a digital camera in accordance with the present invention. Briefly, the FIG. 4 process steps are used to detect a digital camera connected to a device port of a computer system, to receive thumbnail image files stored in the digital camera automatically after the digital camera is detected, and to store the received thumbnail image files in a cache memory. The FIG. 4 process steps also are used to receive full-resolution image files from the digital camera after each thumbnail image file stored in the digital camera is received, and to receive sound files from the digital camera after each full-resolution image file stored in the digital camera is received. By virtue of these steps, time required for a client application to access files stored in a digital camera is reduced.

More particularly, a port monitor application is initiated in step S401. As described above, the port monitor application may be retrieved from fixed disk 6 and stored in RAM 29 for execution therefrom by CPU 15. Next, a background thread is created in step S402. According to the Windows95 operating system, a background thread is notified by the operating system in a case that an event associated with the thread is detected. In the present example, the created background thread is associated with connection of a device to the serial port of computer system 1.

In step S404, it is determined whether the thread has been signalled by the operating system. If not, flow loops within step S404. If so, it is assumed that a device is connected to the serial port, and, in step S405, it is determined whether the device is a digital camera compatible with the present invention. If the device is not a digital camera compatible with the present invention, flow returns to step S404.

Figure 5:
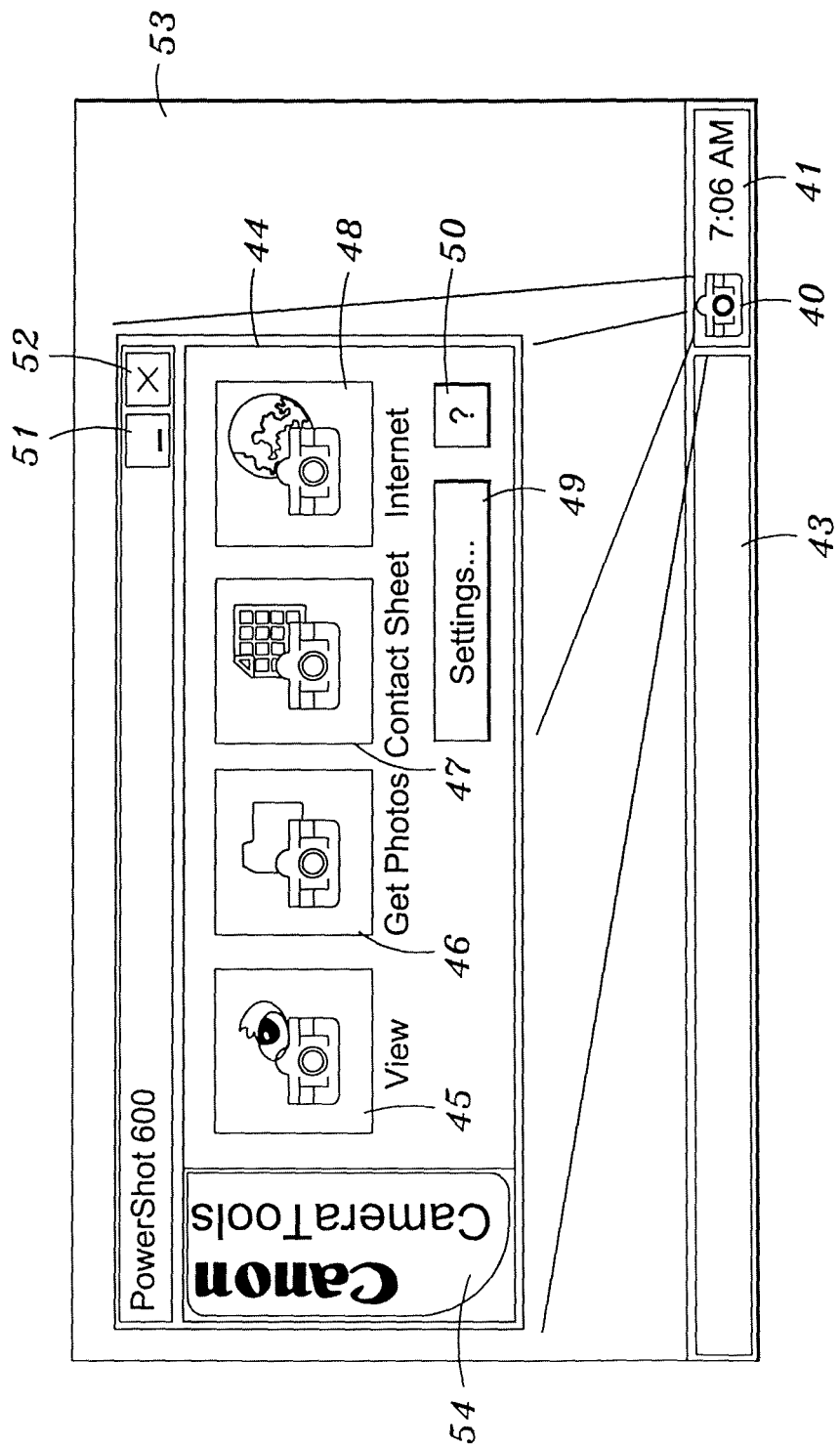
FIG. 5 is a view of an operating system desktop displaying a toolbox application user interface window according to the present invention.

If the device is determined to be a compatible camera, flow proceeds to step S406, wherein a camera icon is displayed on the Windows95 desktop. In this regard, FIG. 5 shows camera icon 40 displayed in status area 41 of desktop 53. Also shown in FIG. 5 is toolbox user interface window 44, the functionality of which will be described in more detail below. User interface window 44 includes logo area 54. After camera icon 40 is displayed, each thumbnail image file stored in camera 14 is sequentially downloaded in step S407.

In step S409, sequential download of each full-resolution JPEG image file stored in camera 14 begins. Flow then proceeds to step S411 in which it is determined whether a full-resolution image file other than the currently-downloading full-resolution image file has received focus. In this regard, focus can be received by a full-resolution image file through user selection of an icon representing the file or by user selection of a displayed thumbnail image file associated with the full-resolution image file. Display of thumbnail images for purposes of receiving focus is described more fully below. If focus has not changed, flow proceeds to step S412.

In step S412, it is determined whether all full-resolution image files in camera 14 have been downloaded. If not, flow returns to step S409. If so, flow continues to step S413, wherein all sound files stored in digital camera 14 are downloaded sequentially.

Flow therefore proceeds between steps S409, S411 and S412 until either focus changes or until all full-resolution image files are downloaded. If, in step S411, it is determined that focus has changed, flow proceeds to step S414, wherein the currently-downloading full-resolution image file is completely downloaded. Flow then proceeds to step S415, at which the full-resolution image file having focus is downloaded. Then, in step S416, the next full-resolution image file in the original sequence begun in step S409 begins to download. Flow thereafter proceeds from step S416 to step S409 and continues as described above.

In another embodiment, any associated sound files are downloaded immediately after their corresponding associated full-resolution image files are downloaded, thereby providing faster access to a complete group of associated files.

It should be noted that the port monitor controls all requests for access to files stored in digital camera 14. That is, any client application must access the port monitor in order to access files stored in camera 14. In this regard, the port monitor delivers requested files to client applications from the cache memory to which files from camera 14 are downloaded during the FIG. 4 process steps. Accordingly, it is not necessary to perform repeated downloading of a file from camera 14 each time the file is requested. As a result, processing of files stored in camera 14 proceeds quickly.

Moreover, the port monitor allows multiple client applications to simultaneously access camera files by directing requests for access from the client applications to the cache memory. Preferably, the port monitor controls such access to digital camera 14 during, as well as after, execution of steps S406 to S416. Accordingly, a client application need not wait for all files to be downloaded from camera 14 before attempting to access one of the files.

It should also be noted that the port monitor continuously monitors the serial port for disconnection of camera 14 once camera 14 is detected. In this regard, upon disconnection of camera 14 from computer system 1, the port monitor removes camera icon 40 from status area 41.

In another aspect of the preferred embodiment, the port monitor is used to detect connection of a removable camera memory card to computer system 1. In such a case, the operating system signals the port monitor in case a card is placed in a PCMCIA slot of computer system 1. The port monitor then determines whether the card is compatible with the present invention. If so, camera folders within the card are converted to canister system objects, the properties and use of which are described more fully below.

Toolbox

As described above, the port monitor displays camera icon 40 upon detection of digital camera 14. The port monitor also monitors user selection of icon 40. If icon 40 is selected, the port monitor launches a toolbox application according to the present invention. Upon launching the toolbox application, user interface window 44 of FIG. 5 is displayed on desktop 53.

Window 44 includes View button 45, Get Photos button 46, Contact Sheet button 47, Internet button 48, and Settings button 49. Toolbox window 44 also includes Help button 50, Minimize button 51 and Close button 52. Each of these buttons is described in detail below.

Figure 6:
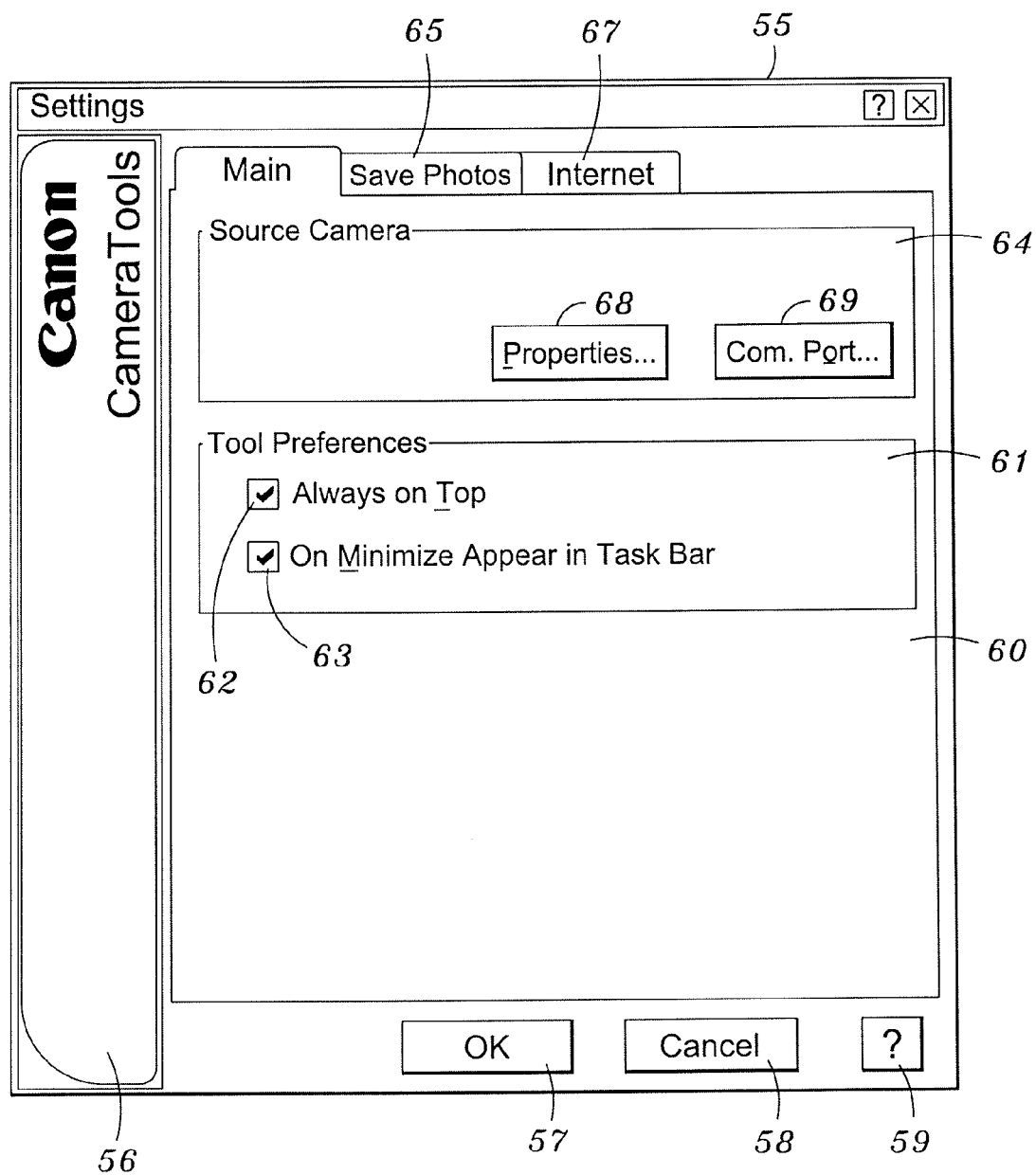
FIG. 6 is a Settings property sheet accessible through the FIG. 5 toolbox user interface.

Initially, selection of Settings button 49, which can be accomplished using either mouse 5 or keyboard 4, causes display of Settings property sheet 55 of FIG. 6. Settings property sheet 55 includes logo area 56, OK button 57, Cancel button 58, Help button 59, and three property pages. As shown in FIG. 6, Main property page 60 is initially displayed.

Main property page 60 includes tool preferences area 61 in which, by selecting check box 62, a user can control toolbox window 44 such that it is never obscured by another window concurrently displayed on desktop 53. Tool preferences area 61 also contains check box 63, which controls whether or not a toolbox icon appears in desktop task bar 43 upon minimizing toolbox window 44.

Figure 7:
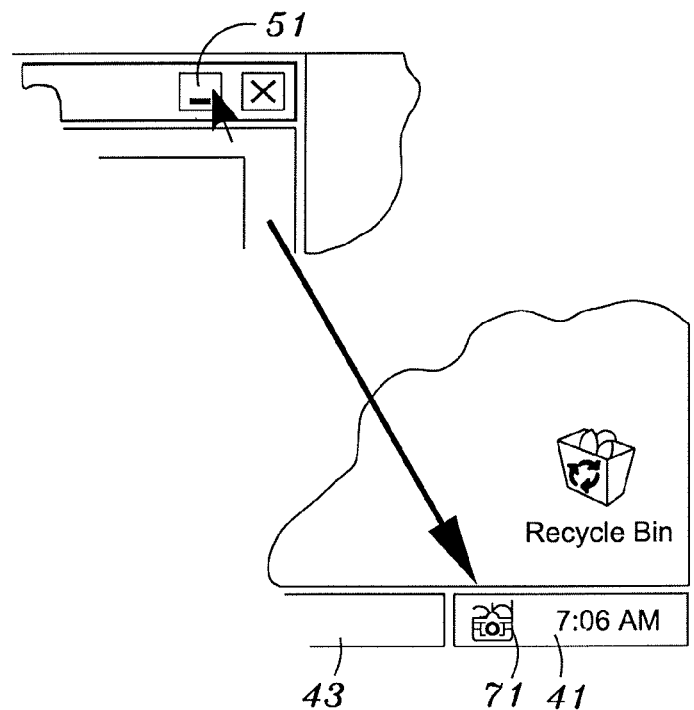
FIG. 7 is a diagram illustrating minimization of a toolbox window.
Figure 8:
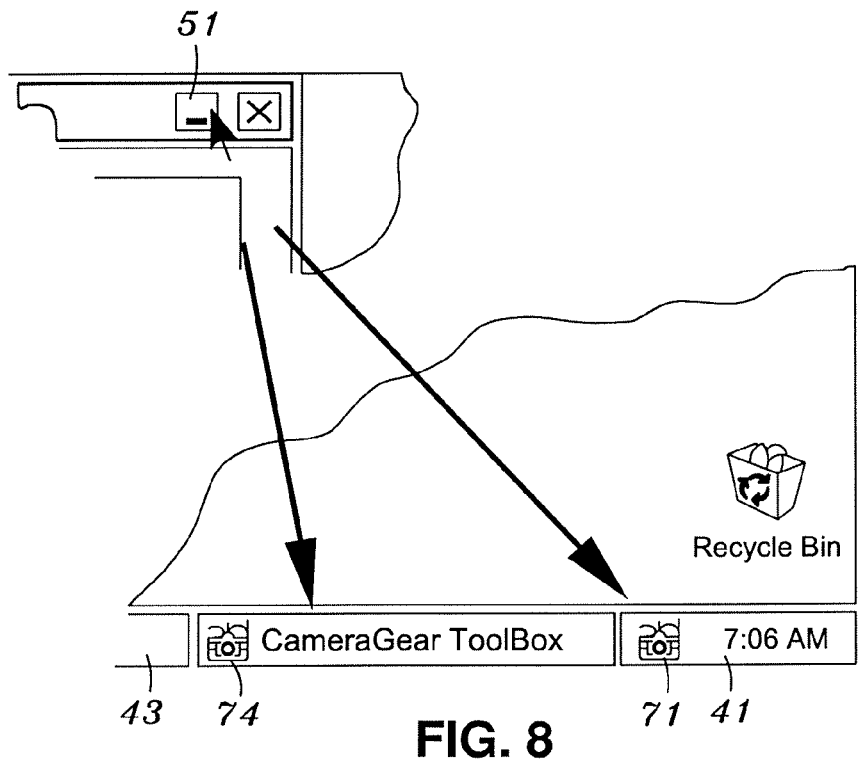
FIG. 8 is a diagram illustrating minimization of a toolbox window.

FIGS. 7 and 8 illustrate minimization of toolbox window 44 in instances where check box 63 is not checked and is checked, respectively. Specifically, in a case that check box 63 in main property page 60 is not checked and a user selects Minimize button 51, toolbox window 44 is dismissed and camera icon 71, which is displayed by the port monitor during camera detection, remains in status area 41. In this case, Close button 52 and Minimize button 51 perform identical functions.

On the other hand, if check box 63 is checked and a user selects Minimize button 51, Toolbox button 74 appears in task bar 43. Display of toolbox button 74 in task bar 43 ensures that the toolbox can be accessed using an ALT/Tab key sequence, which cycles through open applications. Also in accordance with the Windows95 operating system, a left mouse click on bar entry 74 will invoke the toolbox as the current active task, while Toolbox button 74 will remain in task bar 43 as long as the toolbox is not closed and a camera is available to computer system 1.

Figure 9:
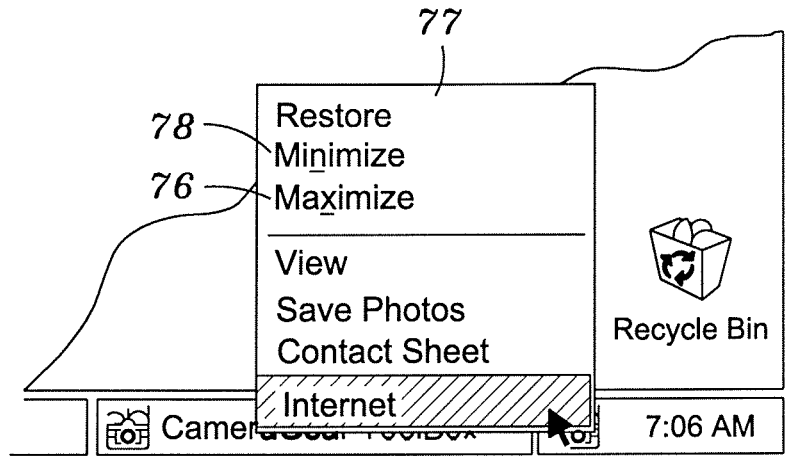
FIG. 9 is a view of a task bar context menu corresponding to the FIG. 5 toolbox application.

As described above, minimization results in at least one icon indicative of the toolbox. In a case that such an icon is selected using a right mouse click, a context menu is displayed as shown in FIG. 9. In the preferred embodiment, Maximize option 76 of menu 77 is always disabled because toolbox window 44 has only one size and cannot be expanded or contracted. Minimize option 78 will be enabled in a case that the toolbox is active and will be disabled if the toolbox is minimized. The lower four options of context menu 77 invoke processes similar to those invoked by selection of corresponding buttons 45 to 48 of toolbox window 44, which are described in detail below. It should be noted that context menu 77 does not include a close option, because the toolbox remains active as long as a camera is available to computer system 1.

Figure 10:
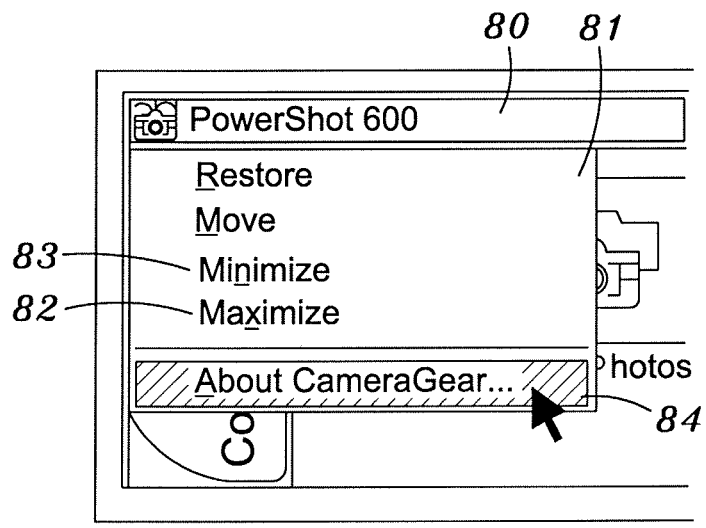
FIG. 10 is a view of a title bar pop-up menu.

Context menu 81, shown in FIG. 10, is displayed upon a right mouse click selection of toolbox title bar 80. Maximize option 82 will always be disabled because window 44 cannot be expanded or contracted. Minimize option 83 is enabled, and, if option 83 is selected, window 44 is minimized in accordance with check box 63 of Main property page 60. Selection of About Camera Gear option 84 causes display of a dialog box containing information such as camera gear toolbox name, version number, and copyright notices. Context menu 81 does not contain a Close option because the toolbox remains active as long as a camera is available to computer system 1.

Returning to Settings property sheet 55, Main property page 60 also includes Source Camera Settings area 64, in which Properties button 68 and Communications Port button 69 are displayed.

Figure 11:
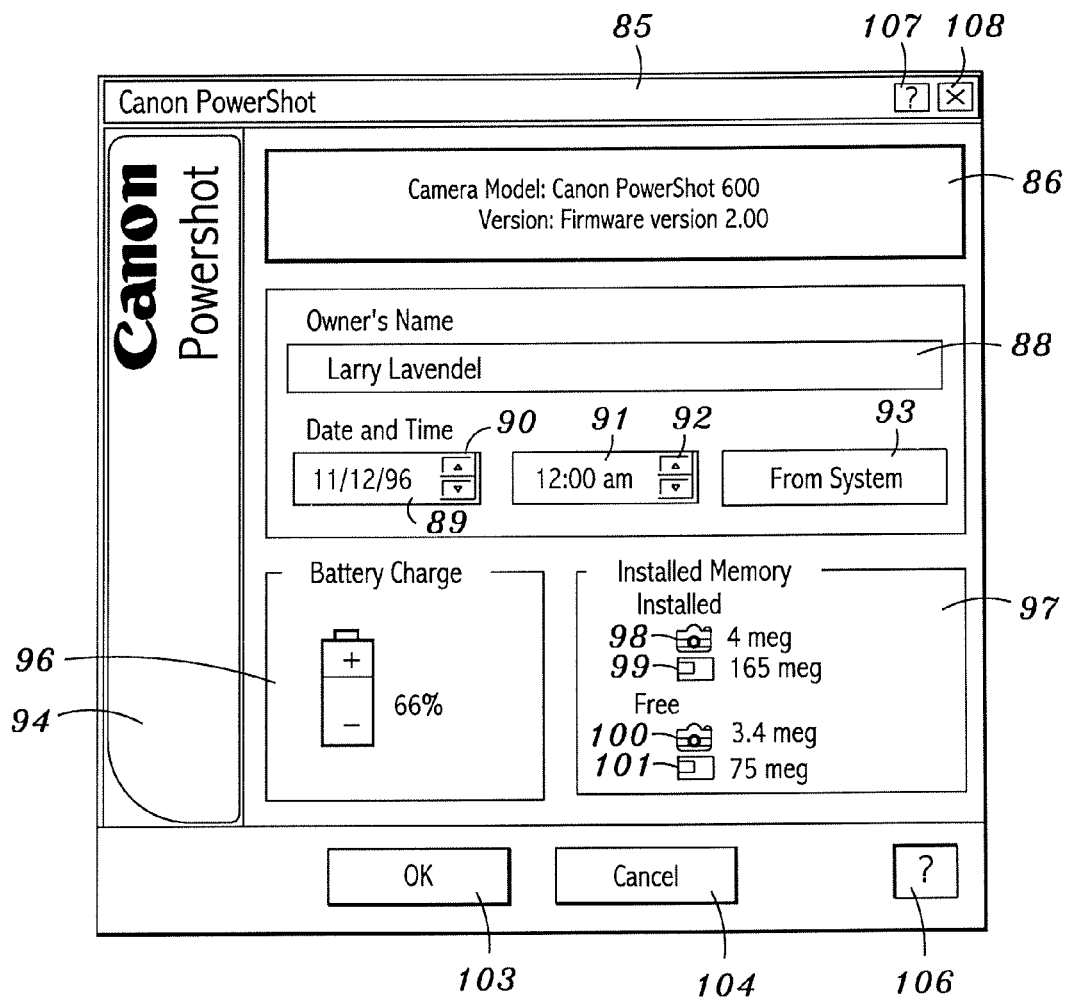
FIG. 11 is a view of a sample Settings dialog specific to a Canon® PowerShot 600® digital camera.

Selection of Properties button 68 causes display of a settings dialog corresponding to the camera detected by the port monitor. For example, FIG. 11 shows Settings dialog 85 corresponding to a Canon PowerShot 600 digital camera. As shown in FIG. 11, Settings dialog 85 includes Information area 86 in which camera model and firmware versions are displayed. Dialog 85 also includes Owner's Name area 88, in which a camera owner's name may be input, and Date and Time input areas 89 and 91 having spinner controls 90 and 92 for incrementally-changing the input date and time, respectively. The date and time may also be obtained from computer system 1 for input into areas 89 and 91 using From System button 93.

Dialog 85 also includes battery charge indicator 96 for indicating a percentage of battery power remaining in digital camera 14. Also shown are Installed Camera Memory icon 98 displayed adjacent to a numeral reflecting an amount of memory installed in digital camera 14. Icon 99 represents a removable memory card or the like within digital camera 14 and is displayed adjacent to a numeral reflecting an amount of memory storage provided by the card. Camera icon 100 is displayed adjacent to an amount of available memory in digital camera 14, while card icon 101 is displayed adjacent to an amount of available memory within the removable storage medium.

Camera settings dialog 85 also includes logo bar 94, OK button 103 for saving information entered into dialog 85, and Cancel button 104 for discarding any changes made to Settings dialog 85. Buttons 103 and 104 also cause Settings dialog 85 to be dismissed. Help button 106 provides context-sensitive help regarding dialog 85. It should be noted that auxiliary buttons 107 and 108 function similarly to buttons 106 and 104, respectively.

For the sake of brevity, descriptions of displayed logo bars, OK buttons, Cancel buttons, Help buttons, and Cancel and Help auxiliary buttons which function as described with respect to FIG. 11 will be hereinafter omitted.

Figure 12:
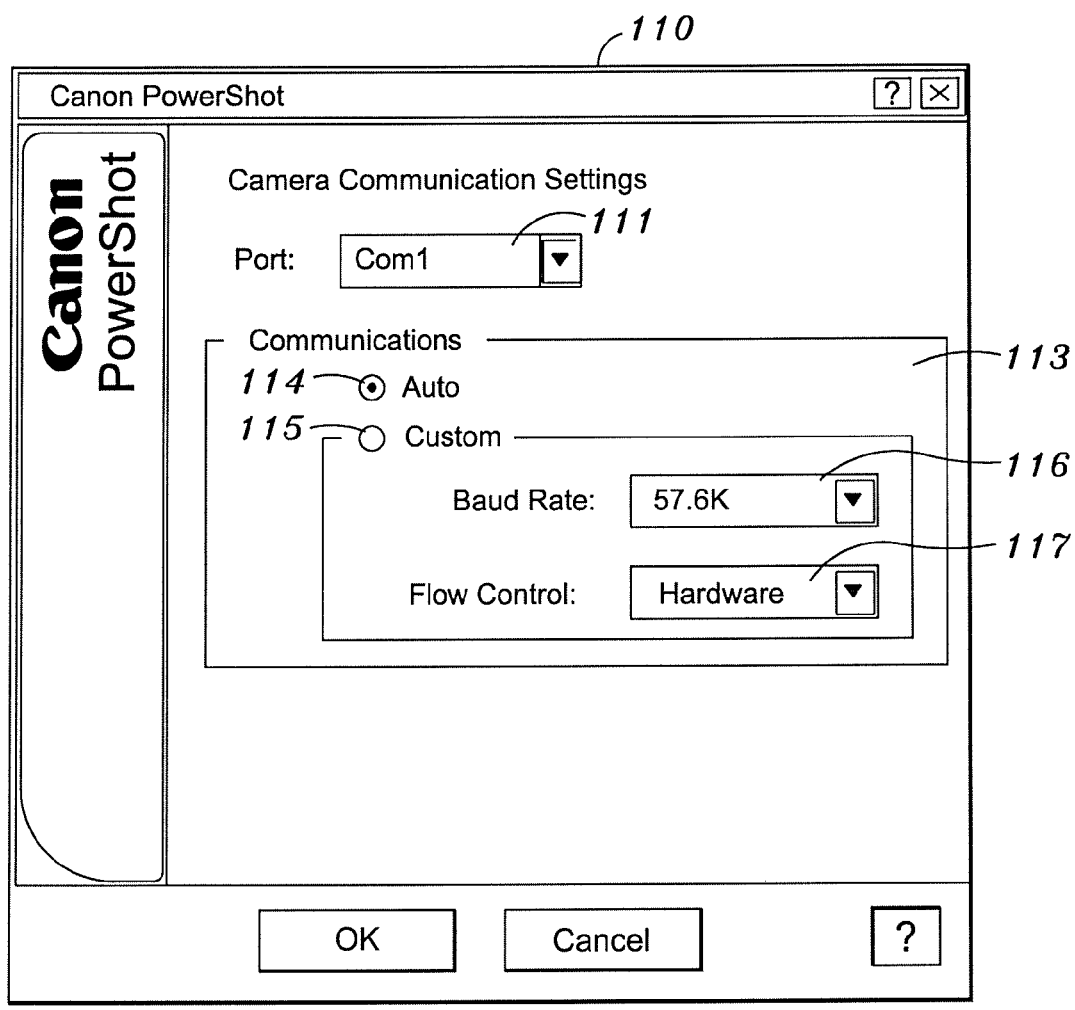
FIG. 12 is a view of a Communications Settings dialog for setting camera communication parameters.

Returning to FIG. 6, in a case that Communications Port button 69 is selected, a Camera Communications Settings dialog is displayed. Such a dialog is shown in FIG. 12. Camera Communications Settings dialog 110 includes Port input area 111 for indicating a communications port through which computer system 1 should communicate with camera 14. As shown, input area 111 includes a pull-down button for displaying a list of available communications ports. Communications area 113 includes options 114 and 115 for selecting whether automatic or custom communications settings are desired, respectively. In a case that custom communications are desired, Baud Rate area 116 is provided for inputting a desired baud rate for communications with digital camera 14. Flow Control input area 117 is also provided for indicating a type of flow control desired for communications between computer system 1 and digital camera 14. Both input areas 116 and 117 are provided with a pull-down button for displaying a list of potential baud rates and flow control mechanisms, respectively.

Figure 13:
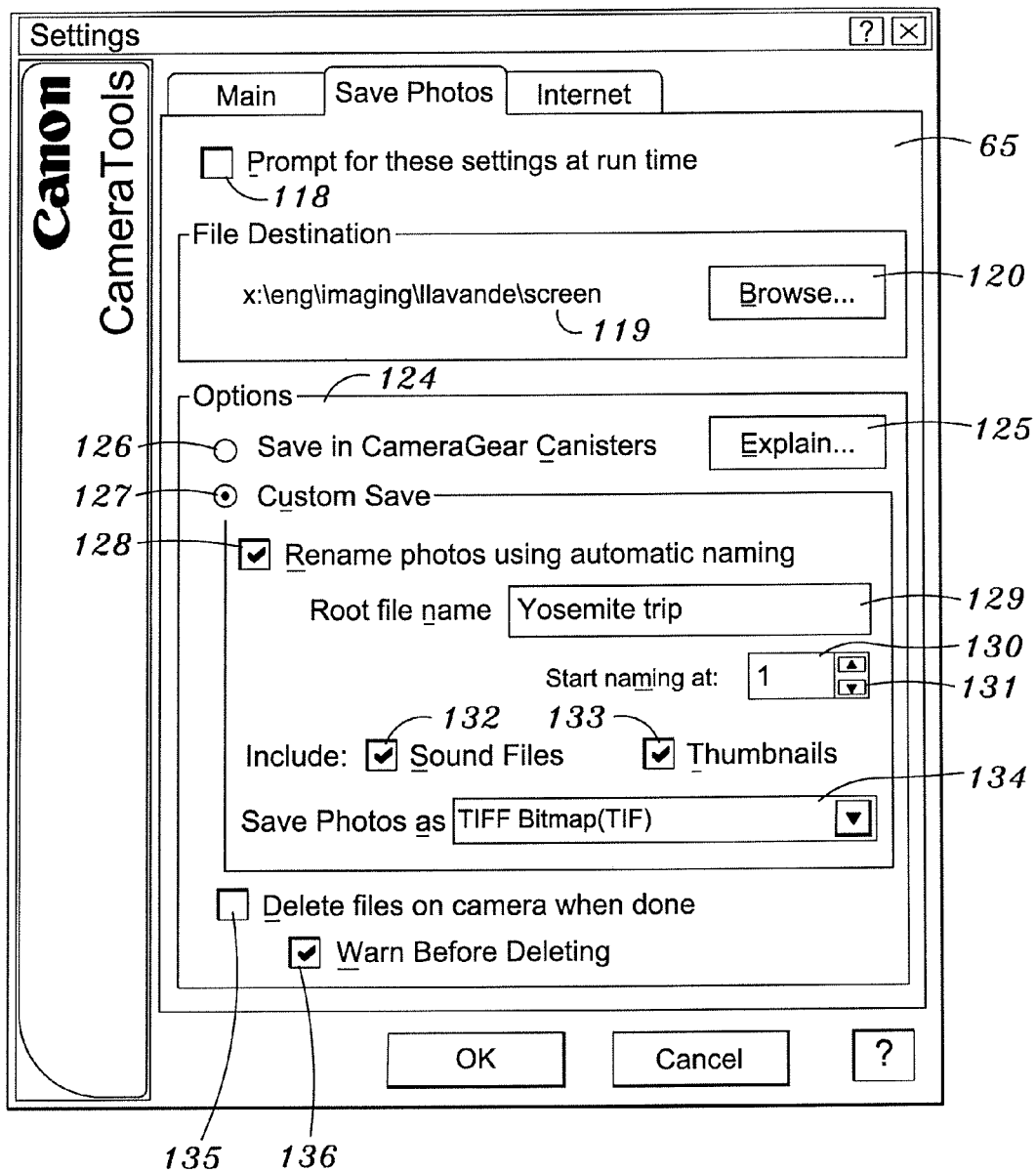
FIG. 13 is a view of a Settings property sheet with a Save Photos property page displayed.

As described above, Settings property sheet 55 includes three property pages. Save Photos property page 65 is shown in FIG. 13. Property page 65 includes check box 118 for controlling whether a dialog box with controls similar to that shown in property page 65 will be presented to a user upon selection of Get Photos button 46 of toolbox window 44. If not checked, the values set on property page 65 will govern file downloading and saving initiated by selection of Get Photos button 46.

Figure 14:
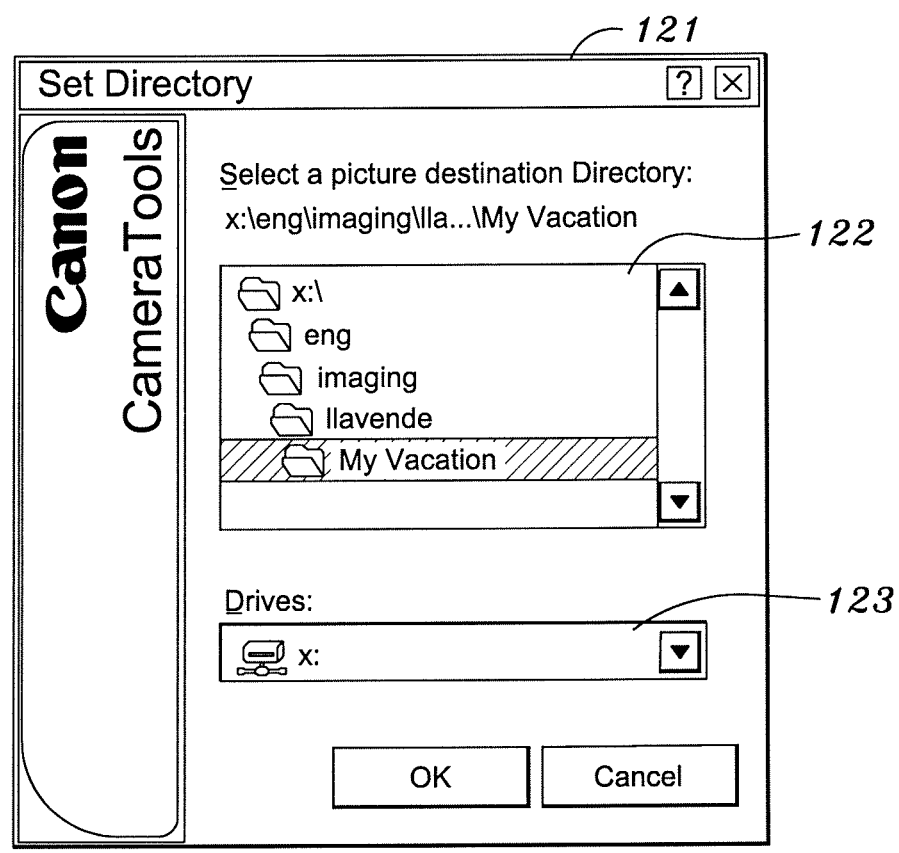
FIG. 14 is a view of a Set Directory dialog for selecting a picture destination directory.

In this regard, destination file 119 indicates the drive and directory to which files downloaded from digital camera 14 will be saved. Selection of Browse button 120 allows a user to change the destination directory by causing display of Set Directory dialog 121, shown in FIG. 14. As shown in FIG. 14, Set Directory dialog 121 includes Drive Selection area 123 for selecting a subject drive of available local and network drives, and Directory Selection area 122 for selecting a directory of the drive selected in area 123.

Returning to FIG. 13, Options area 124 allows user control over whether files are saved in canister format or as separate files. Options area 124 also provides user control over names to which files downloaded from digital camera 14 are saved, selection of files to be downloaded, format conversion, prior to saving, of full-resolution JPEG files stored in digital camera 14, and deletion of camera files after downloading. In this regard, Explain button 125 is a context-sensitive link to Help files which explain the nature of canisters as well as other controls of Options area 124.

In order to understand the nature of canisters, it should be noted that, as described above, each photo captured by digital camera 14 is stored in camera memory 36 as a photo group. Each photo group consists of an associated full-resolution image file, an associated thumbnail image file, and associated sound files, if any sound files were created during capture of the photo. According to a preferred embodiment, photo groups can exist only within a canister. Accordingly, camera 14 stores photo groups in canister format. Preferably, such a canister includes up to fifty photo groups. As described below, the present invention exploits the associations between files of a photo group in order to provide simple and flexible management of photo groups. Therefore, in order to experience many of the advantages of the present invention, any downloaded photo groups must be saved to a hard disk in canister format.

Custom Save option 127 allows actions which alter the above-described photo group canister structure. Accordingly, selection of option 126 or option 127 is mutually exclusive. In this regard, upon selection of option 126, options listed under Custom Save option 127 are disabled.

Three sets of controls are provided within Custom Save option 127. Rename Photos check box 128 can be selected in order to rename downloaded full-resolution image files, as well as associated thumbnail files and sound files (if downloaded), as they are downloaded from camera 14 for saving. If check box 128 is not checked, the downloaded files are saved with names assigned by digital camera 14. Area 129 is used for inputting a root file name for naming of downloaded files. Input area 130 is provided for assigning a number to the downloaded files having the root file name shown in area 129. In this regard, area 130 is provided with spinner control 131 for ease of use. Check boxes 132 and 133 are used to control whether associated sound files and thumbnail files are downloaded along with full-resolution image files, respectively.

Files downloaded from camera 14 using Custom Save option 127 are named in accordance with their format and the selected Custom Save parameters. Accordingly, using the parameters shown in elements 129 to 133 of property page 65, a first photo group downloaded from camera 14 will be saved as "yosemite_trip001.jpg", "yosemite_trip001.tif" and "yosemite_trip001.wav". The second photo group will be saved as "yosemite_trip002.jpg", "yosemite_trip002.tif" and "yosemite_trip002.wav".

Save Photo input area 134 determines a format to which a downloaded JPEG photo file will be converted prior to saving. Area 134 includes a pull-down button for displaying a list of possible image formats. In a preferred embodiment, the provided formats consist of: native camera format; Windows bitmap (*.bmp); JPEG (*.jpg); TIFF uncompressed (*.tif); and Flashpix (*.fpx).

Delete Files check box 135 is used to control deletion of files from digital camera 14 after downloading and saving the files. In this regard, Warning check box 136, when checked, provides a dialog to a user before any files are deleted. If box 136 is not checked and box 135 is checked, the downloaded and saved files will be deleted without any prior warning.

Figure 15:
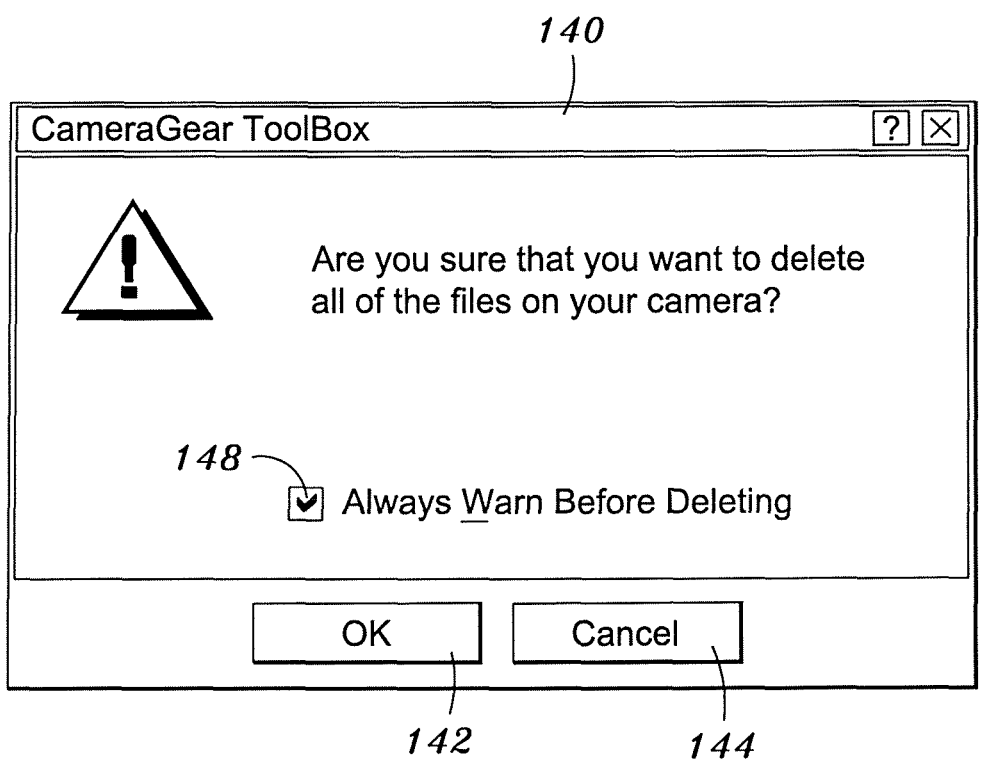
FIG. 15 is a view of a Deletion Warning dialog.

FIG. 15 shows Deletion Warning dialog 140, which is displayed after downloading and saving camera files in a case that check box 136 of property page 65 is checked. If OK button 142 is selected, the downloaded files are deleted. If Cancel button 144 is selected, the files are not deleted. Always Warn Before Deleting check box 148 controls whether dialog 140 will appear a next time camera files are downloaded. Advantageously, check box 148 and check box 136 in property page 65 are linked. As a result, either both check boxes 136 and 148 are checked or both are unchecked.

Figure 16:
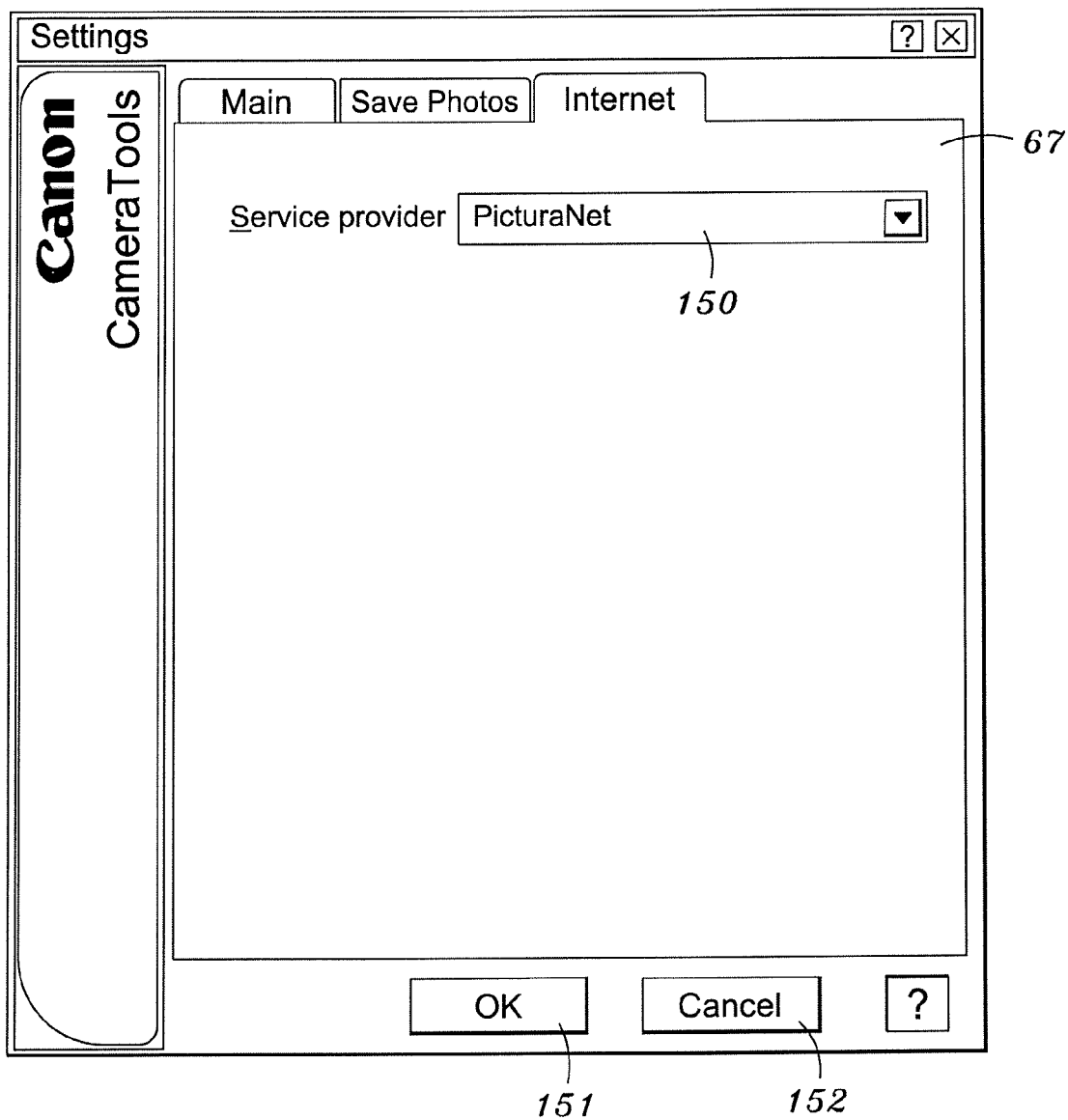
FIG. 16 is a view of an Internet property page of a Settings property sheet.
Figure 17:
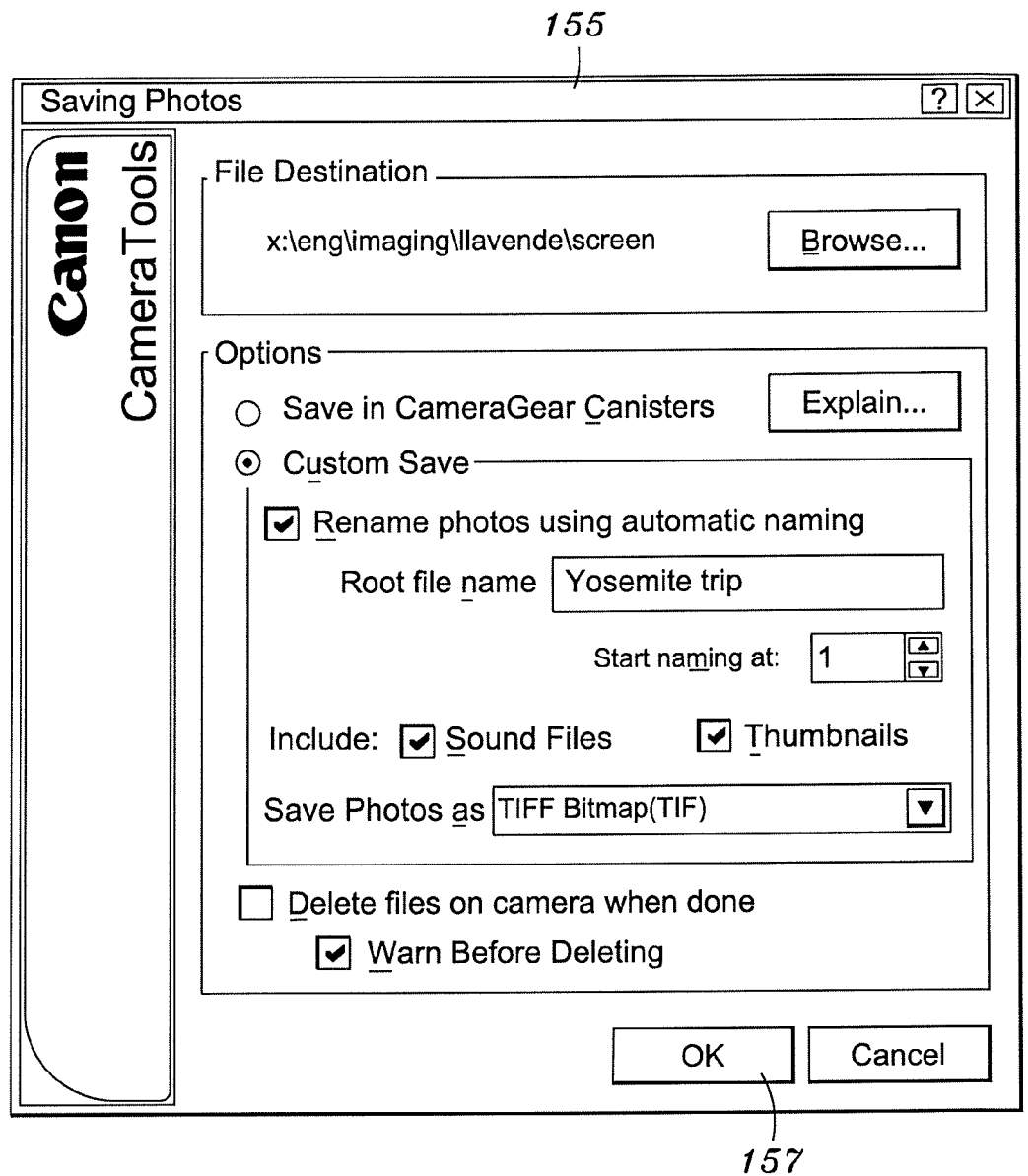
FIG. 17 is a view of a Save Photos dialog for setting photo saving parameters.

Returning to property sheet 55, internet photo property page 67 is provided for selecting an internet photo service provider for use in conjunction with Internet button 48 of toolbox window 44. As shown in FIG. 16, internet property page 67 contains Service Provider input area 150, which provides a pull-down list box of several internet photo service providers. Internet photo service providers listed in the pull-down list box preferably include major photo/image archive and service providers such as PictraNet and PhotoNet. The list of service providers in the list box is contained in a registry so that new service providers may be accessed by adding the service providers to the list through plug-ins or upgrades.

Get Photos

Figure 18:
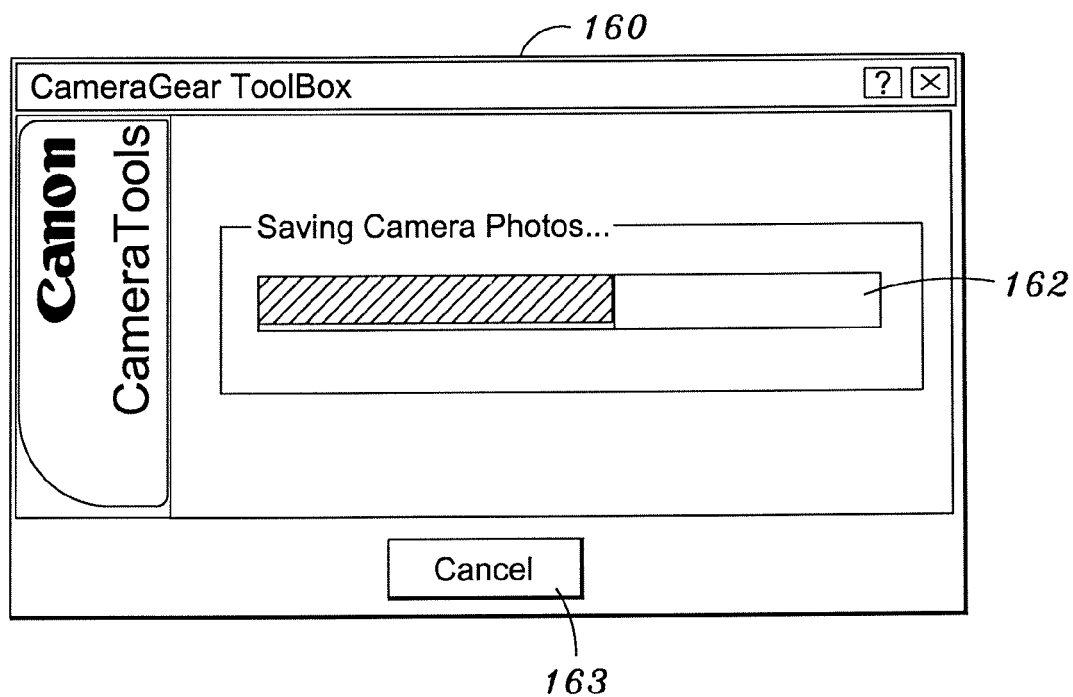
FIG. 18 is a view of a Saving Status dialog.

As described above, toolbox window 44 provides Get Photos button 46. Upon selection of Get Photos button 46, files from digital camera 14 are downloaded and saved in accordance with the parameters set in Save Photos property page 65, described with respect to FIG. 13, and dialog 160 of FIG. 18 is displayed, functioning as described below. However, if Prompt For Settings check box 118 is checked in Save Photos property page 65, Save Photos dialog 155 is presented to the user upon selection of Get Photos button 46. Dialog 155 and property page 65 are linked, therefore, upon initial display of dialog 155, each field located therein reflects the contents of Save Photos property page 65. The buttons, options, fields and check boxes of dialog 155 function similarly to their corresponding buttons, options, fields and check boxes of property page 65, therefore a description thereof is omitted at this point. In contrast, however, OK button 157 initiates downloading and saving of the selected files from digital camera 14 to the file destination shown in dialog 155.

Accordingly, upon selection of OK button 157, dialog 155 is dismissed and dialog 160 of FIG. 18 is displayed. Dialog 160 includes status bar 162, which is darkened in direct relation to the percentage of data to be saved which has been downloaded and saved. Accordingly, the dark area of indicator 162 moves from left to right of dialog 160 during downloading and saving.

Cancel button 163, if selected, aborts file downloading. In this case, all buffers and temporary files will be cleared or deleted and files already downloaded and saved to computer system 1 are deleted. In addition, dialog 160 is dismissed and toolbox window 44 remains active. Dialog 160 is also dismissed after file saving is complete.

As described above with respect to Save Photos property page 65, Warning dialog 140 is displayed after saving in a case that Warn Before Deleting check box 136, and linked check box 148, are checked.

Contact Sheet

Figure 19:
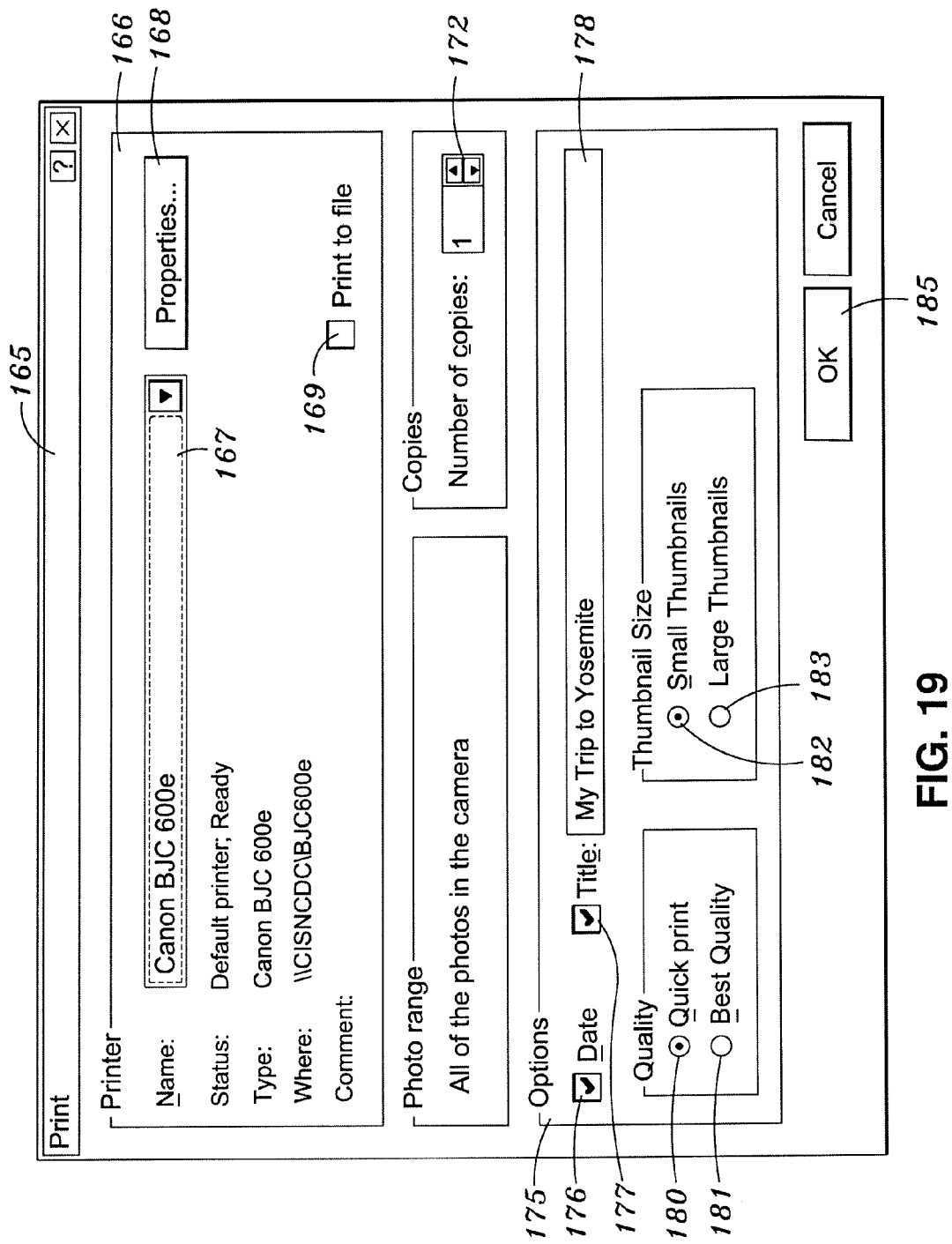
FIG. 19 is a view of a Print dialog to control printing of contact sheets according to the present invention.

Contact Sheet button 47 of toolbox window 44 allows a user to print a contact sheet of all images stored in digital camera 14. Upon selection of button 47, print dialog 165 of FIG. 19 is displayed to the user.

Contact sheets printed according to the present invention are intended to be similar to traditional contact sheets produced by conventional dark room photography. The purpose of such contact sheets is to create a quick reference to each photo on a photo storage medium, in the present case a computer-readable medium, in the latter, a roll of film. In addition, contact sheets according to the present invention can be used as a quick method for distributing printed copies of photos captured by camera 14.

Dialog 165 includes Printer Control area 166 for controlling printer 12 so as to print a contact sheet. In this regard, Printer Name input area 167 provides an area for listing a printer to be used to print contact sheets, and includes a pull-down list for displaying a list box of available printers, either local or networked. Properties button 168 provides access to printer-specific property sheets for control of printer properties. In addition, check box 169 allows a user to indicate that a print job should spool to a file rather that to the printer listed in Printer Name input area 167.

Spinner control 172 controls a number of contact sheet copies to be printed. Options area 175 allows a user to set several options for printing contact sheets. For example, check boxes 176 and 177 within Options area 175 allow a user to indicate the date of printing and a title to be printed on the contact sheet. In this regard, title information is input in Title input area 178. Options 180 and 181 are mutually exclusive and provide a user, respectively, with lower-quality, high-speed output and high-quality, lower-speed output. Similarly, mutually exclusive options 182 and 183 respectively provide a user with printout of small thumbnail images and large thumbnail images on contact sheet.

Figure 20:
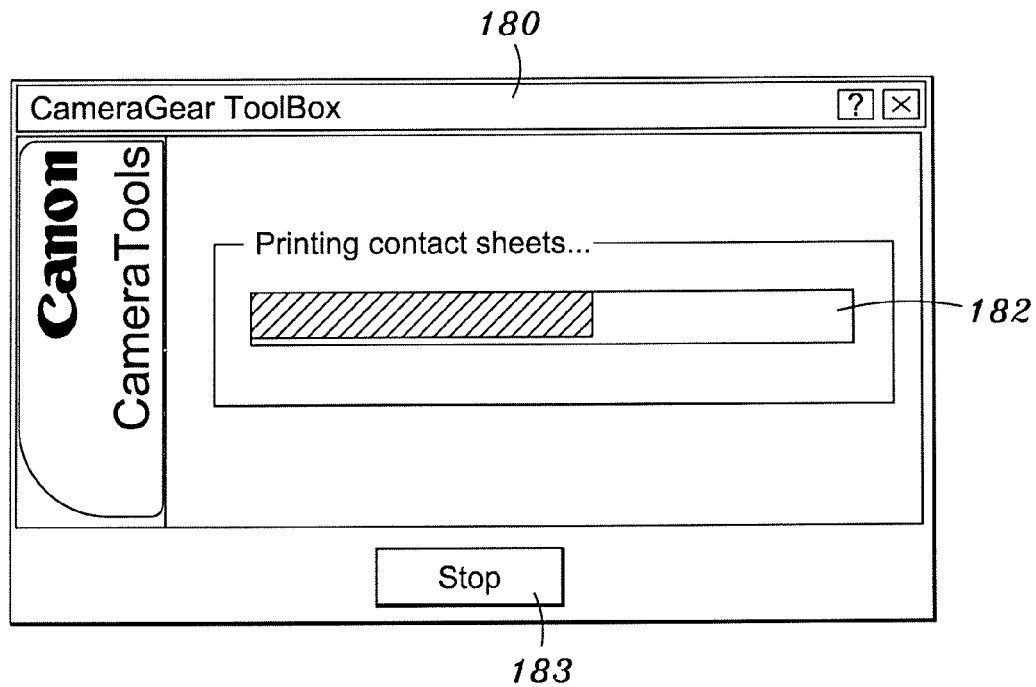
FIG. 20 is a view of a Printing Status dialog.

Selection of OK button 185 initiates printing of a contact sheet in accordance with the parameters set in print dialog 165. During contact sheet printing, dialog 180 of FIG. 20 is displayed. Dialog 180 includes status bar 182, which shows a darkened area corresponding to a print job completion percentage. Stop button 183 can be selected to abort contact sheet printing. If selected, all buffers and temporary files are cleared or deleted and the print driver/spooler is instructed to abort printing. In this case, dialog 180 is dismissed and toolbox window 44 remains the active application. Dialog 180 is also dismissed after the system sends a last contact sheet to printed to the printer/spooler. Layout of printed contact sheets will be described in more detail below with respect to FIG. 41.

Internet

Toolbox window 44 also provides Internet button 48 for uploading camera files to an internet photo service provider providing storage and display of photographic images via the WWW. Upon selection of button 48, the internet service provider specified in Internet property page 67 is contacted and a request for uploading of photos is initiated. Thereafter, the internet photo service provider will provide a user with a login dialog and/or other setup dialogs. The present invention provides required upload information such as file location and number of files. Preferably, in a case that Internet button 48 is selected and no internet photo service provider is specified in Internet property page 67, Settings property sheet 55 will be displayed to the user with Internet property page 67 of FIG. 16 selected. If Cancel button 152 of property page 67 is selected, the Internet toolbox task is aborted and Settings property sheet 55 is dismissed. If OK button 151 is selected, the PhotoNet task continues by connecting with the specified internet photo service provider and by proceeding as described above.

Figure 21:
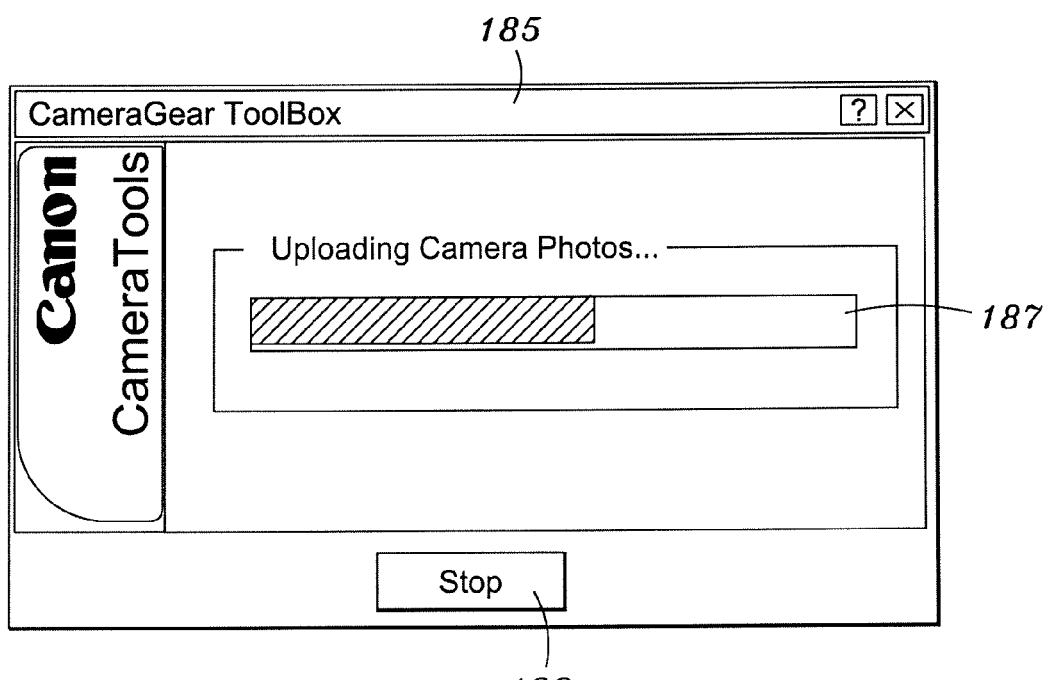
FIG. 21 is a view of an Uploading Status dialog.

During file upload, Uploading Status dialog 185 of FIG. 21 is displayed with status bar 187 indicating percent completion of uploading. Stop button 188 can be used to abort the file upload. In this case, all buffers and temporary files will be cleared or deleted, and the files already sent to the connected internet photo service provider will not be deleted. The toolbox will remain the active application. Status dialog 185 is dismissed once upload is completed. It should be noted that in a case that the connected internet photo service provider provides a file upload status dialog, it will be displayed; dialog 185 is provided as a default.

View

Figure 22:
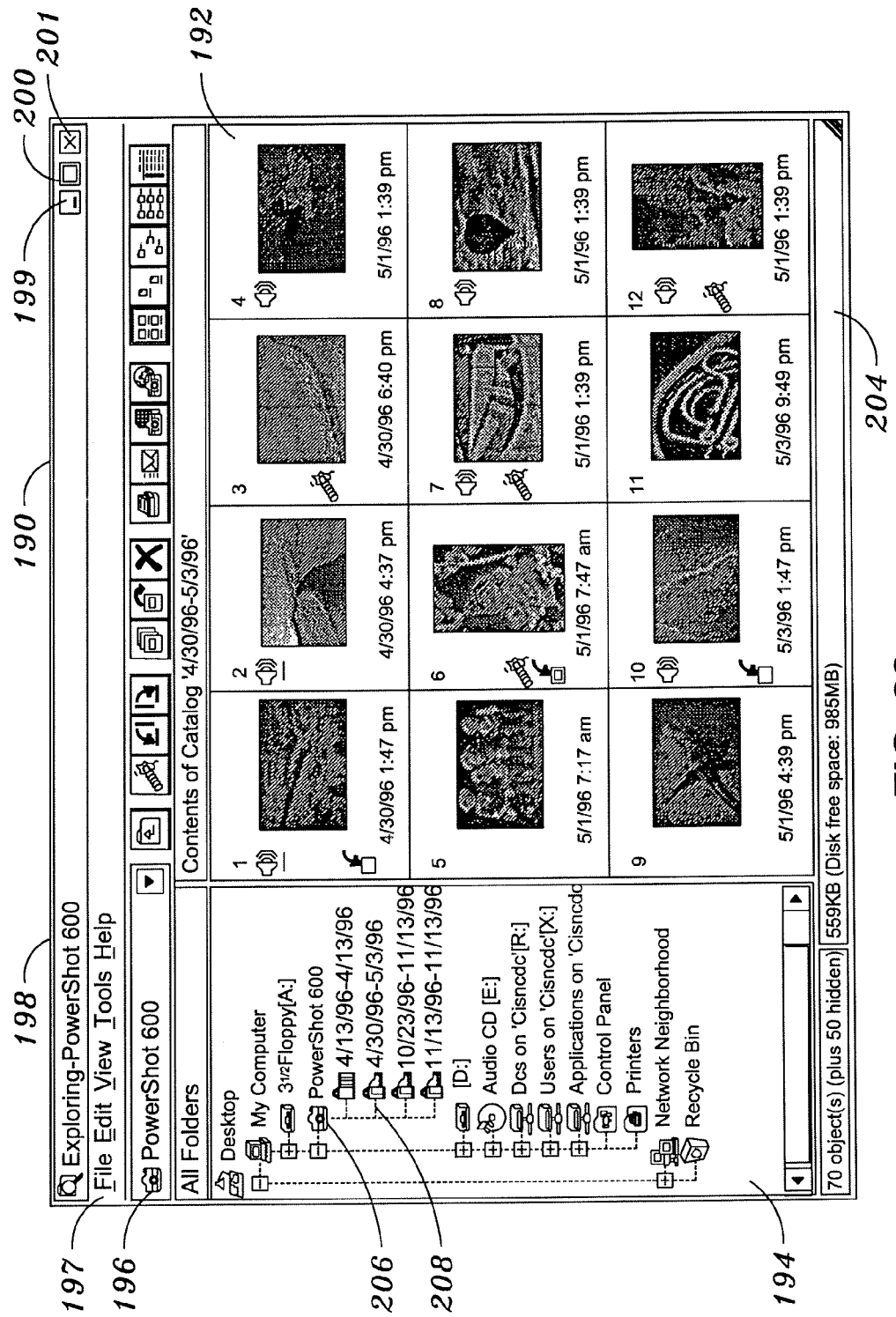
FIG. 22 is a view of a Windows95 Explorer user interface according to the present invention.

View button 45 of toolbox window 44 provides a user with a view of files stored on camera 14. Explorer user interface 190 of FIG. 22 shows an example of such a view. The elements and creation of interface 190 are described below with respect to the Shell Extension Module section of the present application.

As is evident by the foregoing description, the toolbox application provides simple and fast manipulation of files stored on digital camera 14. Although the functionality of the toolbox is less than that provided by the Shell Extension Module described below, the toolbox is intended to provide fast and simple control over common camera-related functions.

Preferably, the toolbox accesses digital camera 14 through the port monitor described above. In this case, requests for access from the toolbox to camera files are diverted by the port monitor to the cache memory to which the port monitor downloads camera files upon detection of the camera. Accordingly, utilization of the toolbox application in conjunction with the port monitor provides even faster functionality.

Shell Extension Module

Generally, a shell extension module according to the present invention allows a user to browse files stored on camera 14 intelligently. That is, according to the present invention, a user is able to distinguish and separately manipulate associated thumbnail image files, full-resolution files, and sound files located on camera 14 in a manner similar to manipulation of typical data files using the Explorer interface or any other interface for viewing system objects. Moreover, in conjunction with above-described port monitor, such viewing and manipulation proceeds quickly without need to download a file from camera 14 each time a command related to that file is issued.

In this regard, user interface window 190 includes viewing area 192, system object tree area 194, toolbar 196, menu 197, title bar 198, Minimize button 199, Maximize button 200, Close button 201, and status bar 204. As shown in FIG. 22, PowerShot 600 icon 206 is the current system object, and contains four film canisters. Canister 208 is selected, therefore viewing area 192 reflects the contents of canister 208. Since Explorer user interface window 190 is in Display Thumbnails mode, thumbnail image files stored in canister 208 are displayed in viewing area 192. Other display modes will be described below.

In Display Thumbnails mode, each blocked area surrounding and including a displayed thumbnail image file of a photo group contains information indicative of the file and of associated files of the photo group. In this regard, Display Thumbnails mode is preferably invoked only when a canister is selected from area 194, because, as described above, thumbnail image files, full-resolution files, and sound files are associated as photo groups only when existing within a canister. Advantageously, although each blocked area of viewing area 192 represents a single captured photo to a user, each blocked area allows individual manipulation of files of a photo group representing the captured photo.

Due to the reliance of interface 190 on the definition of photo groups within a canister, files in canisters preferably cannot be renamed. Furthermore, canisters in cameras cannot be renamed, although canisters located on other storage devices may be renamed.

The thumbnail view shown in viewing area 192 consists of displayed 60×80 pixel thumbnail images representing each photo group in a selected canister. FIGS. 23 and 24 are close-up views of blocked areas representing photo groups as displayed in Display Thumbnails mode. Blocked area 210 shows a 60×80 pixel thumbnail image of a photo group represented by blocked area 210, and numeral 212 indicates an identification number of the photo group within camera 14. In this regard, photo group 5 was created after photo group 4 and prior to photo group 6. In a case that a photo group is deleted from camera 14, the remaining photo groups are renumbered to exclude the deleted photo group each time a camera or canister is deselected then re-selected.

Preferably, photo groups within a camera are numbered sequentially across canisters. For example, the first photo group in camera 14 is designated photo group 1 within canister 1, and photo groups 51, 52, and 53 represent the first, second and third photo groups within canister 2. On non-camera devices, photos are numbered individually by canister so that each canister contains photo groups numbered from 1 to the total number of photo groups within the canister. Accordingly, photo groups may have to be renumbered when transferred, in canister format, from a camera to a non-camera device.

Photo name 215 preferably indicates the date and time that the represented photo group was created.

FIG. 24 shows various icons that may be displayed along with thumbnail image 211 within a blocked area representing a photo group. In this regard, blocked area 220 contains Sound icon 222, Auto-Correct icon 223, and Acquired icon 224. Sound icon 222 indicates that photo group 5, represented by blocked area 220, contains one or more associated sound files. Preferably, double clicking sound icon 222 causes the associated sound files to play in sequence.

Auto-Correct icon 223 indicates that thumbnail image 211 is displayed after being subjected to an Auto-Correct function. The Auto-Correct Correct function will be described below with reference to toolbar 196.

Acquired icon 224 indicates that photo group 5 has been downloaded from camera 14 to another storage device or that its associated full-resolution image file has been inserted into an application. Each photo group within camera 14 will hold its "acquired" state until the current installation of interface 190 is quit, until memory 36 of camera 14 is erased, or until camera 14 is disconnected from computer system 1. It should be noted that Acquired icon 224 is displayed only in cases where a camera-stored canister is being viewed in area 192 because photo groups within canisters located on other storage devices have, by definition, already been acquired.

Viewing area 192 not only provides a user with easily-accessible and detailed information regarding photo groups stored within a digital camera, viewing area 192 also provides a user with means to manipulate photo groups or associated individual files therein. For example, a thumbnail image displayed in area 192 may be selected and dragged to a storage device shown in area 194 or elsewhere on desktop 53. This action will cause a full-resolution image file related to the selected thumbnail image file to be copied to the storage device or desktop 53. In addition, holding down a left button of mouse 5 while dragging will move the full-resolution file to the storage device or desktop 53 and delete the corresponding photo group from camera 14. Moreover, holding down a right button of mouse 5 while dragging will cause the full-resolution file to be copied or, if dragged to desktop 53, will create a shortcut to the full-resolution file on camera 14.

Similarly, individual sound files within photo groups may be dragged and dropped as described above by selecting and dragging a displayed sound icon. In addition, an entire photo group may be dragged and dropped as described above by selecting an area within a blocked area representing a photo group but outside the displayed thumbnail image and by performing drag and drop as described above. In a case that an entire photo group is dragged and dropped in this manner, the related files of the photo group will lose their representation as a single entity and will be copied (or moved) as separate files. Accordingly, subsequent selection of these files will not invoke an Explorer view according to the present invention, such as that shown in FIG. 22.

Photo groups may also be dragged and dropped into OLE2-compliant applications, such as Microsoft Word, PowerPoint, FrontPage, or the like. In such cases, only the full-resolution image file of a photo group is dropped into the application.

It should be noted that, according to the preferred embodiment, dragging objects to a location within a storage device causes the file to be moved. On the other hand, dragging objects from one storage device to another causes the objects to be copied.

Photo groups are selected by clicking any area of the blocked area representing the photo group except for the sound icon. By holding down the Shift key during selection, a contiguous selection of photo groups is made from the currently-selected photo group to the last previously-selected photo group. Holding down the Control key while selecting various photos allows a user to individually select photos in a non-contiguous manner. In addition, selection of the photos may be toggled while the Control key is pressed down by clicking with the left button of mouse 5.

Double clicking on a displayed thumbnail image file launches an OLE image container application and opens an associated full-resolution image file within the application. Alternatively, double clicking of a displayed thumbnail image file launches a JPEG default application specified by the system registry and opens an associated full-resolution file therein. Advantageously, and in order to preserve the association between a thumbnail image file and a full-resolution image file of a photo group, the full-resolution image file opened in the application will be read-only, and can be saved only to a non-camera device.

A shell extension module according to the present invention also supports context menus activated by selection of a photo group using the right mouse button of mouse 5. In this regard, FIG. 25 shows context menu 230, which is displayed upon right button clicking on a photo group. The Windows95 standard context menu options displayed in menu 230, Open with, Send to fax recipient, Send to mail recipient, Send to mail recipient using Microsoft Outlook, Send to Web Publishing Wizard, and Print result in standard behavior according to Windows95. Play Sound option 232, when selected, is equivalent to double clicking upon a displayed sound icon. In this regard, in a case that a user right clicks on a photo group which does not contain any related sound files, Play Sound option 232 will be disabled.

Figure 26:
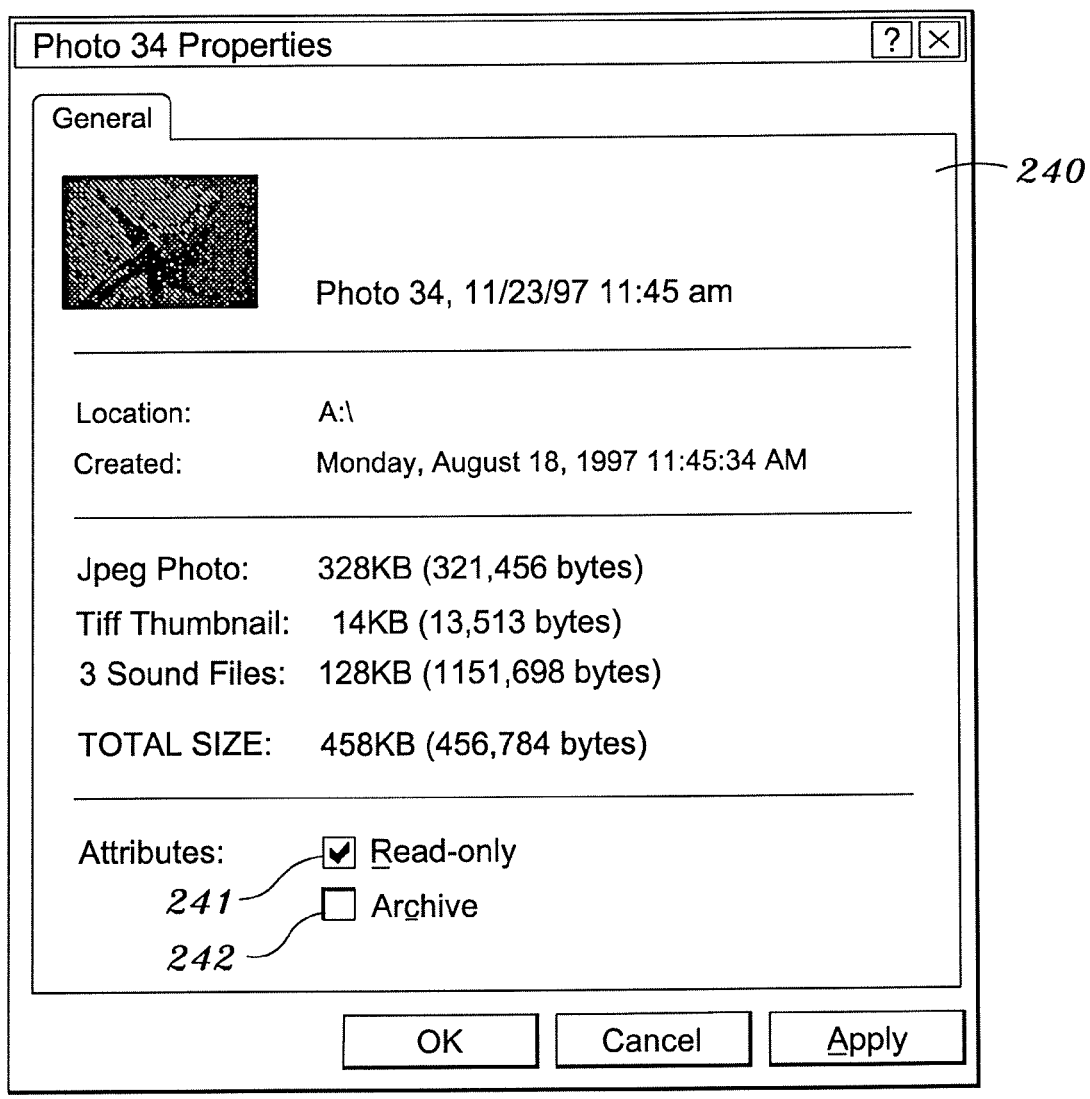
FIG. 26 is a view of a Photo Group property page.

Selection of Properties option 234 causes display of one of two types of property pages. First, in a case that one photo group is selected, property page 240, shown in FIG. 26, is displayed. As shown, property page 240 contains a displayed thumbnail image file of the selected photo group, the photo group number, the photo group name, the location of the selected photo group, and the date on which the photo group was created. In addition, property page 240 provides details on the size of the associated files within the photo group as well as the total size of the photo group. Check boxes 241 and 242 are provided to selectively choose between read-only and archive file types.

Figure 27:
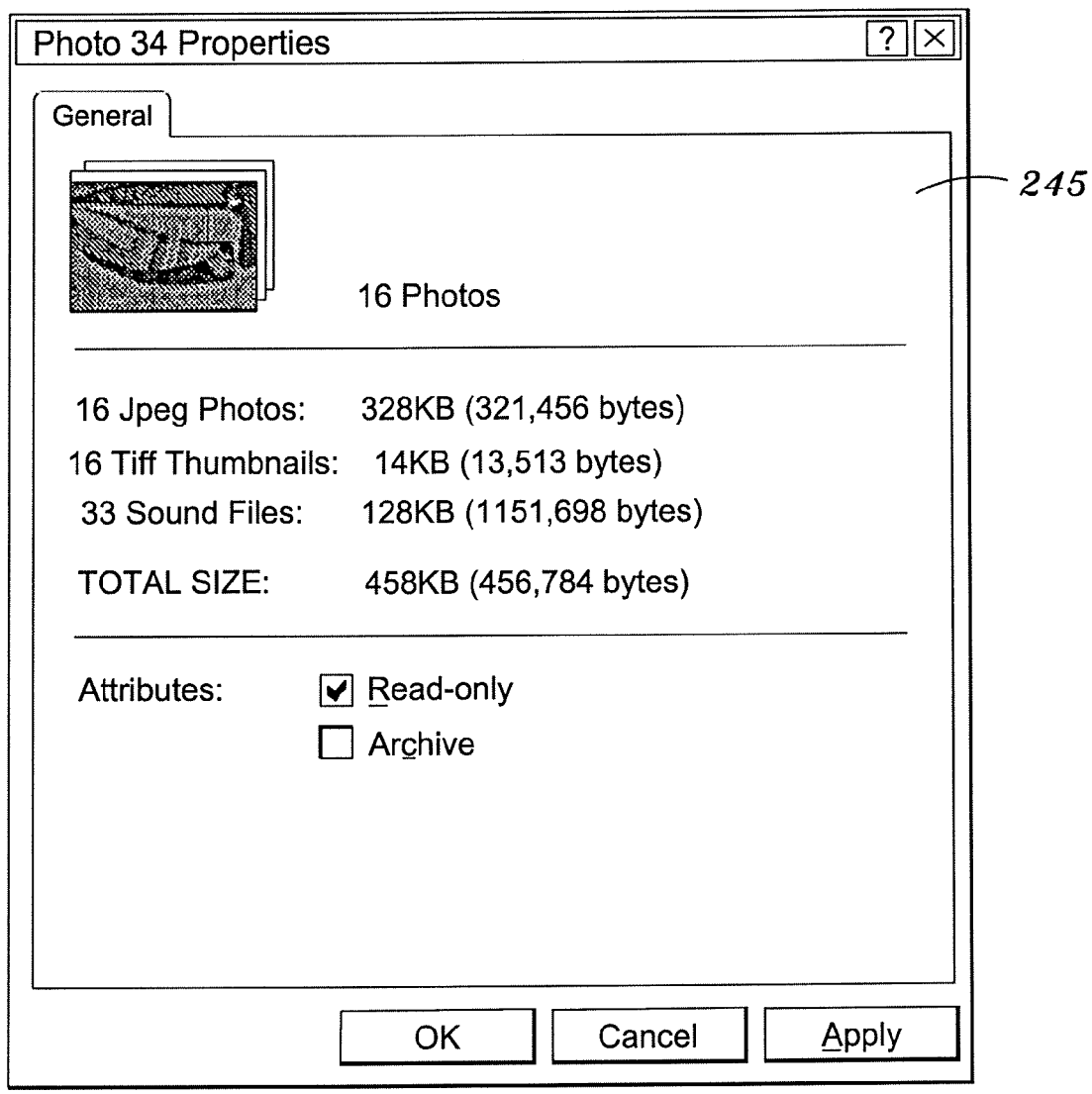
FIG. 27 is a view of a Multiple Photo Group property page.

In a case that Properties option 234 is selected while multiple photo groups are selected, a property page such a property page 245 of FIG. 27 is displayed. As shown, property page 245 shows cascading thumbnail images representing each selected photo group, the number of selected photo groups, the total size of all full-resolution image files in the selected groups, of all thumbnail image files in the selected groups, of all sound files in the selected groups, as well as the total size of all the selected groups.

Other options shown in context menu 230 may also be selected through icons displayed in toolbar 196 and will therefore be described with respect to toolbar 196.

Figure 28:
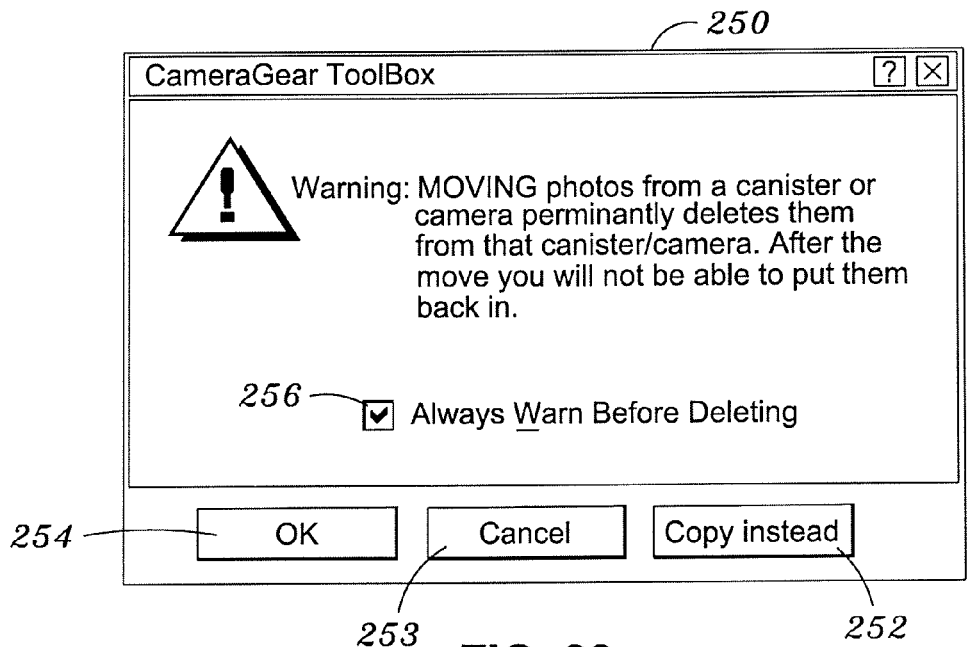
FIG. 28 is a view of a Moving Warning dialog.

It should be noted that all canisters, whether located on a camera or on another storage device, are preferably read-only and that, accordingly, no files can be dropped onto a canister, or moved or copied within or into a canister. Therefore, when files are selected to be moved out of a canister to another storage device, dialog 250 of FIG. 28 is displayed. Dialog 250 contains a warning regarding moving files from a canister as well as from a camera. Accordingly, dialog 250 is displayed in a case that files are selected to be moved out of a canister or out of a camera. Dialog 250 provides Copy Instead button 252, which causes the selected files to be copied to their selected destination rather than moved. Accordingly, the selected files will remain in the camera or canister from which they were selected.

Cancel button 253 terminates the move command and the selected files will remain in the camera or canister. OK button 254 causes the move to continue and the moved files will be deleted from the camera or canister. Check box 256 may be de-selected so that subsequent attempts to move files from a canister or camera will not cause dialog 250 to appear.

Figure 29:
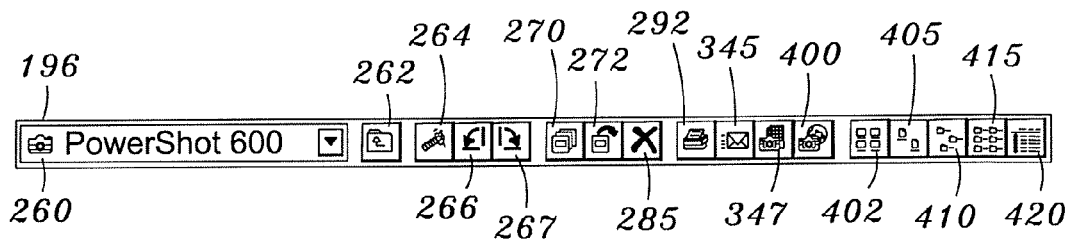
FIG. 29 is a view of a Windows95 Explorer toolbar according to the present invention.

FIG. 29 is a detailed view of toolbar 196. It should be noted that toolbar 196 is displayed during viewing of a canister or camera contents by virtue of the shell extension module. Toolbar 196 includes Object Selection area 260, in which a system object from area 194 is represented. Toolbar 196 also includes Parent Directory button 262 for providing a view of a parent folder of a folder currently displayed in viewing area 192.

According to a preferred embodiment of the present invention, toolbar 196 includes Auto-Correct button 264. Auto-Correct button 264 is active in a case that one or more photo groups are selected in viewing area 192, and is disabled in a case that no photo groups are selected. Button 264 acts as a toggle switch in that selected photos are marked for auto-correction once button 264 is depressed. If selected photos have previously been marked for auto-correction, the photos are unmarked upon depression of button 264. Moreover, selection of previously-marked photos causes button 264 to be displayed in a depressed state, and selecting any unmarked photos causes button 264 to be displayed in an undepressed state. In a case that several photo groups are selected in which some selected photo groups are marked for photo correction and others are not marked, button 264 will be displayed in an undepressed state and subsequent selection of button 264 will result in all of the selected photos being marked for auto-correction.

Moreover, in Display Thumbnails mode, thumbnail image files marked for auto-correction will be subjected to auto-correction, therefore the marked thumbnail image files displayed in area 192 will be auto-corrected and displayed adjacent to icon 223 of FIG. 24. It should be noted that such correction is preferably applied to a corresponding thumbnail image file stored in the cache memory to which the port monitor downloads camera files, rather than to the actual thumbnail image file stored within a subject canister. Moreover, in a case than an auto-corrected thumbnail image file is selected and dragged to an application or other storage device, auto-correction is performed on the associated full-resolution image file, which is then saved to the storage device or opened within the application. Again, the full-resolution image file is not altered within the subject canister.

Photo groups stored on non-camera devices can be permanently marked for auto-correction and will therefore be displayed along with an auto-correction icon whenever viewed in Display Thumbnails mode. Photo groups stored on a camera cannot be permanently marked for auto-correction, therefore any auto-correction mark is lost upon exiting a system object viewer according to the present invention or upon disconnection of camera 14.

Figure 30:
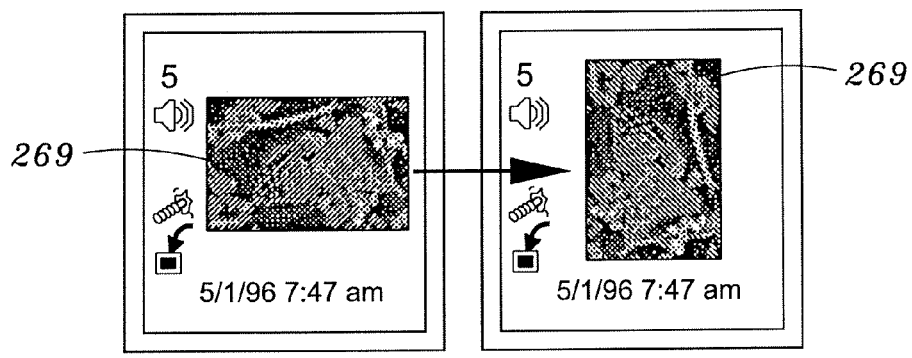
FIG. 30 is a view illustrating rotation of a displayed thumbnail image.

Rotate buttons 266 and 267 are active in a case that a photo group is selected in Display Thumbnails mode. Depression of buttons 266 or 267 will cause a selected thumbnail image to rotate 90 degrees in a direction indicated by the depressed button each time the button is depressed. FIG. 30 shows thumbnail image 269 before and after depression of button 267.

As described above with respect to Auto-Correct button 264, photo groups rotated using buttons 266 and 267 are copied or moved using drag and drop techniques with the applied rotations intact. In this regard, associated full-resolution files stored in the cache memory are subjected to the applied rotations prior to such moving or copying.

Photo groups stored on non-camera devices can be permanently marked for 90 degree rotation such that the associated thumbnail image files are shown rotated each time they are viewed by a system object viewer according to the present invention. However, photo groups stored in a camera cannot be permanently marked for rotation and therefore rotation attributes are lost each time the system object viewer is quit or camera 14 is disconnected from computer system 1.

Select All button 270 selects each item in viewing area 192. These items may consist either of all canisters in a camera or of all photo groups in a canister.

Figure 31:
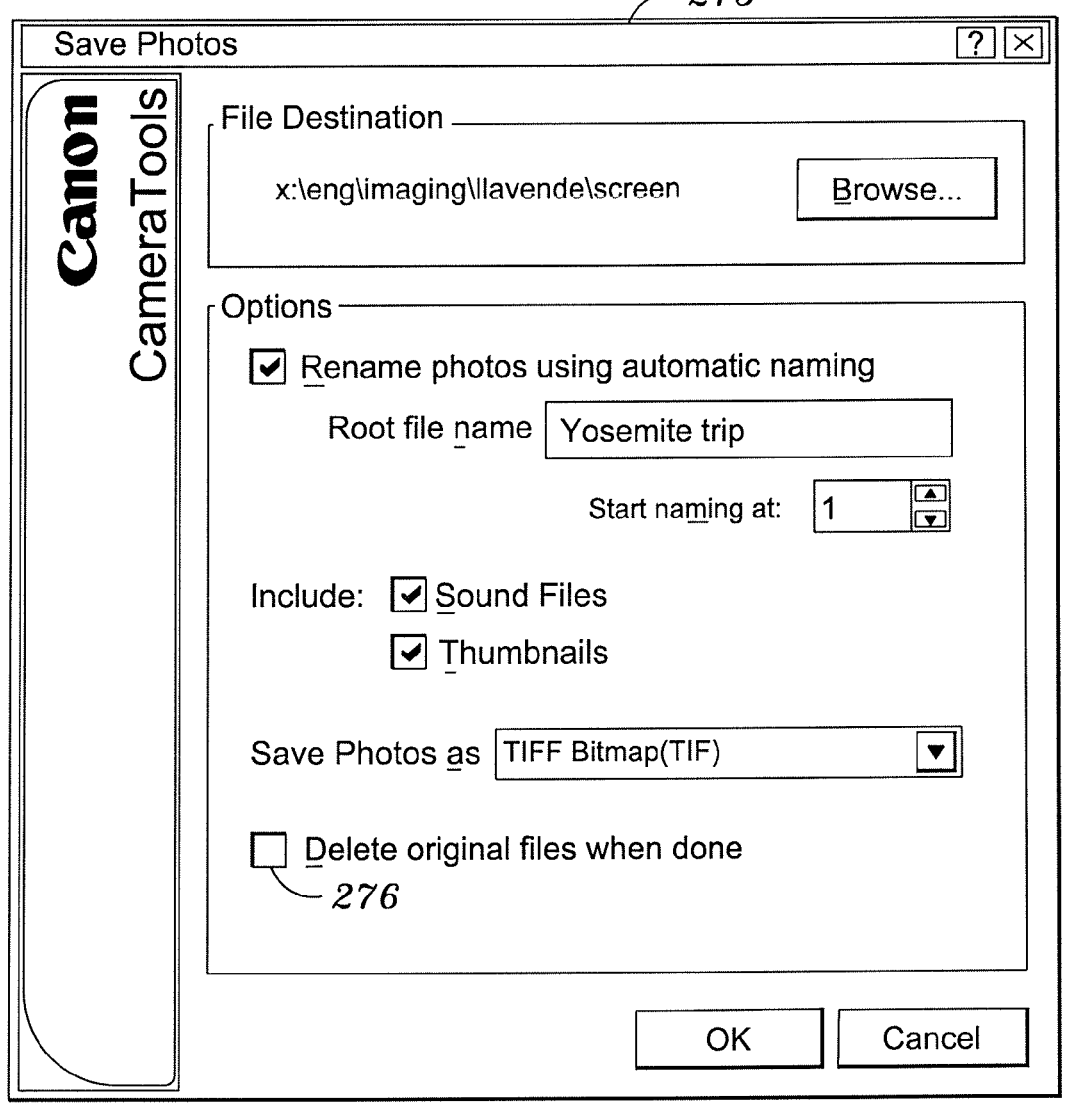
FIG. 31 is a view of a Save Photos dialog for setting saving parameters.

Move/Copy Photo Group button 272 causes selected photo groups to be moved or copied to a new (non-internet) storage location. In this regard, if photo groups are selected upon depression of button 272, Save Photos dialog 275 of FIG. 31 is displayed. The elements shown in dialog 275 correspond to identical elements shown in Save Photos property page 65, therefore descriptions thereof are omitted. However, check box 276 does not directly correspond to any element of property page 65. In this regard, check box 276 causes selected photo groups to be deleted after copying, thereby resulting in a "move" function.

Figure 32:
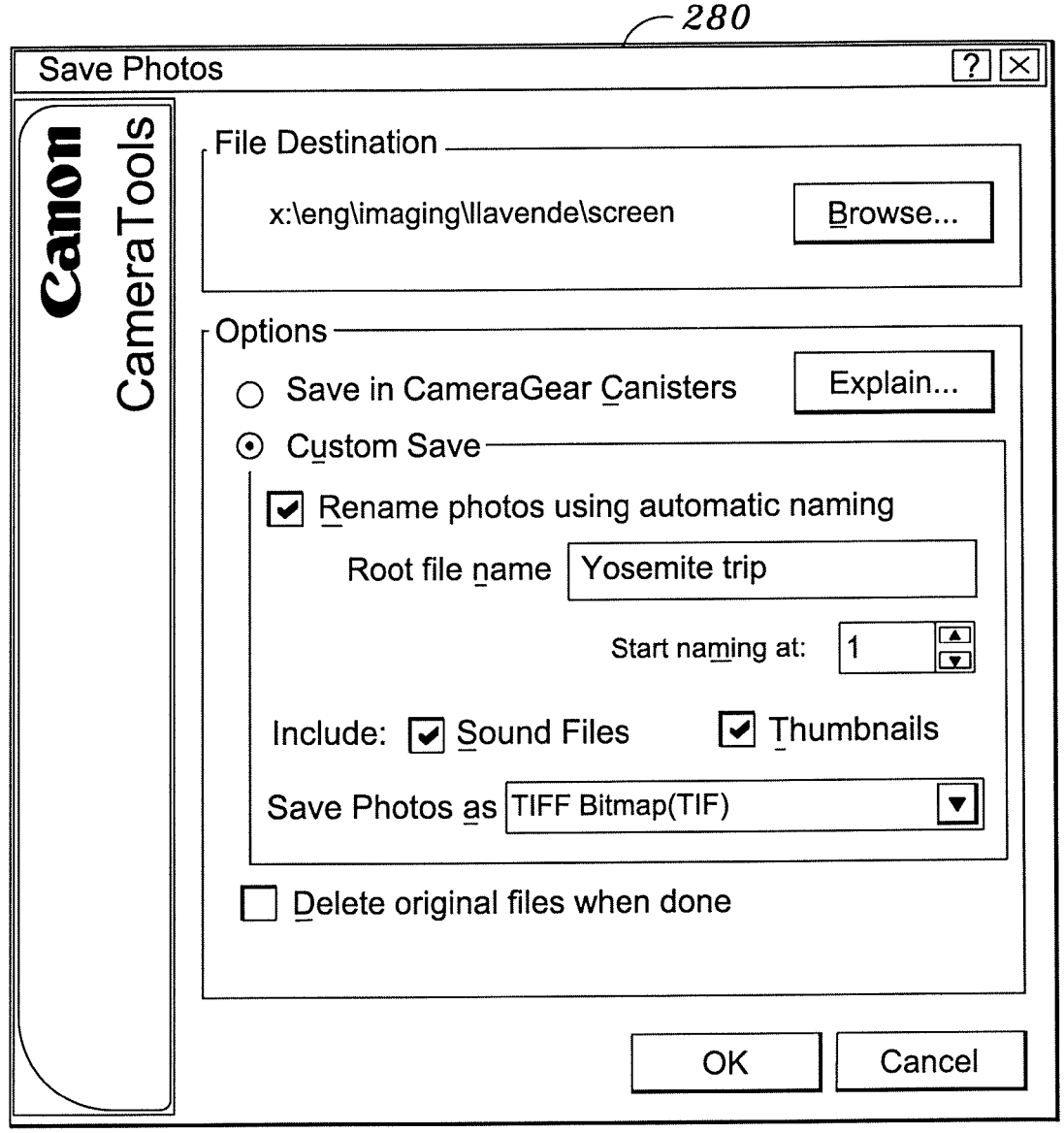
FIG. 32 is a view of a Save Photos dialog for setting saving parameters.

In a case that a canister is selected upon depression of button 272, dialog 280 of FIG. 32 is displayed. The elements of dialog 280 are described above with respect to property page 65 and dialog 275.

Figure 33:
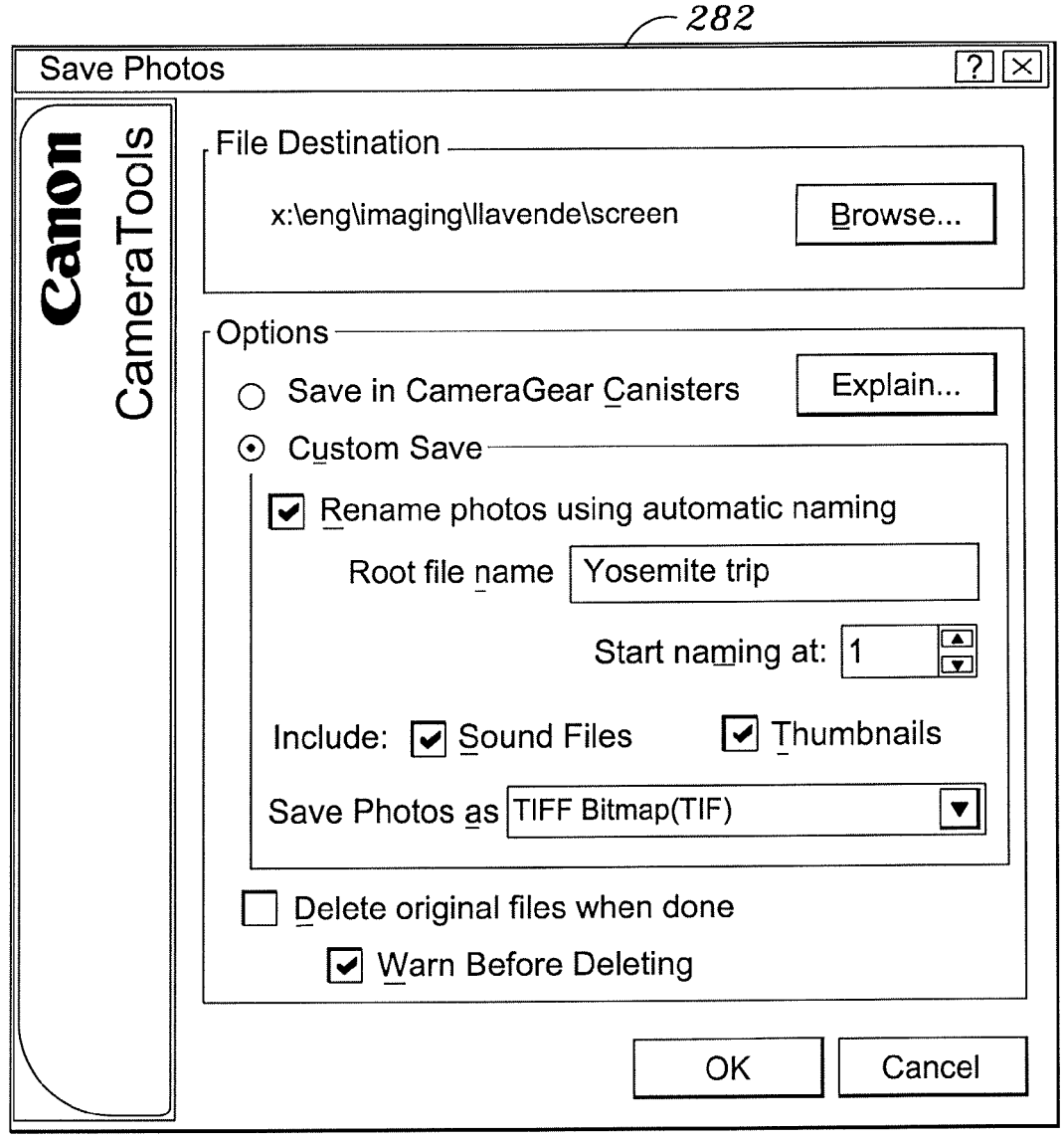
FIG. 33 is a view of a Save Photos dialog for setting saving parameters.

If button 272 is depressed while a digital camera is selected, dialog 282, shown in FIG. 33, is displayed. The settings and functionality of dialog 282 are also described above with respect to property page 65 and dialog 275.

Figure 34:
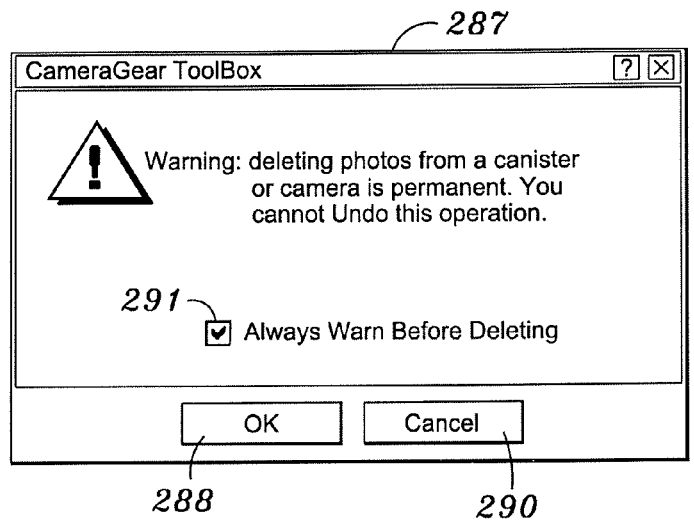
FIG. 34 is a view of a Deletion Warning dialog.

Delete Photo Group button 285 causes the currently-selected items to be deleted. If photo groups are selected, then the selected photo groups are deleted, and if canisters are selected, both the selected canisters and photo groups within the canisters are deleted. In a case that a camera is selected, each canister stored in the camera as well as each photo group stored in the canisters is deleted. Since deletion of photo groups from a canister cannot be undone, dialog 287 of FIG. 34 is initially displayed after selection of button 285. OK button 288 of dialog 287 deletes the selected files. Cancel button 290 cancels the deletion and selected files will remain in the camera or canister. In a case that check box 291 is selected, subsequent selection of Delete Photo Group button 285 will not cause display of dialog 287.

Print button 292 provides printout of full-resolution image files of selected photo groups. The particular printing process initiated by button 292 is determined by the object selected in interface 190 when button 292 is depressed.

Figure 35:
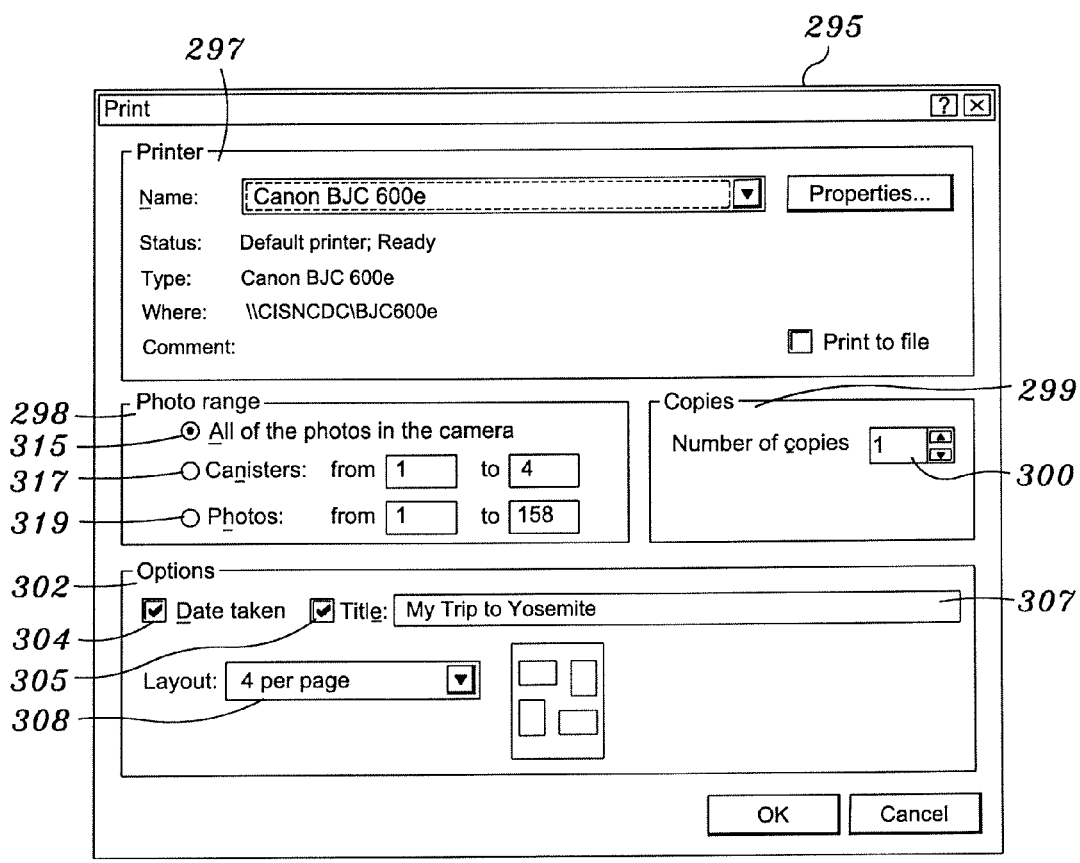
FIG. 35 is a view of a Print dialog for setting photo printing parameters.

In a case that a camera is selected, dialog 295 of FIG. 35 is displayed. Dialog 295 contains Printer area 297 for defining a printer, Photo Range area 298 for selecting files to be printed, Copies area 299 for selecting a number of copies to print via spinner control 300, and Options area 302. Within Options area 302, a user may select several formatting options for printout. For instance, selection of Date Taken check box 304 causes a printed sheet to include the date and time that a printed file was captured. Selection of Title check box 305 causes each printed sheet to include a title typed within text box 307. Layout Options area 308 allows selection of one of three layout options, one photo per page, two photos per page, and four photos per page.

Figure 36:
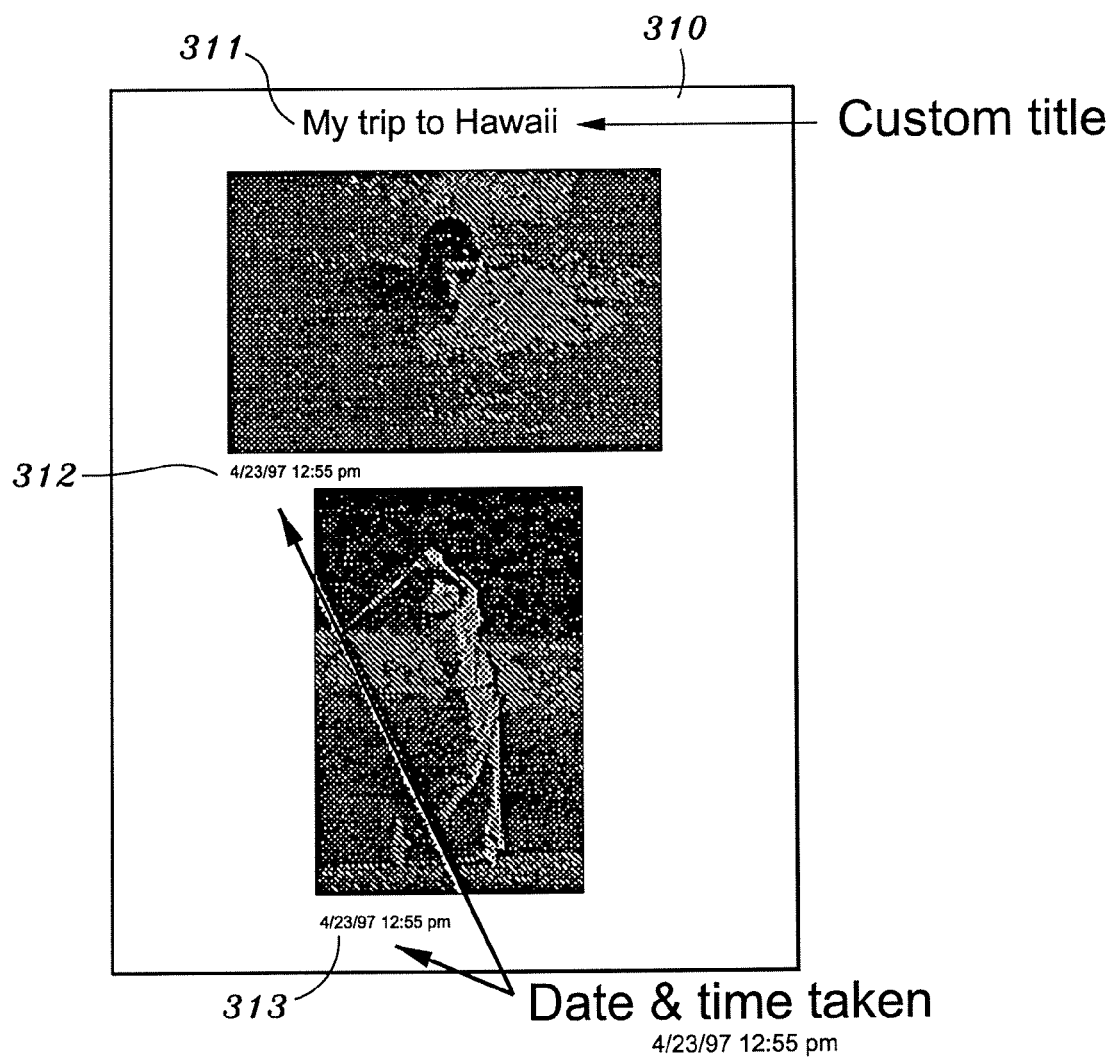
FIG. 36 is a view of printed image files.
Figure 37:
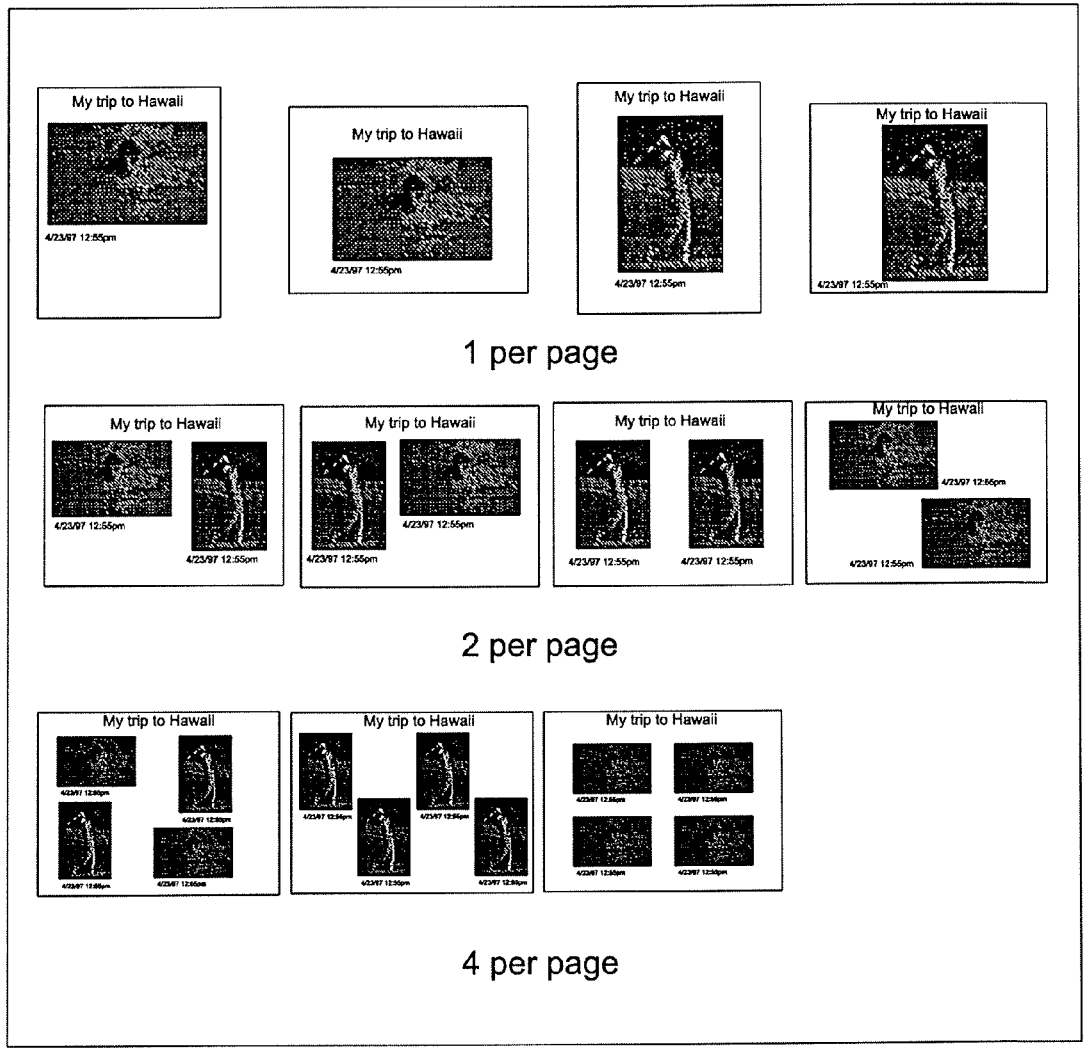
FIG. 37 shows representative views of sheets of printed image files.

In this regard, FIG. 36 shows printed sheet 310 containing title 311 and date/time stamps 312 and 313, one stamp corresponding to each image printed on sheet 310. As can be seen from FIG. 36, sheet 310 is printed in a two photo per page layout. FIG. 37 shows examples of images printed using the various layout options of area 308.

Within Photo Range area 298, a user may select particular photos for printing. Selection of All Photos In Camera option 315 causes each full-resolution image file stored in camera 14 to be printed. Selection of Canisters option 317 causes printing of each full-resolution image file within the specified range of canisters. In addition, selection of Photos option 319 causes printing of full-resolution image files of photo groups corresponding to the selected range of photos.

Preferably, the default photo range of dialog 295 is option 315, while the default ranges of options 317 and 319 are all canisters in the camera and all photos in the camera, respectively.

Figure 38:
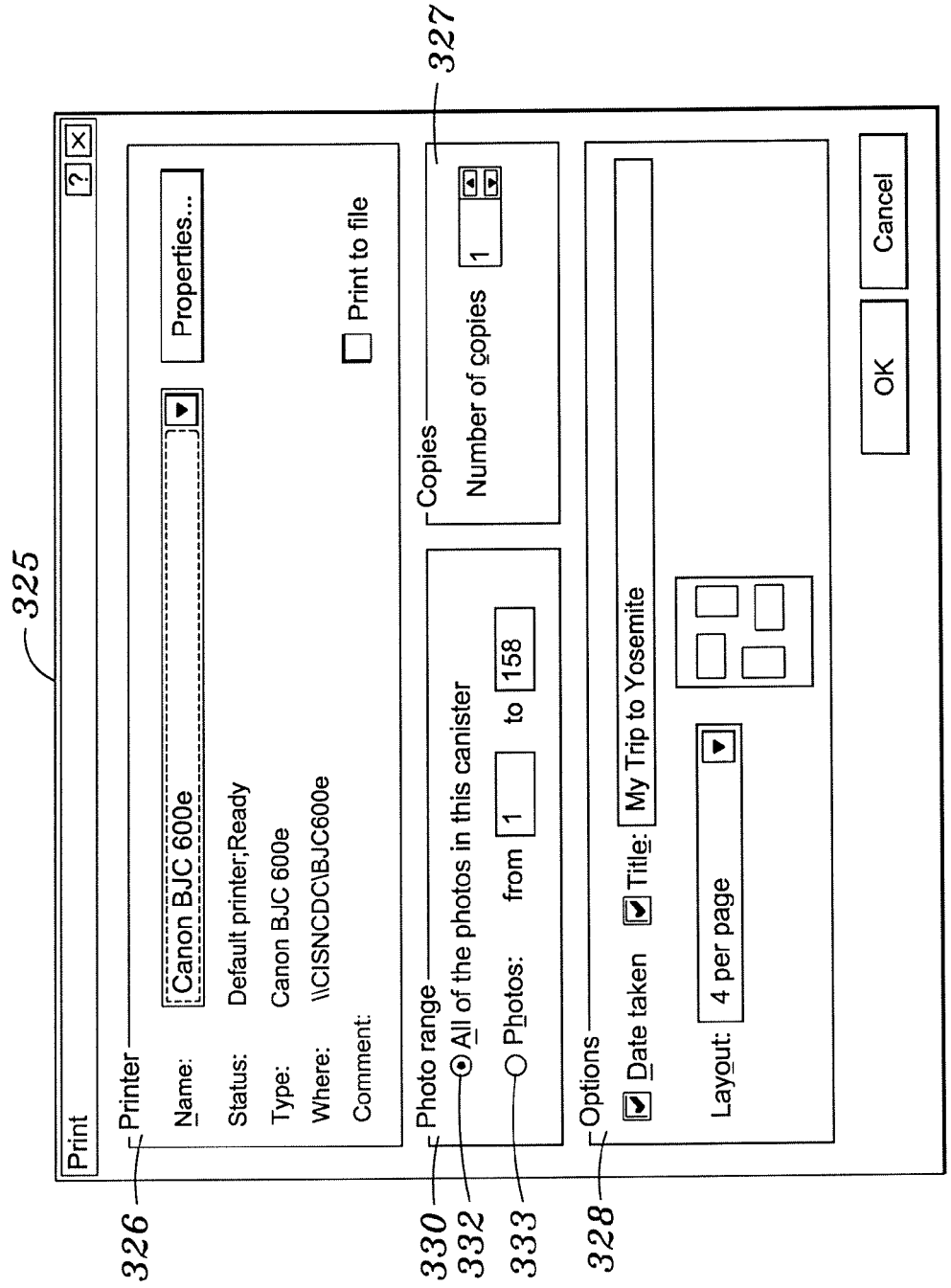
FIG. 38 is a view of a Print dialog for setting printing parameters.

FIG. 38 shows dialog 325, which is selected in a case that a canister is selected upon depression of button 292. Areas 326, 327 and 328 function similarly to areas 297, 299 and 302 described above with respect to FIG. 35. Photo range area 330, however, presents a user with a different range of options then that shown in dialog 295. Particularly, a user can select option 332 in order to print all full-resolution image files of the selected canister, or option 333 in order to print a range of full-resolution image files from the selected canister. The initial and default settings of dialog 325 are preferably such that option 332 is selected and photos option 333 is set to the entire range of photos in the selected canister.

Figure 39:
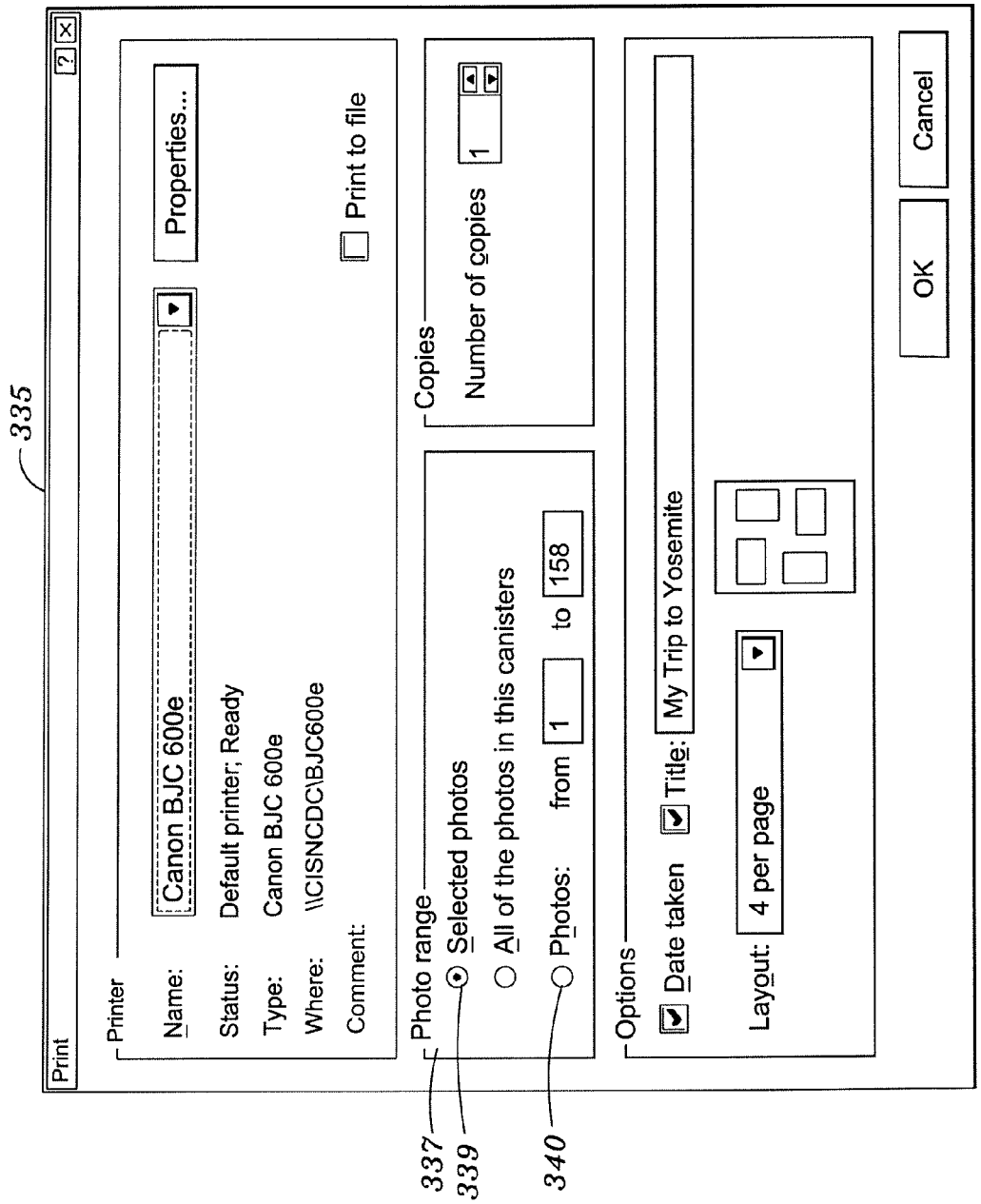
FIG. 39 is a view of a Print dialog for setting printing parameters.

In a case that a photo group or range of photo groups are selected upon depression of button 292, dialog 335 of FIG. 39 is displayed. Dialog 335 is similar to dialogs 295 and 325 except for Photo Range area 337, which provides a user with options for printing selected full-resolution image files, all full-resolution image files in the canisters containing the selected photo group(s), or a specified range of full-resolution image files. Default settings for dialog 335 are option 339, wherein the photo range of option 340 set to the photo range of the canister containing the selected photos.

E-mail button 345 of toolbar 196 invokes the Windows95 standard "Send To mail recipient" file menu procedure.

Print Contact Sheet button 347 is used to print contact sheets of selected photo groups. Similar to Print button 292, selection of button 347 causes display of one of three dialogs, depending upon the objects selected during selection of button 347.

Figure 40:
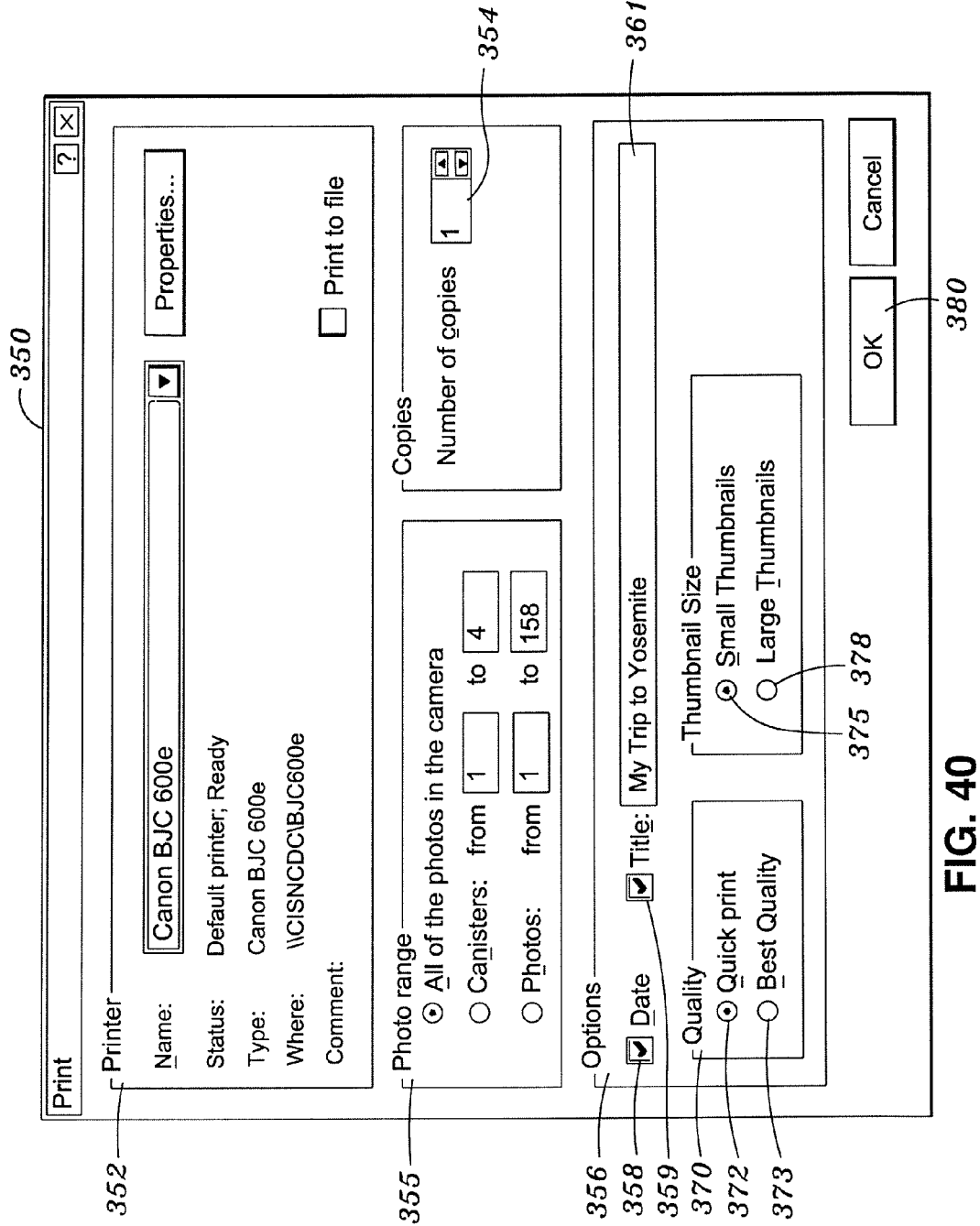
FIG. 40 is a view of Print dialog for setting printing parameters.

In a case that a digital camera is selected during selection of button 347, dialog 350 of FIG. 40 is displayed. Dialog 350 includes Printer Control area 352 and area 354 to select a number of contact sheet copies to be printed. Photo Range area 355 determines the photo groups which are represented on a printed contact sheet. In this regard, the functionality of area 355 of dialog 350 parallels that of area 298 of dialog 295.

Figure 41:
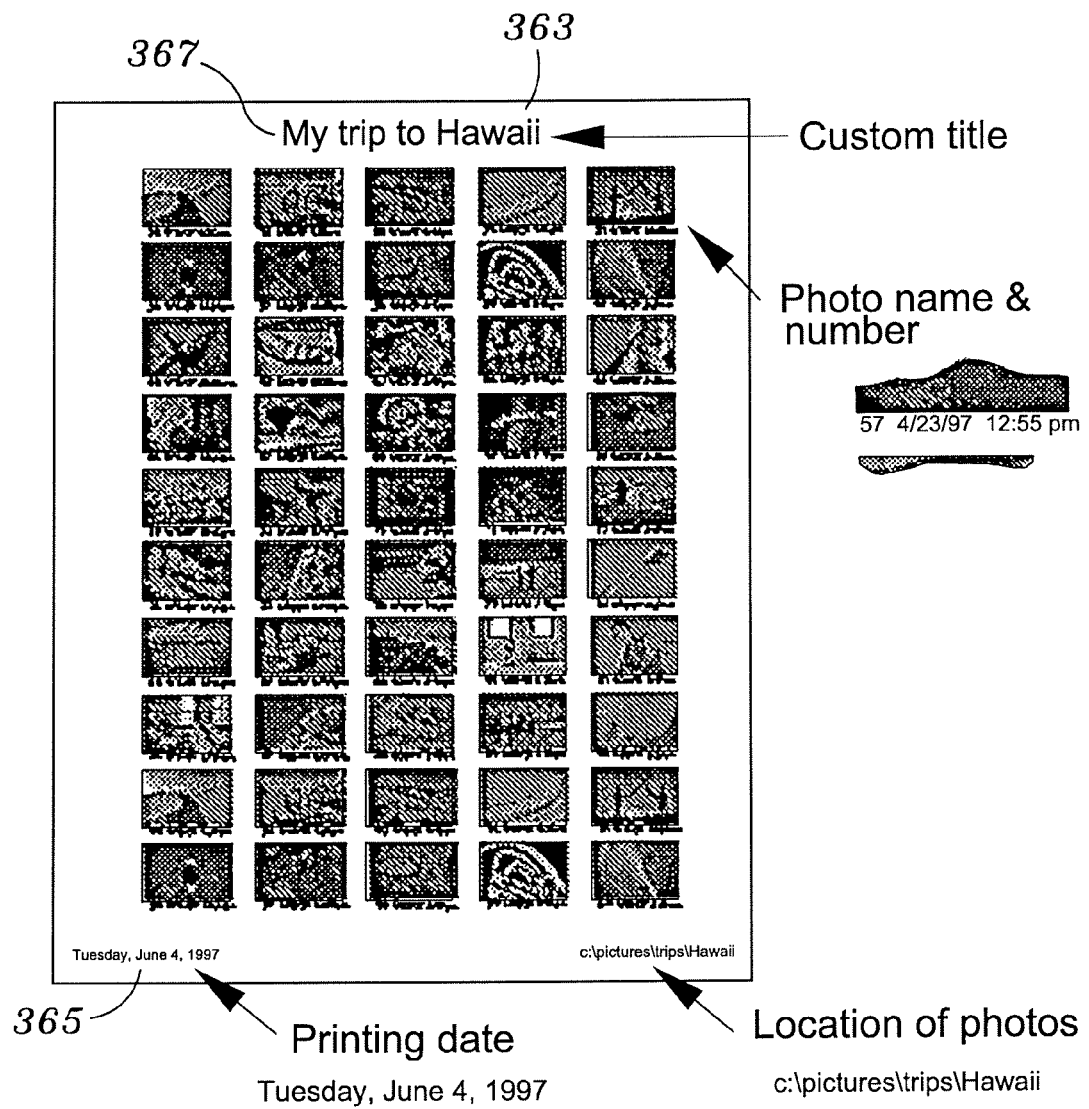
FIG. 41 is a view of a contact sheet printed in accordance with the present invention.

Options area 356 contains formatting options for printing contact sheets. Date check box 358 causes the contact sheet printing date to be printed upon printed contact sheets in the form: day name, month day, year. Title check box 359 causes a title printed in text box 361 to be printed on each contact sheet. FIG. 41 shows sample contact sheet 363 including printing date 365 and title 367.

Quality area 370 allows a user to determine the print quality of images printed on the contact sheet. Quick Print option 372 prints thumbnail image files of the photo groups selected in photo range area 355, after scaling the files using image up-sampling. Best Quality option 373 utilizes full-resolution image files that are down-sampled and therefore results in a slower but higher-quality printout than that achieved using option 372.

Option 375 is selected in order to print a contact sheet of small images, fifty per contact sheet, while option 378 is used to print larger images, approximately fifteen per contact sheet. OK button 380 initiates printing.

Figure 42:
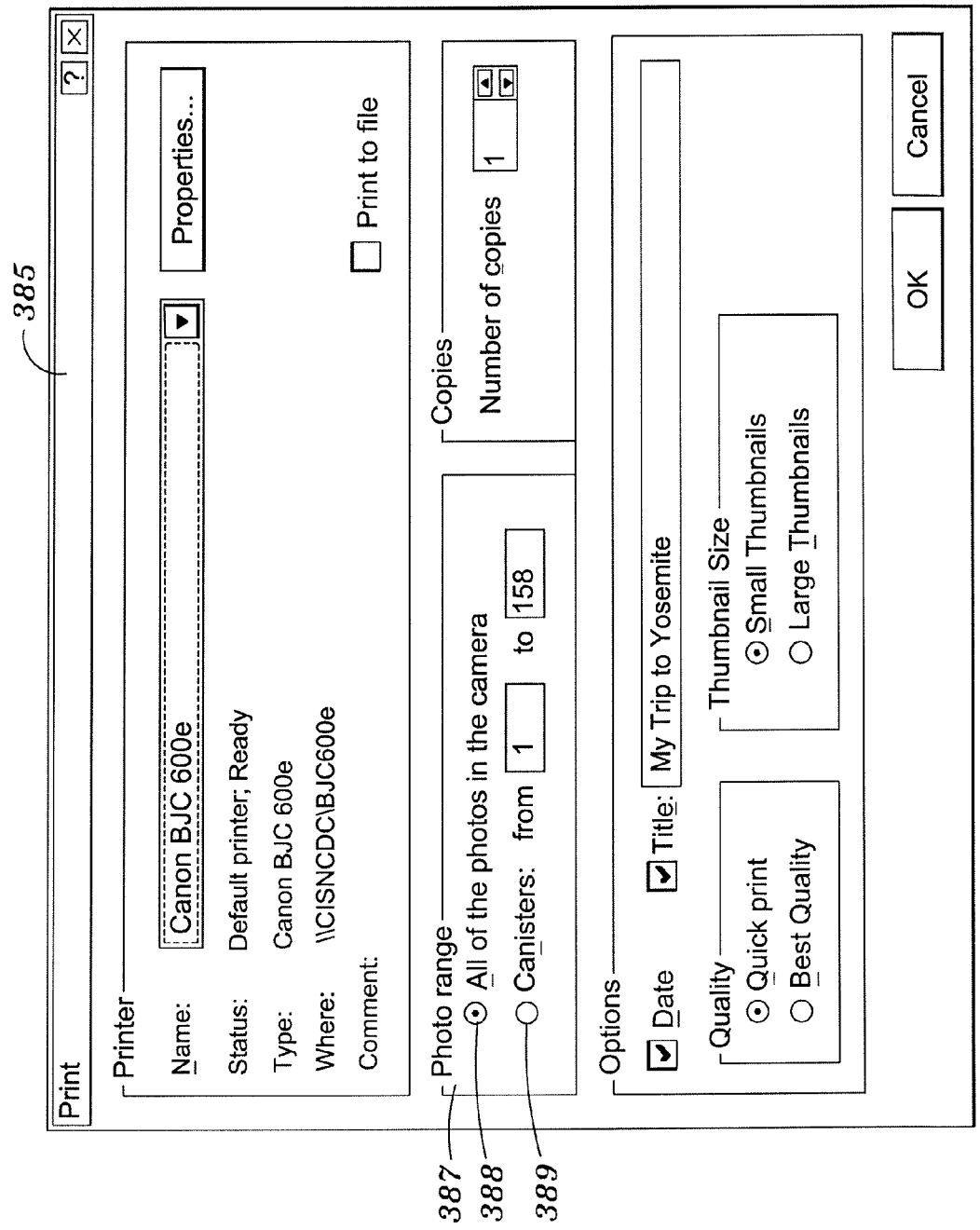
FIG. 42 is a view of Print dialog for setting contact sheet printing parameters.

In a case that a canister is selected upon depression of button 347, dialog 385 of FIG. 42 is displayed. The functionality of dialog 385 corresponds to that of dialog 350. However, Photo Range area 387 includes two options, option 388 for printing images representing each photo group in the selected canister, and option 389 for printing images representing a selected range of photo groups.

Figure 43:
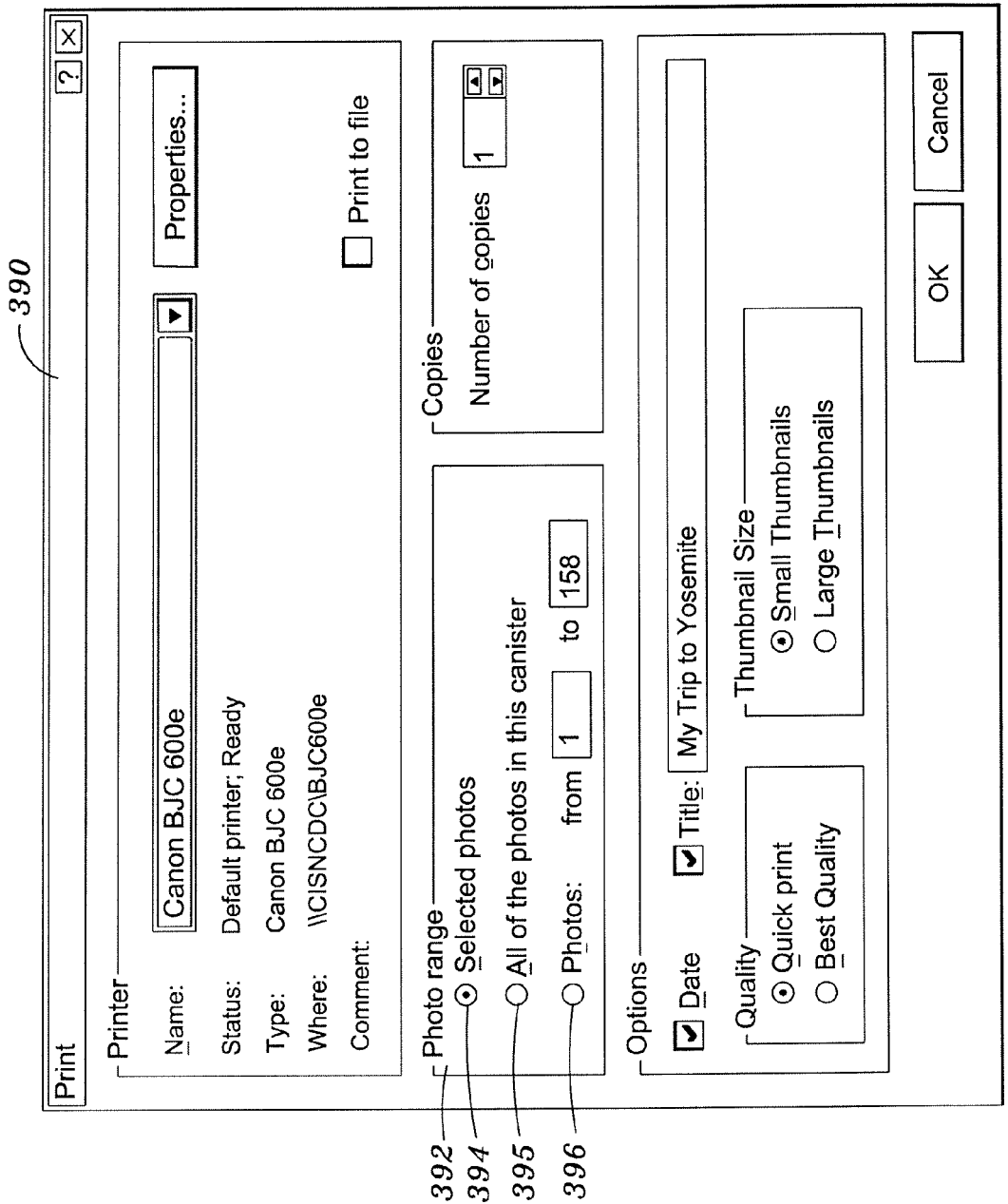
FIG. 43 is a view of Print dialog for setting contact sheet printing parameters.

Dialog 390 of FIG. 43 is displayed in a case that button 347 is depressed while a photo group or a range of photo groups are selected. The functionality of dialog 390 is similar to that of dialogs 350 and 385 except for Photo Range area 392, which provides for printing a contact sheet of images representing the selected photo groups (option 394), representing all photo groups in the canister containing the selected photo groups (option 395), or representing a specified range of photo groups (option 396).

Upload button 400 of toolbar 196 causes selected photo groups to be uploaded to the internet photo service provider specified in Internet property page 67. In this regard, only full-resolution image files of the selected photo groups are uploaded. If a canister is selected upon depression of button 400, then all full-resolution files located in the canister are uploaded. Similarly, if a camera is selected, all full-resolution files on the camera are uploaded. In a case that no internet photo service provider is specified in property page 67, property page 67 will be presented to the user.

Display Thumbnails button 402 provides a display such as that shown in area 192 of FIG. 22. Again, this view is available only for viewing canister or camera contents. As described with respect to FIGS. 23 and 24, each photo group within a canister is represented in area 192 by a 60×80 pixel image.

Figure 44:
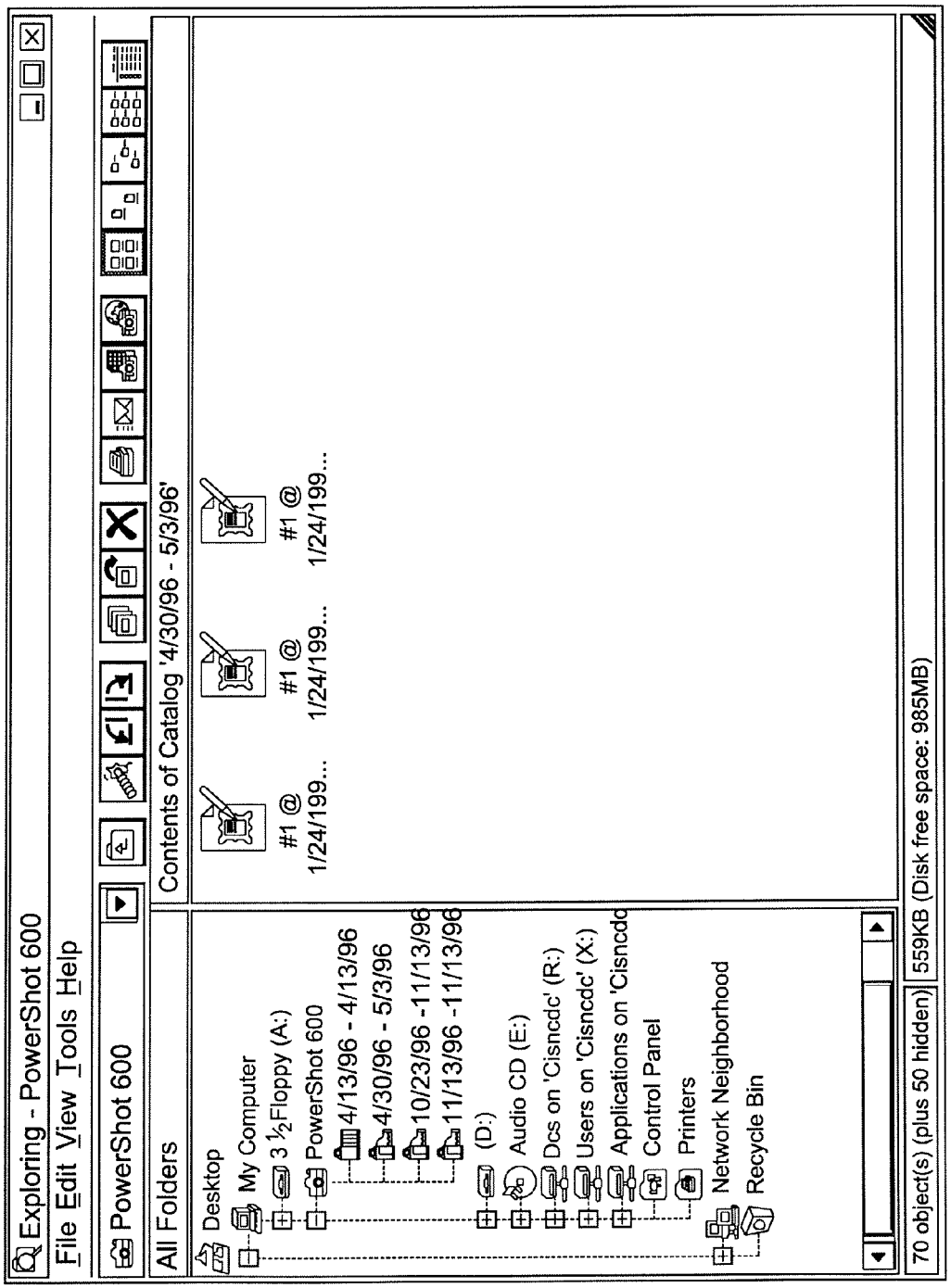
FIG. 44 is a view of a Windows95 Explorer user interface according to the present invention.

Large Icon button 405 causes each photo group of a selected canister to be represented within area 192 by a 32×32 pixel icon and a photo group name, as shown in FIG. 44. Small Icon button 410 causes display of 16×16 icons representing each photo group, and List button 415 shows a list of each photo group, along with 16×16 pixel icons representing each photo group. Views corresponding to Small Icon button 410 and List button 415 are shown in FIGS. 45 and 46, respectively.

Figure 45:
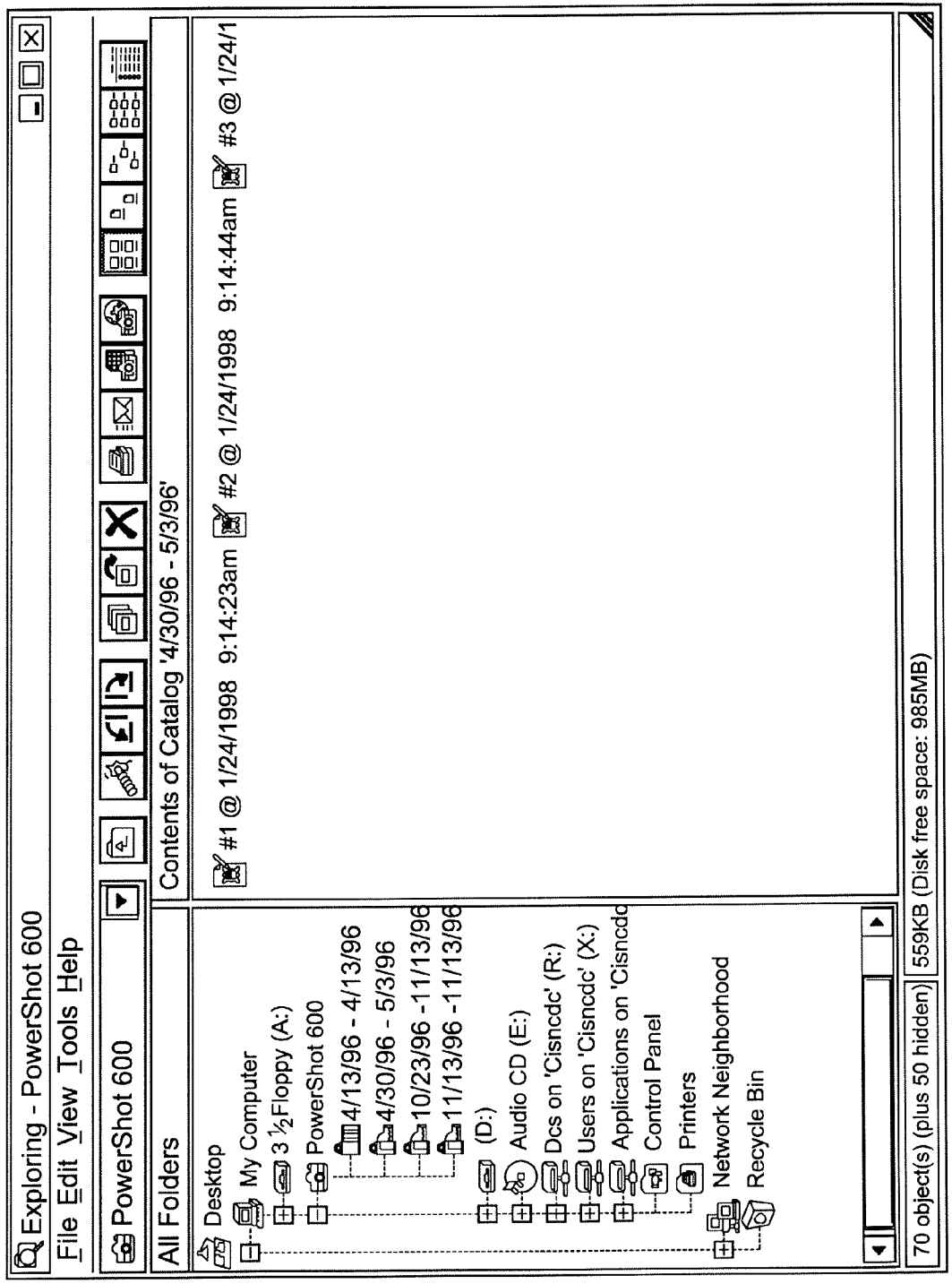
FIG. 45 is a view of a Windows95 Explorer user interface according to the present invention.
Figure 46:
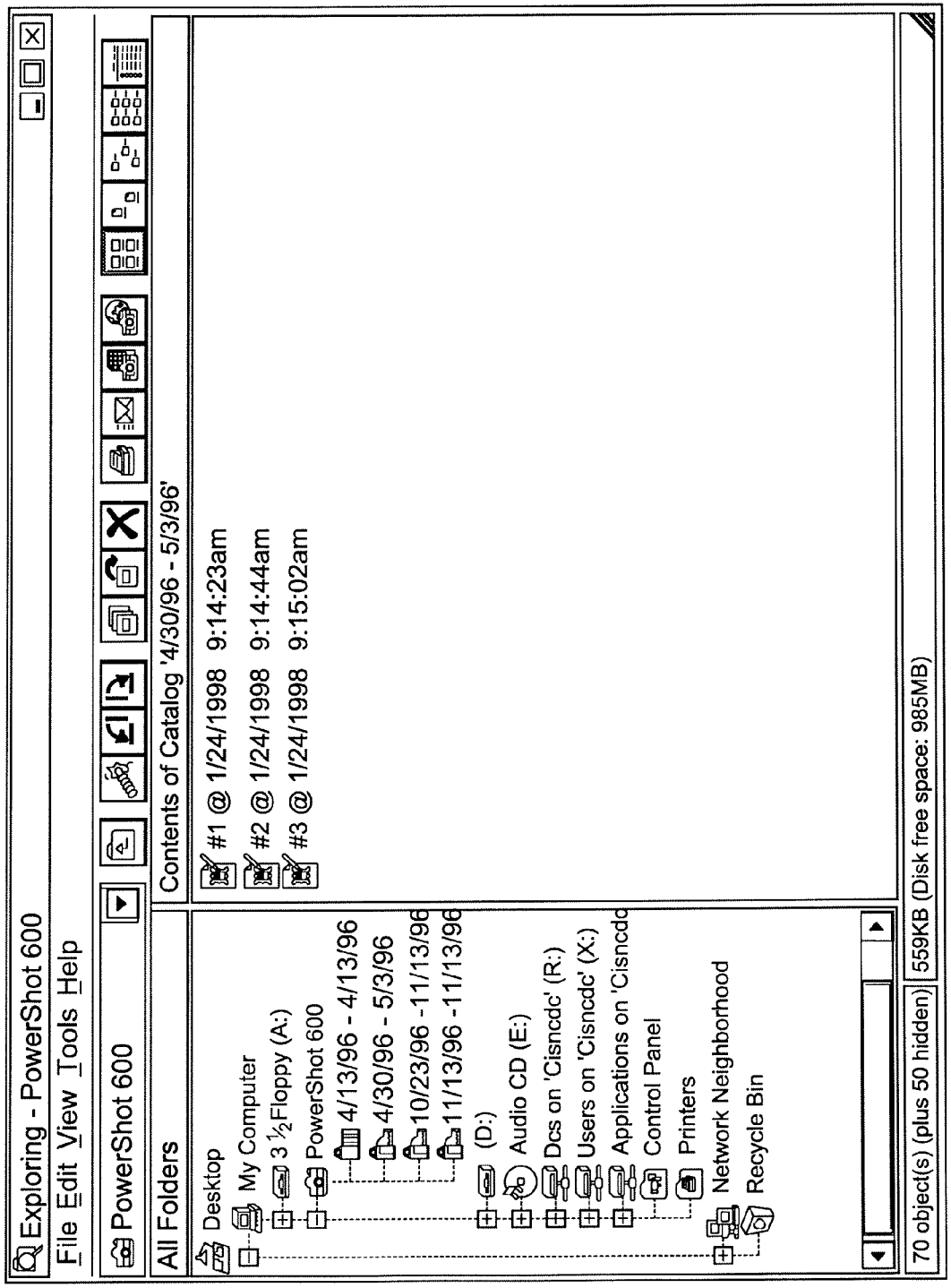
FIG. 46 is a view of a Windows95 Explorer user interface according to the present invention.

The icons representing photo groups in FIGS. 44 through 46 represent associated thumbnail image files, full-resolution image files, and sound files. The photo group names listed adjacent to the icons consist of the photo group number, and date and time at which the photo group was created. In either of the views shown in FIGS. 44 to 46, double clicking upon a photo group icon will launch an OLE image container application, or the system registry JPEG default application, and open the full-resolution image file corresponding to the selected photo group icon within the application.

Figure 47:
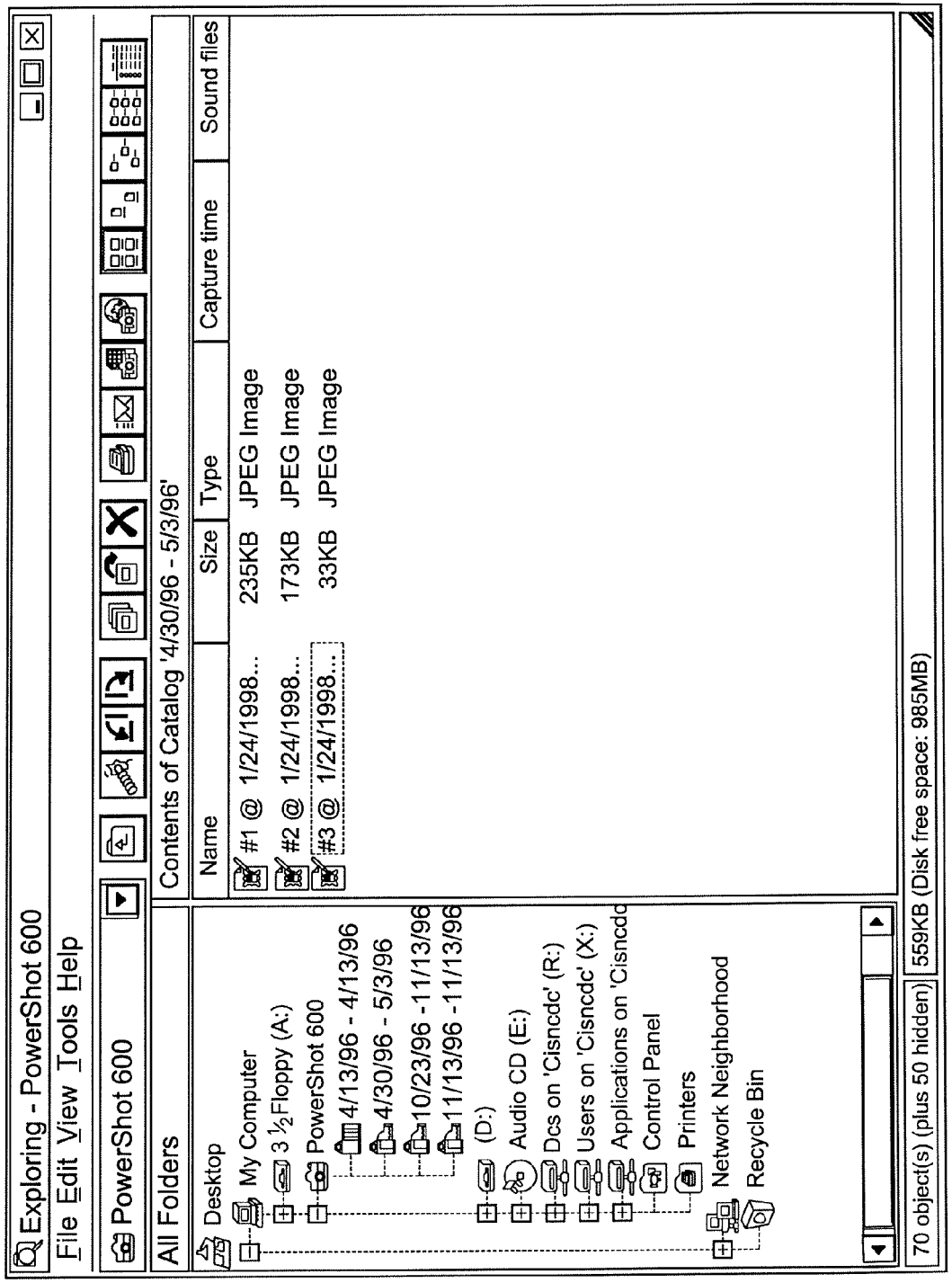
FIG. 47 is a view of a Windows95 Explorer user interface according to the present invention.

Details button 420 can be selected to produce a view such as that shown in FIG. 47. In the FIG. 47 view, each photo group is represented by a 16×16 pixel icon and a line of detailed information. The detailed information preferably includes photo group number, name (date and time taken), a sound icon if sound files are present, an auto-correct icon, and byte size of the associated full-resolution image file. Double clicking on a photo group icon in the FIG. 47 view will also launch an OLE image container application, or a system registry JPEG default application, and open the corresponding full-resolution file therein.

It should be noted that one common aspect of each viewing mode provided in viewing area 192 of interface 190 is that, because associated files such as a thumbnail image file, a full-resolution image file, and a sound file are linked together as a photo group within a selected canister, only one file entry per photo group is displayed. Hidden file information is presented in status bar 204. This information consists of total byte size of selected full-resolution image files, byte size of hidden files (thumbnail and sound), and total byte size of selected photo groups (including thumbnail, full-resolution, and sound files).

Moreover, in each of the view modes provided by the present invention, selection and dragging of a photo group or multiple photo groups causes each file of the selected photo group(s) to be subjected to drag and drop functionality. In this regard, if the selected groups are dropped onto desktop 53, a storage device, or a folder, then each file of the selected photo group(s) is dropped on the destination. If the selected groups are dropped onto an application, only the full-resolution image files are dropped.

Figure 48:
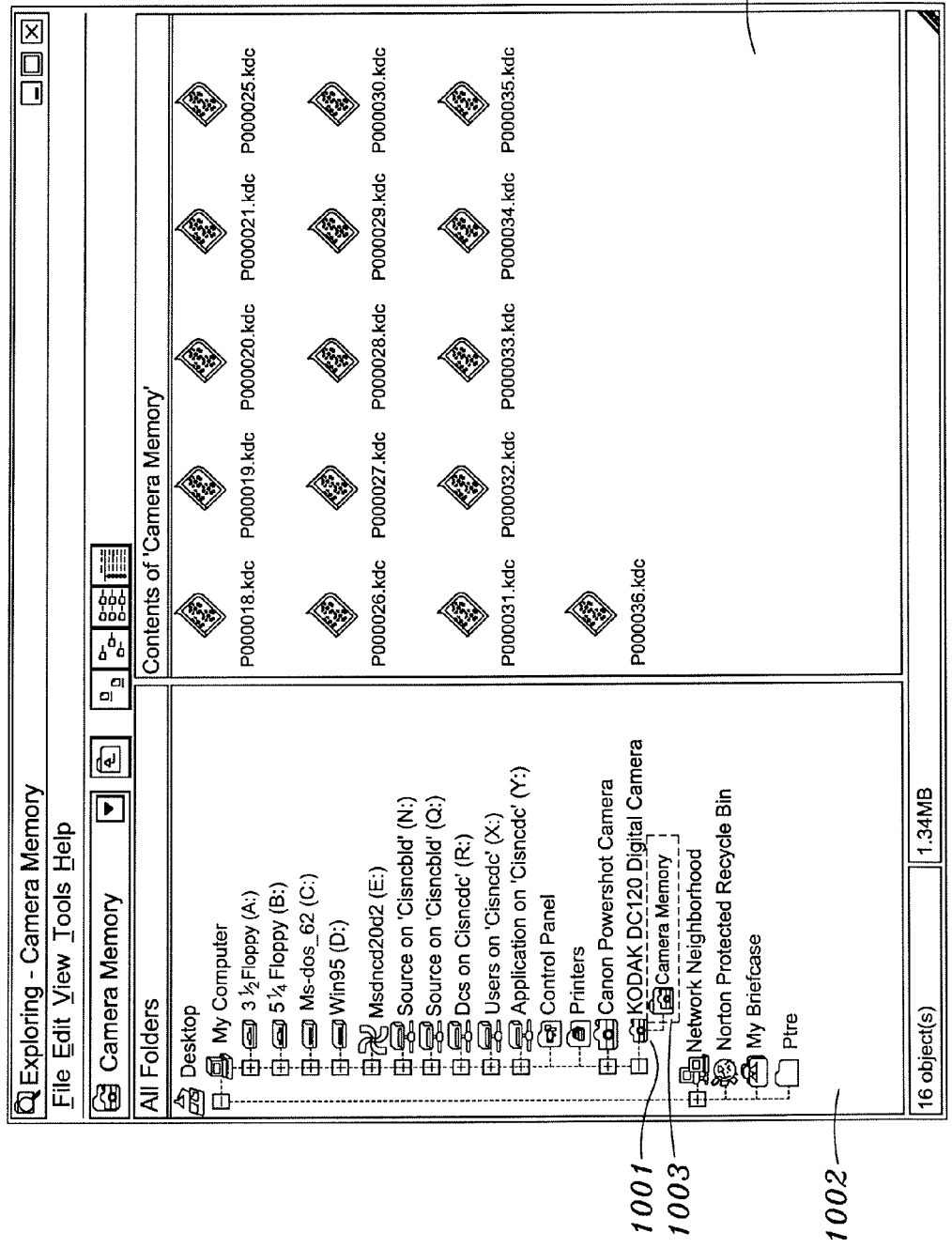
FIG. 48 is a view of a conventional graphical user interface for managing digital camera images.

In contrast to the foregoing views according to the present invention, and as described in the above Background Of The Invention section, FIG. 48 shows a view of the Windows95 Explorer application resulting from software developed by Kodak. In FIG. 48, folder contents window 1004 displays icons representing each file stored in a Kodak camera memory. However, the represented files are in a proprietary format (.kdc), and are not listed with file names helpful in determining the contents of each file.

Figure 49:
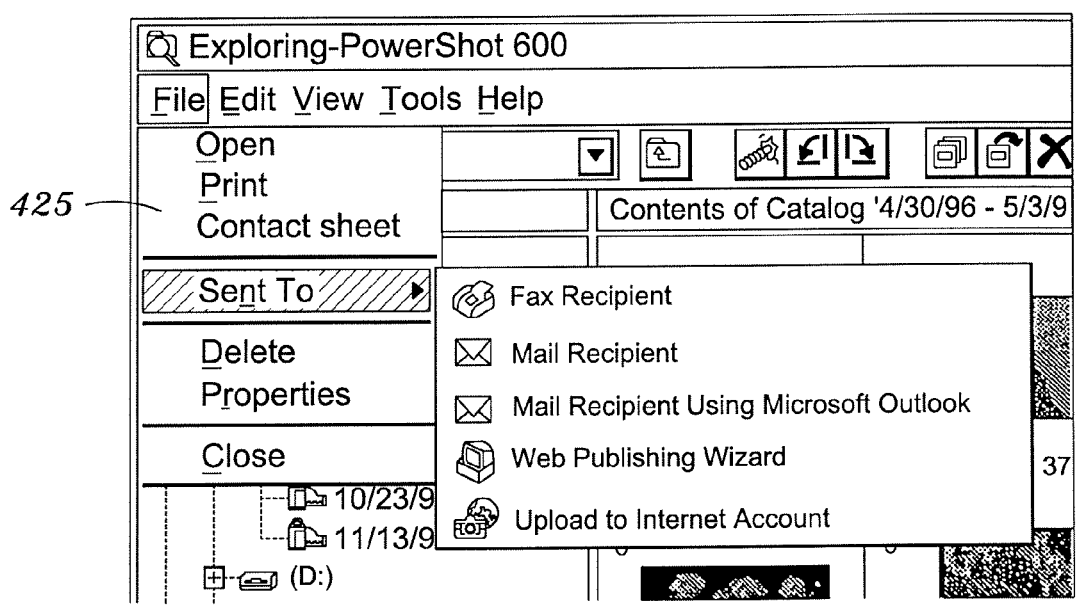
FIG. 49 is a view of a Windows95 Explorer File pull-down menu according to the present invention.

Menu bar 197 of interface 190 contains menus similar to those found in the standard Windows95 Explorer application. For example, FIG. 49 shows File menu 425, in which Print, Contact sheet, Mail recipient, and Upload to internet account options are equivalent to toolbar 196 buttons 292, 347, 345, and 400, respectively.

Figure 50:
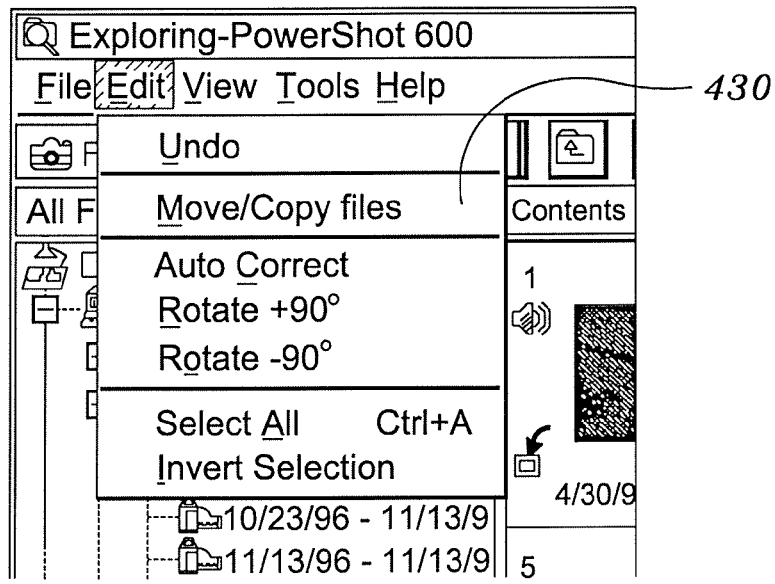
FIG. 50 is a view of a Windows95 Explorer Edit pull-down menu according to the present invention.

Edit menu 430 of FIG. 50 contains Move/copy files, Auto-Correct, Rotate plus 90 degrees, and Rotate minus 90 degrees options, which are equivalent to toolbar 196 buttons 272, 264, 267, and 266, respectively.

Figure 51:
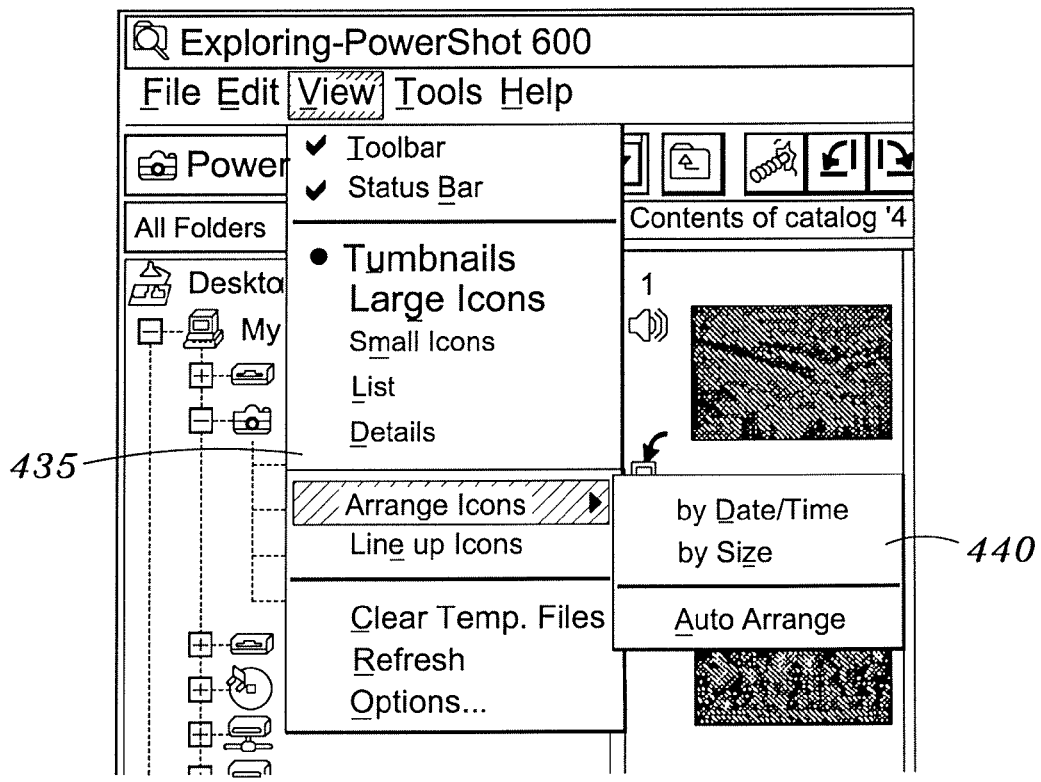
FIG. 51 is a view of a Windows95 Explorer View pull-down menu according to the present invention.
Figure 52:
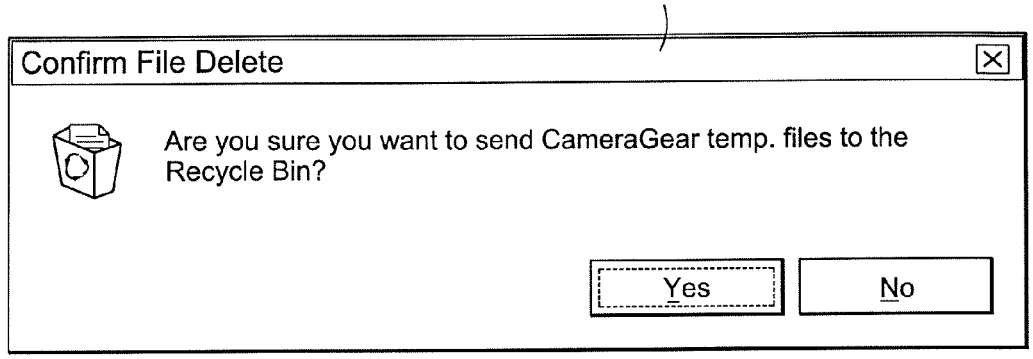
FIG. 52 is a view of a Confirm File Delete dialog.

View menu 435 of FIG. 51 controls views as described above with respect to toolbar 196 buttons 402, 405, 410, 415 and 420. Arrange Icons sub-menu 440 allows displayed icons to be arranged by date and time or by size, where the relevant size is photo group size. In addition, menu 435 includes an option for deleting temporary files created according to the present invention. Accordingly, this option will cause all temporary files not currently in use (by an application other than the current object viewer) to be sent to the Windows95 Recycle Bin. If this option is selected, dialog 441 of FIG. 52 is presented to the user.

Figure 53:
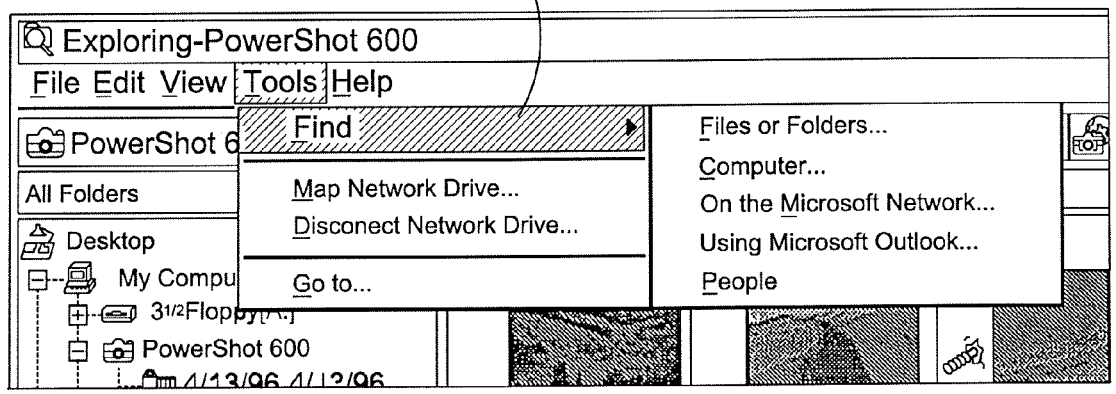
FIG. 53 is a view of a Windows95 Explorer Tools pull-down menu.
Figure 54:
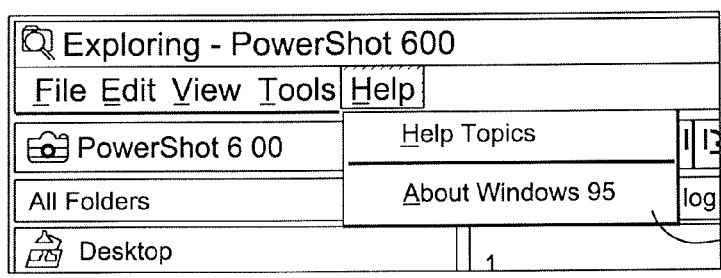
FIG. 54 is a view of a Windows95 Explorer Help pull-down menu.

As shown in FIGS. 53 and 54, Tools menu 442 and Help menu 443 contain standard Windows95 options.

As described above, rotation and auto-correction functions provided by user interface 190 cannot be applied to data stored within a canister/camera unless the data is first removed from the canister/camera. Accordingly, prior to opening a full-resolution image file stored in a canister or a camera within an application, a copy of the file must be made outside of the canister or camera.

Therefore, a copy of a full-resolution image file is created in the Windows95 System Temp directory when the image file is opened in an application. This file is created using a Windows95 system file temporary name "cgtlbXXX.bmt", where "XXX" is an incrementing number starting at one for each invocation of user interface 190.

Figure 55:
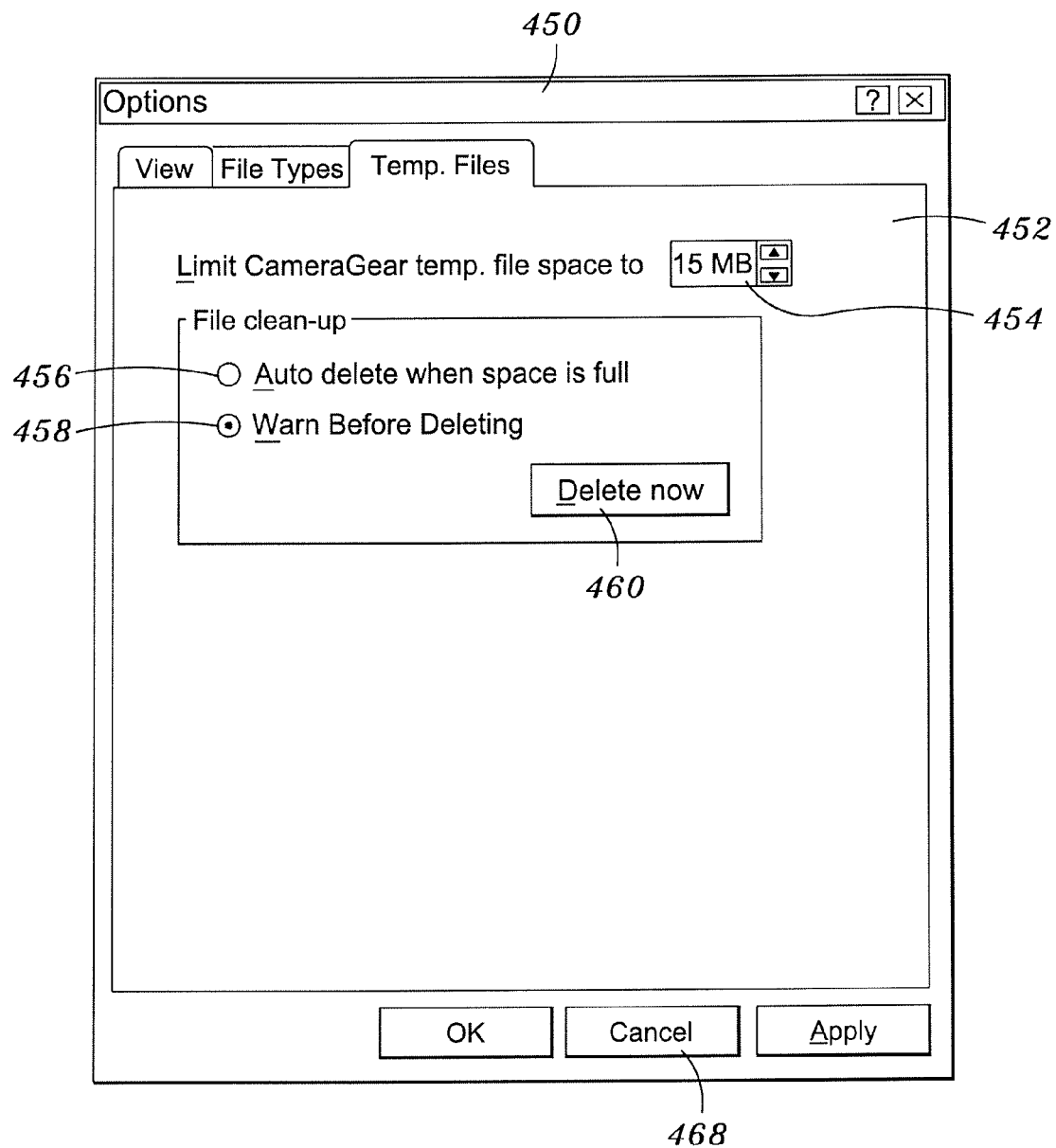
FIG. 55 is a view of an Options property sheet.

Options property sheet 450 of FIG. 55, accessible through menu 435, provides settings which, among other things, determine an amount of disk space allocated to the temporary files and the procedure to undertake in a case that the allocated disk space is full. For example, Temporary Files property page 452 contains Maximum File Space indicator 454 for indicating a maximum disk space allocated to temporary files. Option 456 allows a user to specify that the temporary files should be deleted once the maximum allocated amount of disk space is used. Option 458 instructs the present invention to warn a user that an allocated amount of disk space is full. Moreover, selection of Delete Now button 460 deletes the temporary files not currently in use by an application other than the present application.

Figure 56:
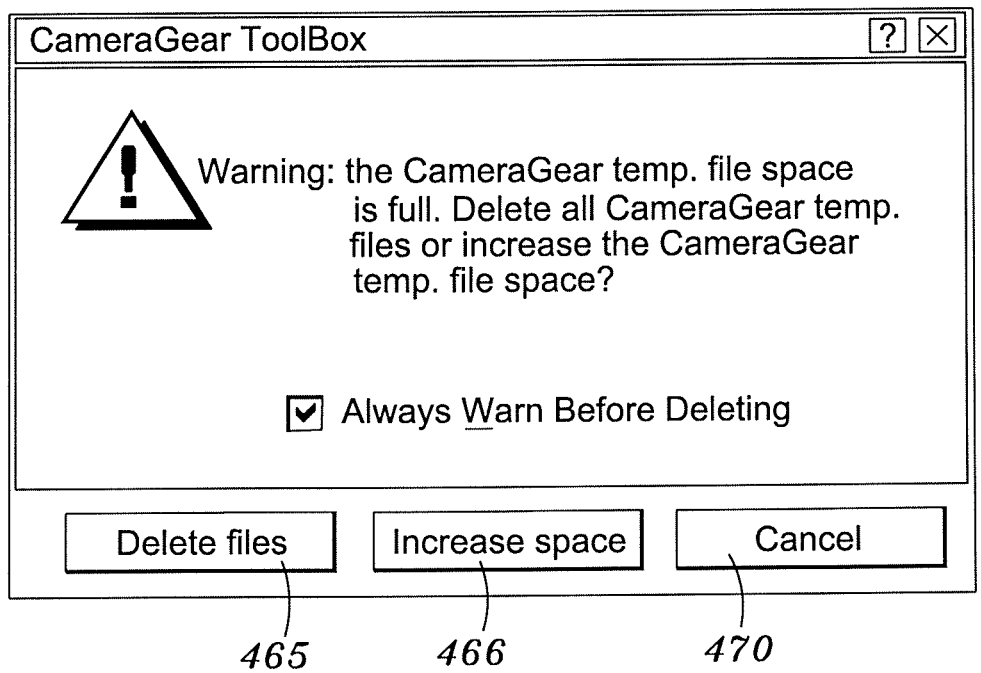
FIG. 56 is a view of a File Delete Warning dialog.

The warning issued by virtue of option 458 allows a user to either delete the temporary files or to expand the temporary file disk space allocation. The warning dialog used is shown in FIG. 56. In this regard, Delete Files button 465 causes the temporary files to be put in the Recycle Bin and current file activity continues. Increase Space button 466 causes display of property sheet 450 with property page 452 displayed to the user. At this point, if file space is sufficiently increased, or if the temporary files are deleted, current file activity continues. If the user selects Cancel button 468 of property page 452, the temporary files are not disturbed and the current file activity is aborted. Clicking on Cancel button 470 also leaves the temporary files undisturbed and aborts the current file activity.

By virtue of the foregoing shell extension module and below-described registry entries, a system object viewer according to the present invention may be invoked in at least four ways. For example, because digital camera 14 is registered as a Windows95 system object, an icon representative of digital camera 14 appears in My Computer application interface 475, shown in FIG. 57, upon selection of My Computer icon 476. Next, selection of Camera icon 477 launches Explorer interface 478 which displays contents of camera 14 at the canister level. Because interface 478 was launched directly from a selection of a system object, interface 478 does not contain a system object directory tree such as that shown in area 194 of FIG. 22. A similar Explorer interface may also be invoked by selection of a shortcut icon such as icon 480 of FIG. 58.

Figure 57:
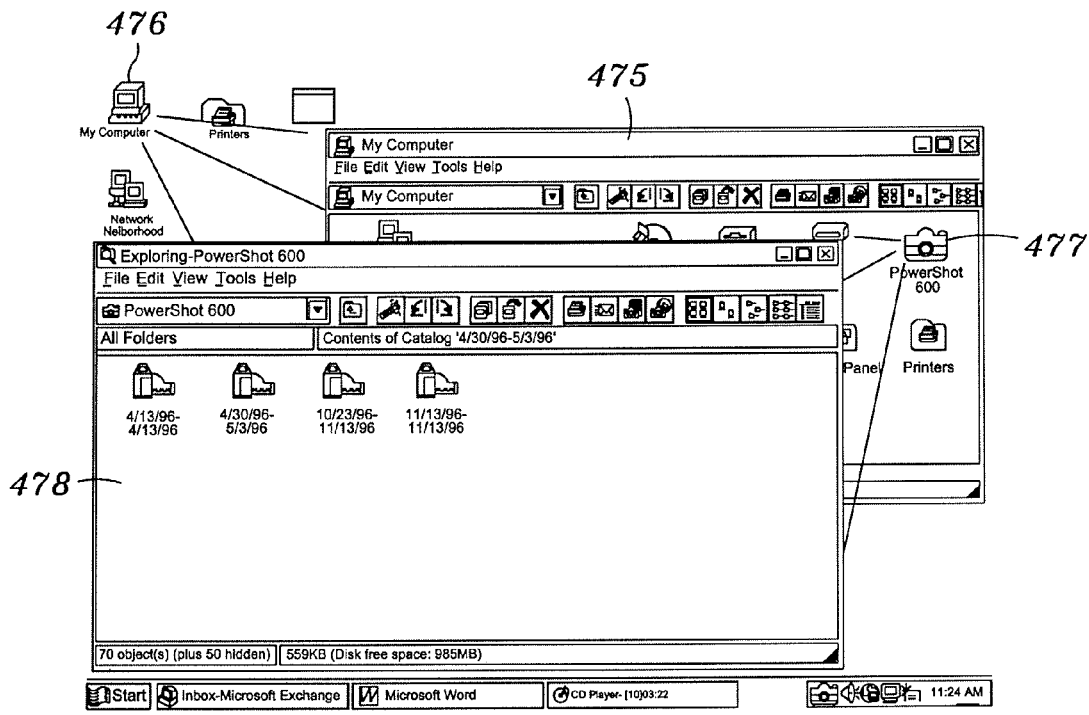
FIG. 57 is a view illustrating invocation of an Explorer user interface according to the present invention.
Figure 58:
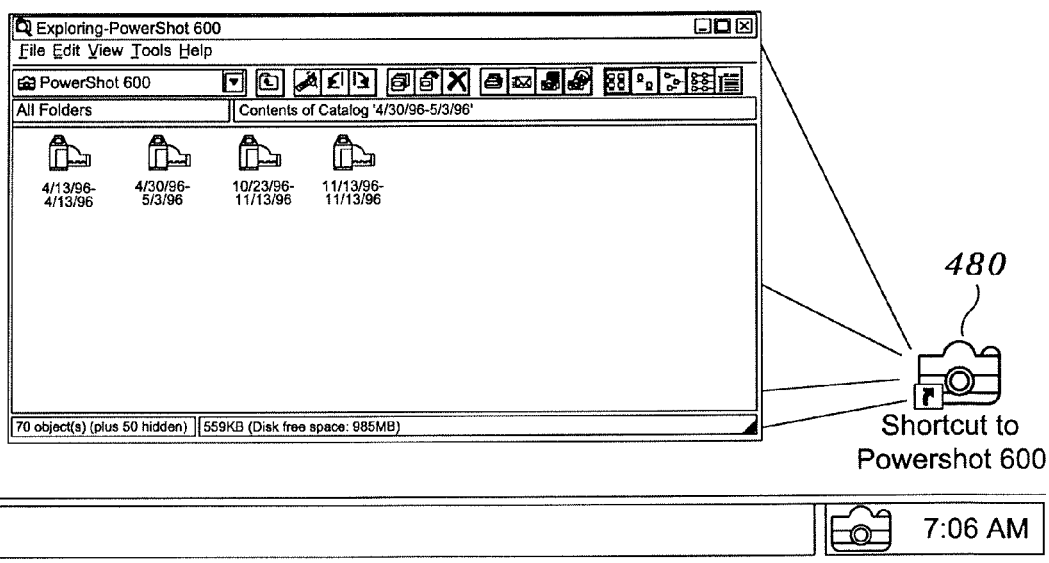
FIG. 58 is a view illustrating invocation of an Explorer user interface according to the present invention.
Figure 59:
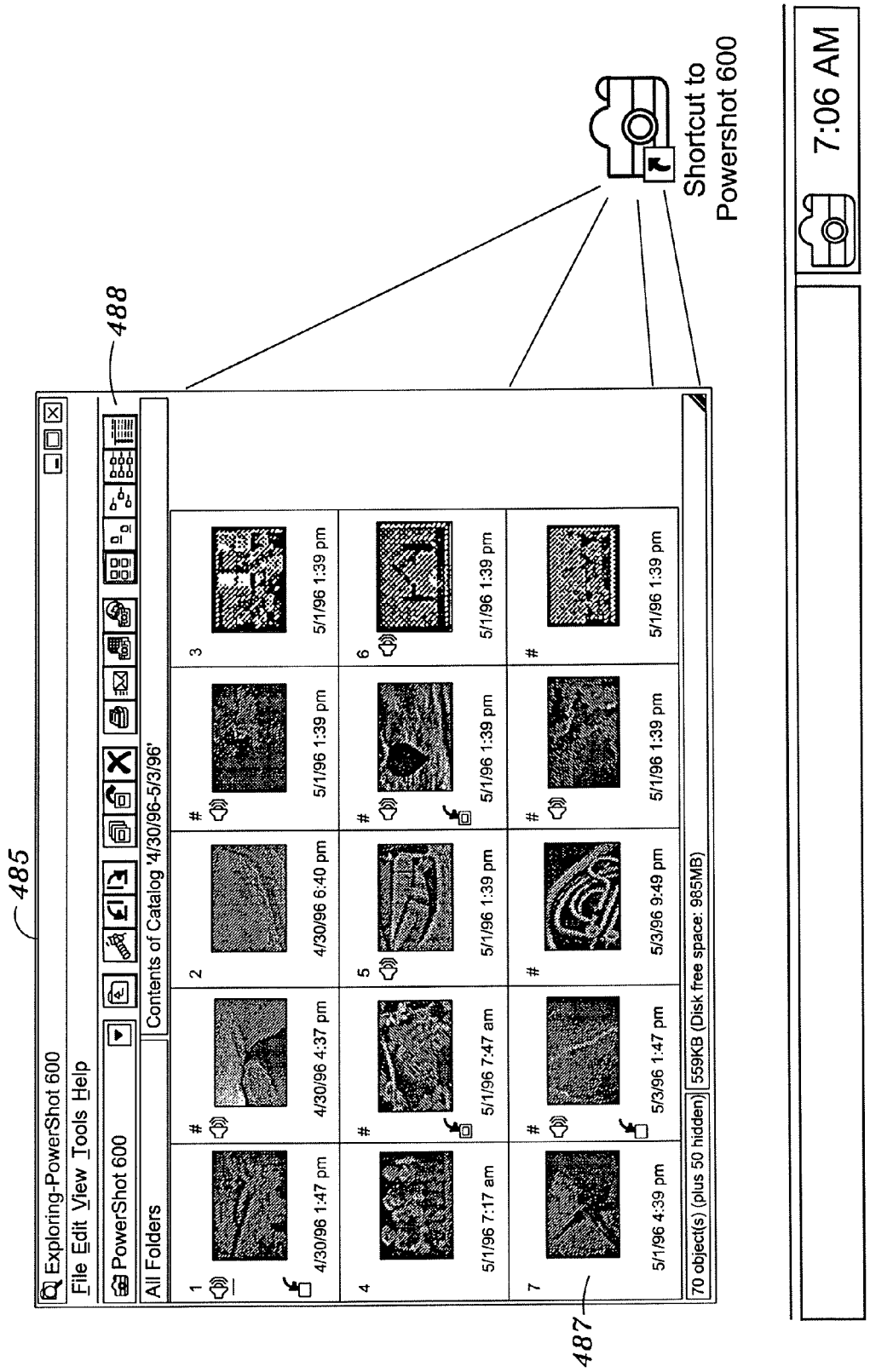
FIG. 59 is a view illustrating invocation of an Explorer user interface according to the present invention.

It should be noted that, if camera 14 contains only one canister, the processes shown in FIGS. 57 and 58 will result in display of user interface 485 of FIG. 59, in which viewing area 487 and toolbar 488 correspond to areas 192 and toolbar 196 of FIG. 22.

Figure 60:
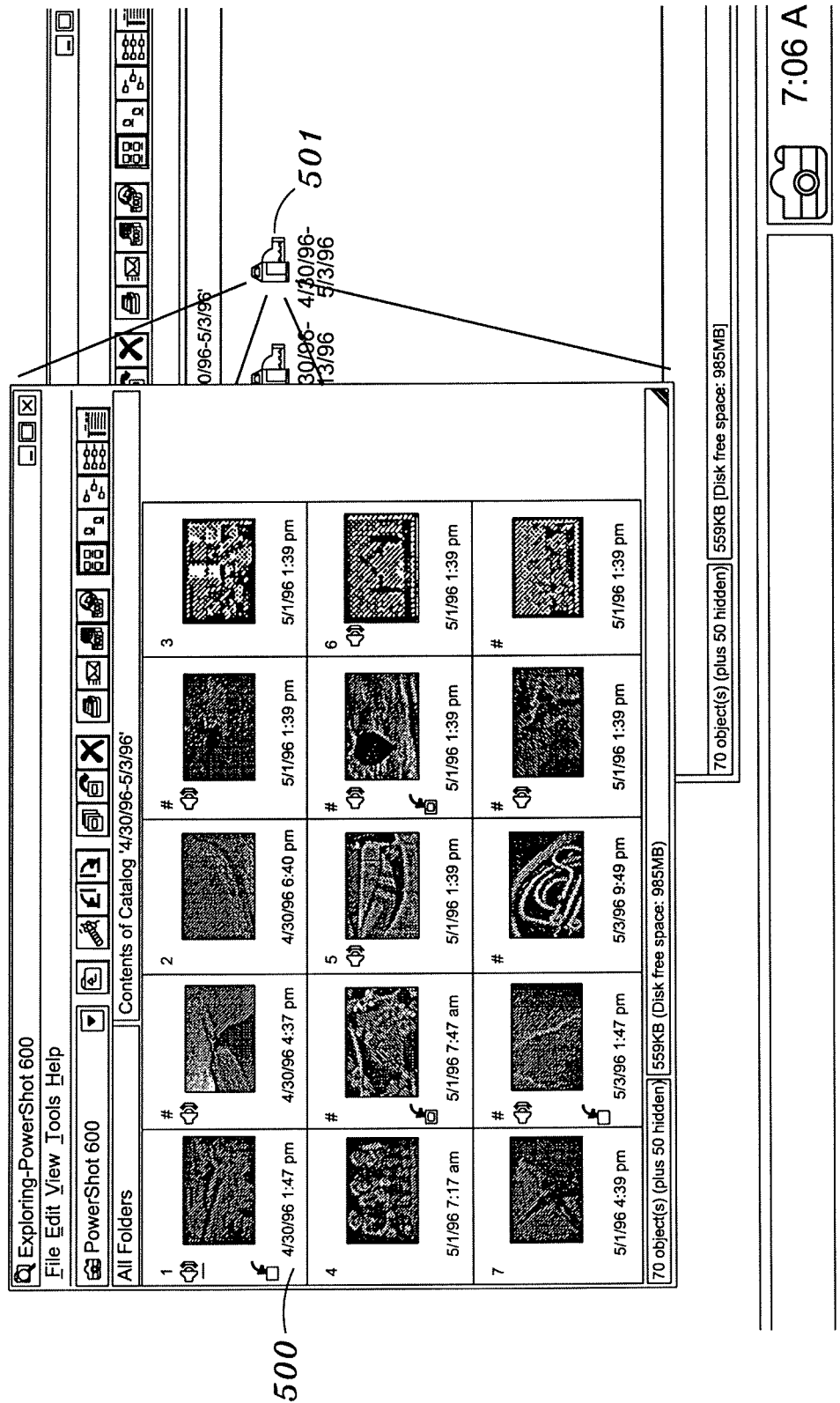
FIG. 60 is a view illustrating invocation of an Explorer user interface according to the present invention.

A system object viewer interface according to the present invention may also be obtained by selecting a canister icon within a folder or a shortcut to a camera canister. As described above, camera canisters may be located on a camera or on another computerized storage device. In this regard, FIG. 60 shows interface 500 resulting from selection of Canister icon 501.

Figure 61:
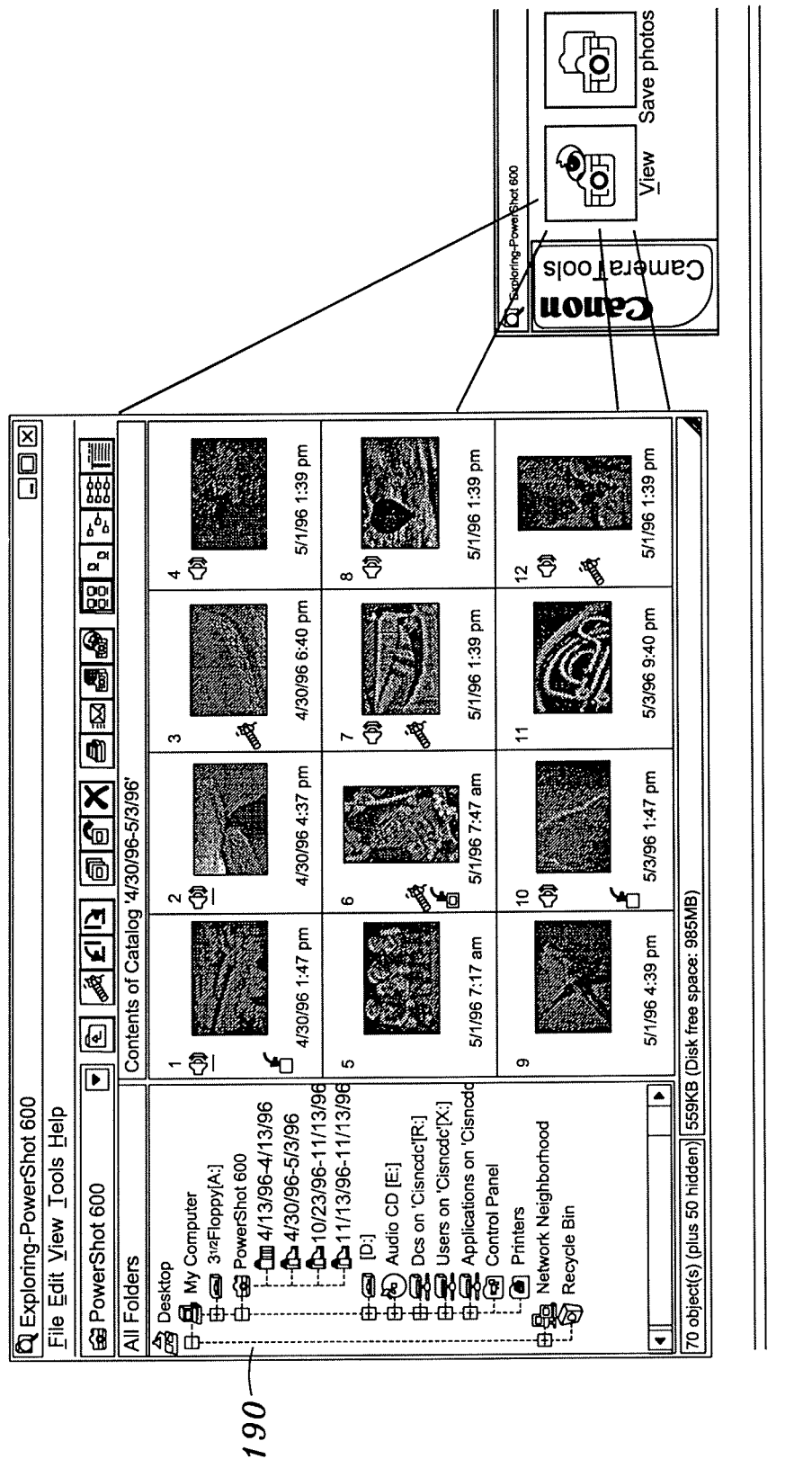
FIG. 61 is a view illustrating invocation of an Explorer user interface according to the present invention.

Finally, as described above with respect to the toolbox application, and illustrated in FIG. 61, selection of View button 45 invokes Explorer interface 190. As shown, interface 190 shows the contents of the first canister located within digital camera 14 in Display Thumbnails mode.

It should be noted that the present invention may be used in conjunction with any application or system utility for viewing system objects. In this regard, new versions of the windows operating system will allow viewing of system objects via a WWW browser application. Accordingly, the present invention may also be used to view and manipulate digital camera images via a WWW browser.

Shell Extension Implementation

The above-described inventive features of the present invention are preferably implemented using a shell extension. A shell extension in Windows95 is an OLE in-process server, or DLL, which provides OLE component objects to windows applications. As a result, a shell extension serves as an extension to windows itself when system objects are displayed and manipulated.

Using shell extensions, new types of system objects can be defined and new procedures for manipulating and displaying the objects can be provided. With respect to existing system objects, shell extensions commonly are used to assign new default icons, to add property pages to property sheets and to modify context, or right click, menus associated with objects.

In order to support a new type of system object, Windows95 requires a developer to provide certain entry points to functions which will be called by the operating system to manipulate and to display the newly-defined system object. FIG. 62 shows a list of Component Object Model interfaces of a shell extension module according to the present invention which support these entry points with respect to camera and canister objects.

The interfaces shown in FIG. 62 are listed according to their general functions. FIG. 63 lists specific methods belonging to each interface shown in FIG. 62. The methods are listed according to the object class to which the methods belong in a preferred embodiment of the present invention.

Together, the listed interfaces and corresponding methods form a DLL used to support camera and canister system objects according to the present invention. However, in order for the windows shell to utilize the DLL to manipulate and display camera and canister objects according to the present invention, the DLL must be registered in the windows shell.

FIG. 64 shows registry keys for registering the camera and canister system objects. In this regard, registry entry A identifies the shell extension module CGExplor.dll to the Explorer namespace by virtue of its Class ID, 918B1BA1-D032-11d0-9D92-00AA0030AD96. Registry entries in region B register the Canon PowerShot camera system object with the shell, indicate that CGExplor.dll supports display and manipulation of the camera system object, and indicate that the CGExplor.dll module provides a default icon and context menu handlers for use with Canon PowerShot camera system objects. Region B entries also indicate that CGExplor.dll provides attributes for shell folders representing a camera object.

Similarly, registry entries in region C indicate to the shell that CGExplor.dll provides support for a PowerShot canister system object, and provides a default icon and context menu handlers for managing PowerShot canister system objects. Region C entries also indicate that CGExplor.dll provides particular attributes for shell folders representing a PowerShot canister.

Other Port Monitor Client Applications

Figure 65:
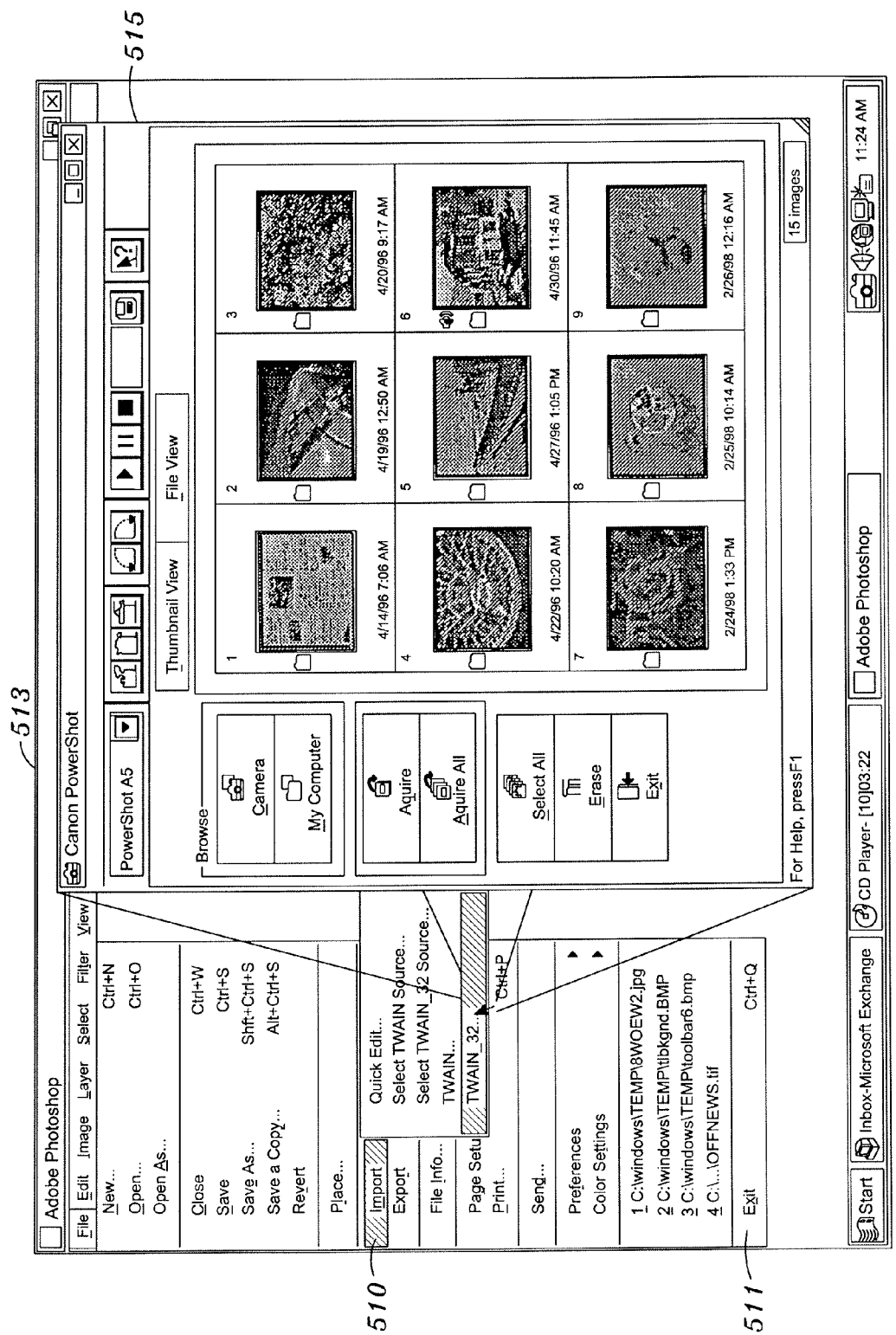
FIG. 65 is a view illustrating invocation of a TWAIN user interface from an image processing application.

FIG. 65 is a view of an image processing application utilizing the port monitor of the present invention. In this regard, in order to acquire files from digital camera 14, a user accesses Import option 510 from pull-down menu 511 of image processing application 513. Upon selection of a TWAIN interface corresponding to digital camera 14, TWAIN application user interface 515 is displayed. It should be noted that, after display of TWAIN application 515, pull-down menu 511 is dismissed.

As described above, TWAIN application 515 communicates with the port monitor to access images from digital camera 14. However, as also described above, the port monitor diverts calls for access to digital camera 14 to a cache memory into which files from digital camera 14 are downloaded. Accordingly, images from digital camera 14 need not be downloaded anew from camera 14 upon invocation of dialog 515. As a result, the present port monitor provides fast acquisition and manipulation of images stored on digital camera 14 from any client application.

While the present invention is described above with respect to what is currently considered its preferred embodiments, it is to be understood that the invention is not limited to that described above. To the contrary, the invention is intended to cover various modifications and equivalent arrangements included within the spirit and scope of the appended claims.

What is claimed is:

1. An information processing apparatus having an interface for communicating with an image capturing unit, the information processing apparatus comprising:
    a receiving unit configured to receive, from the image capturing unit, a plurality of image data respectively corresponding to a plurality of images;
    a storing control unit configured to store the plurality of image data received from the image capturing unit in a storage medium; and
    a display control unit configured to display at least one setting screen for setting regarding the storage of the plurality of image data in the storage medium,
    wherein the setting screen includes a first region for inputting a character string for a root name of a file name to be assigned for each of the plurality of image data received by the receiving unit, and a second region for setting a number from which the assigned file name commences, and
    wherein the storing control unit assigns the file name to each one of the plurality of image data, the assigned file name including the inputted character string for the root name and one of incremented numbers sequentially assigned to the plurality of image data, the incremented numbers starting from the number set in the second region, and stores each such one of the plurality of image data in the storage medium with the assigned file name.

2. The information processing apparatus according to claim 1, wherein the setting screen includes a region for setting a directory for a storage area for the plurality of image data received by the receiving unit, wherein the region for setting a directory is mutually exclusive from the first and second regions, and is visually distinct therefrom.

3. The information processing apparatus according to claim 1, wherein the setting screen includes a region for setting a selection of whether to assign the file name by the storing control unit or to use a file name provided by the image capturing unit to the plurality of image data received by the receiving unit.

4. The information processing apparatus according to claim 1, wherein the setting screen includes a region for setting a format into which the plurality of the image data received by the receiving unit is converted.

5. The information processing apparatus according to claim 1, wherein the setting screen includes a region for setting whether the receiving unit receives a related file which is related to at least one of the plurality of image data received from the receiving unit.

6. The information processing apparatus according to claim 5, wherein the related file includes thumbnail image data having a size smaller than the image data related to the related file.

7. The information processing apparatus according to claim 5, wherein the related file includes sound data.

8. The information processing apparatus according to claim 1, wherein the receiving unit receives a related file from the image capturing unit, the related file being related to at least one of the plurality of image data, and
wherein the storing control unit assigns a related file name to the related file, the related file name including the character string and said one of the sequentially assigned incremented numbers same as the image data related to the related file, and stores the related file in the storage medium.

9. The information processing apparatus according to claim 8, wherein the setting screen includes a region for setting whether to delete the image data from the image capturing unit after receiving image data by the receiving unit.

10. The information processing apparatus according to claim 1, wherein the display control unit is configured to display the setting screen responsive to connection of the information processing apparatus to the image capturing unit.

11. The information processing apparatus according to claim 1, wherein the display control unit displays the setting screen and a listing screen for listing the plurality of image data received by the receiving unit in respectively different windows.

12. The information processing apparatus according to claim 1, wherein the number is set based on an operation by a user.

13. The information processing apparatus according to claim 1, wherein the image capturing unit is a digital camera.

14. The information processing apparatus according to claim 1, wherein the image capturing unit is capable of operating separately from the information processing apparatus.

15. The information processing apparatus according to claim 14, wherein the image capturing unit captures the plurality of images before being connected to the information processing apparatus.

16. The information processing apparatus according to claim 1, wherein the first and second regions are mutually exclusive and visually distinct.

17. An interface method for interfacing with an image capturing unit, the method comprising:
receiving from the image capturing unit a plurality of image data respectively corresponding to a plurality of images;
displaying at least one setting screen for setting regarding storage of the plurality of image data in storage medium different from the image capturing unit, wherein the setting screen includes a first region for inputting a character string for a root name of a file name to be assigned for each of the plurality of image data, and a second region for setting a number from which the assigned file name commences;
assigning a file name to each one of the plurality of image data, the assigned file name including the inputted character string for the root name and one of incremented numbers sequentially assigned to the plurality of image data, the incremented numbers starting from the number set in the second region; and
storing each such one of the plurality of received image data in the storage medium with the assigned file name.

18. The interface method according to claim 17, further comprising receiving a related file from the image capturing unit, the related file being related to at least one of the plurality of image data;
assigning a related file name to the related file, the related file name including the character string and said one of the sequentially assigned incremented numbers same as the image data related to the related file; and
storing the related file in the storage medium.

19. The interface method according to claim 18, wherein the setting screen includes a region for setting whether to delete the image data from the image capturing unit after receiving image data by the receiving unit, and further comprising deleting the image data from the image capturing unit in accordance with the setting.

20. The interface method according to claim 17, wherein the image capturing unit captures the plurality of images before execution of the interface method.

21. The interface method according to claim 17, wherein the first and second regions are mutually exclusive and visually distinct.

22. A non-transitory computer-readable storage medium for storing computer-executable process steps which when executed by an information processing apparatus cause the information processing apparatus to interface with an image capturing unit, wherein the computer-executable process steps comprise:
receiving from the image capturing unit a plurality of image data respectively corresponding to a plurality of images;
displaying at least one setting screen for setting regarding storage of the plurality of image data in storage medium different from the image capturing unit, wherein the setting screen includes a first region for inputting a character string for a root name of a file name to be assigned for each of the plurality of image data, and a second region for setting a number from which the assigned file name commences;
assigning a file name to each one of the plurality of image data, the assigned file name including the inputted character string for the root name and one of incremented numbers sequentially assigned to the plurality of image data, the incremented numbers starting from the number set in the second region; and
storing each such one of the plurality of received image data in the storage medium with the assigned file name.

* * * * *